United States Patent [19]

Terashita

[11] Patent Number: 5,561,494
[45] Date of Patent: Oct. 1, 1996

[54] METHOD OF AND APPARATUS FOR DETERMINING EXPOSURE AMOUNT IN COPYING APPARATUS

[75] Inventor: Takaaki Terashita, Kanagawa, Japan

[73] Assignee: Fuji Photo Film Co., Ltd., Kanagawa, Japan

[21] Appl. No.: 465,909

[22] Filed: Jun. 6, 1995

Related U.S. Application Data

[63] Continuation of Ser. No. 76,890, Jun. 15, 1993, abandoned.

[30] Foreign Application Priority Data

| Jun. 15, 1992 | [JP] | Japan | 4-155276 |
| Jun. 15, 1992 | [JP] | Japan | 4-155277 |
| Jun. 18, 1992 | [JP] | Japan | 4-159256 |

[51] Int. Cl.$^6$ ................................................. G03B 27/72
[52] U.S. Cl. .......................... 355/38; 355/32; 355/68; 355/71
[58] Field of Search ............................ 355/32, 35, 38, 355/68, 69, 71

[56] References Cited

U.S. PATENT DOCUMENTS

| 4,168,120 | 9/1979 | Freier et al. | 355/38 |
| 4,168,121 | 9/1979 | Freier et al. | 355/38 |
| 4,769,695 | 9/1988 | Terashita | 355/76 |
| 4,814,802 | 3/1989 | Ogawa | 354/105 |
| 4,873,546 | 10/1989 | Zahn et al. | 355/38 |
| 4,951,084 | 8/1990 | Von Stein et al. | 355/38 |
| 4,965,628 | 10/1990 | Olliver et al. | 355/41 |
| 4,974,017 | 11/1990 | Terashita | 355/38 |
| 5,016,039 | 5/1991 | Sosa et al. | 354/430 |
| 5,019,854 | 5/1991 | Mukai et al. | 354/471 |
| 5,023,656 | 6/1991 | Terashita | 355/41 |
| 5,029,312 | 7/1991 | Goenner | 355/38 |
| 5,036,351 | 7/1991 | Frick et al. | 355/38 |
| 5,115,270 | 5/1992 | Kraft et al. | 355/38 |
| 5,119,125 | 6/1992 | Kraft | 355/38 |
| 5,148,213 | 9/1992 | Terashita | 355/38 |

FOREIGN PATENT DOCUMENTS

| 58-88624 | 5/1983 | Japan . |
| 61-95525 | 5/1986 | Japan . |
| 1-134353 | 5/1989 | Japan . |
| 1-142719 | 6/1989 | Japan . |
| 3-46648 | 2/1991 | Japan . |
| 3-230148 | 10/1991 | Japan . |

*Primary Examiner*—Russell E. Adams
*Assistant Examiner*—Daniel P. Malloy
*Attorney, Agent, or Firm*—Sughrue, Mion, Zinn, Macpeak & Seas; Richard C. Turner

[57] ABSTRACT

An apparatus for determining exposure amount in a copying apparatus includes: a photometric measuring device for effecting photometry by dividing an image recorded on a recording material into a multiplicity of segments and by separating each segment into a multiplicity of colors consisting of four or more predetermined colors; a storage device for storing photometric data on the multiplicity of colors obtained from photometry by the photometric measuring device; an image-density calculating device for calculating an image density equivalent to an image density obtained by photometrically measuring the image with the photometric measuring device exhibiting a spectral sensitivity distribution equivalent to that of a copying material, on the basis of the photometric data on the multiplicity of colors and the spectral sensitivity distribution of the copying material; a correction-amount determining device for determining a correction amount with respect to the image density on the basis of the photometric data on at least three colors among the stored photometric data on the multiplicity of colors; a correcting device for correcting the determined correction amount in such a manner that the correction amount becomes equivalent to the correction amount obtained by photometrically measuring the image with the photometric measuring device exhibiting the spectral sensitivity distribution equivalent to that of the copying material; and an exposure-amount determining device for determining the exposure amount by using the image density and the corrected correction amount.

31 Claims, 28 Drawing Sheets

FIG. 4
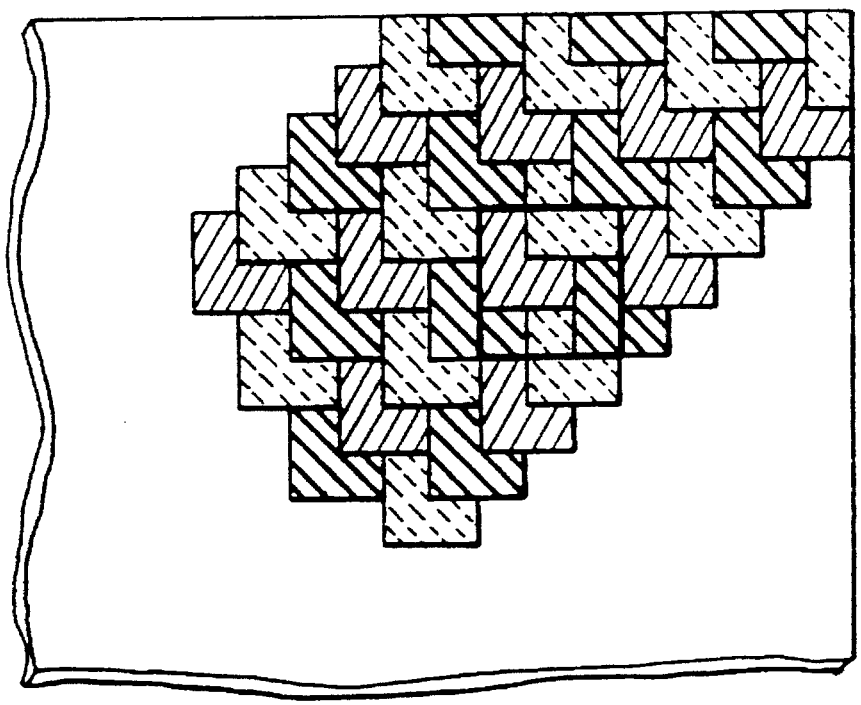
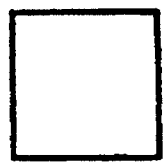 : SIZE OF 1 PIXEL
▨ : PORTION OF FILTER (B) WITH CENTRAL WAVELENGTH OF 470 nm
▧ : PORTION OF FILTER (G) WITH CENTRAL WAVELENGTH OF 550 nm
▨ : PORTION OF FILTER (R) WITH CENTRAL WAVELENGTH OF 710 nm

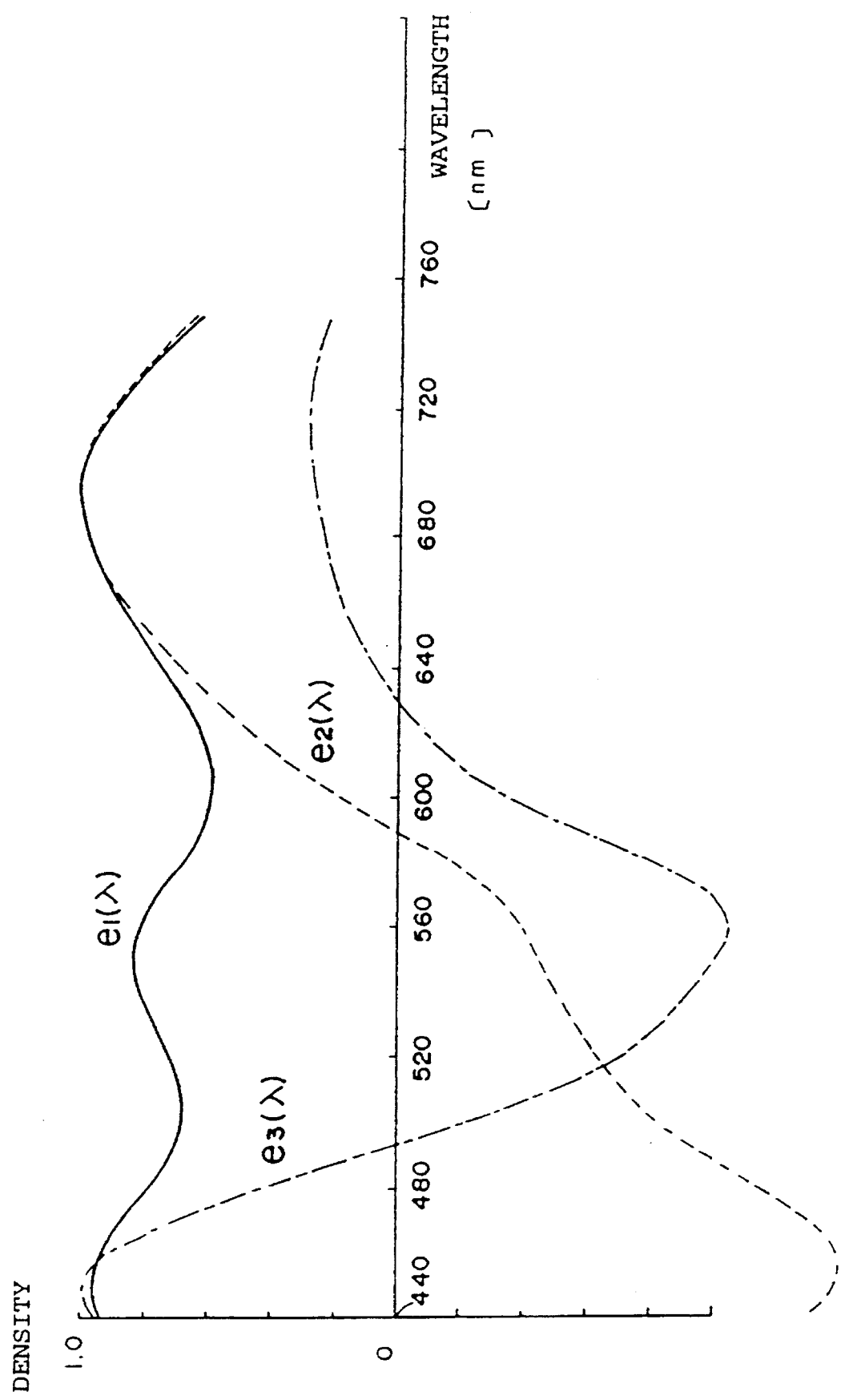

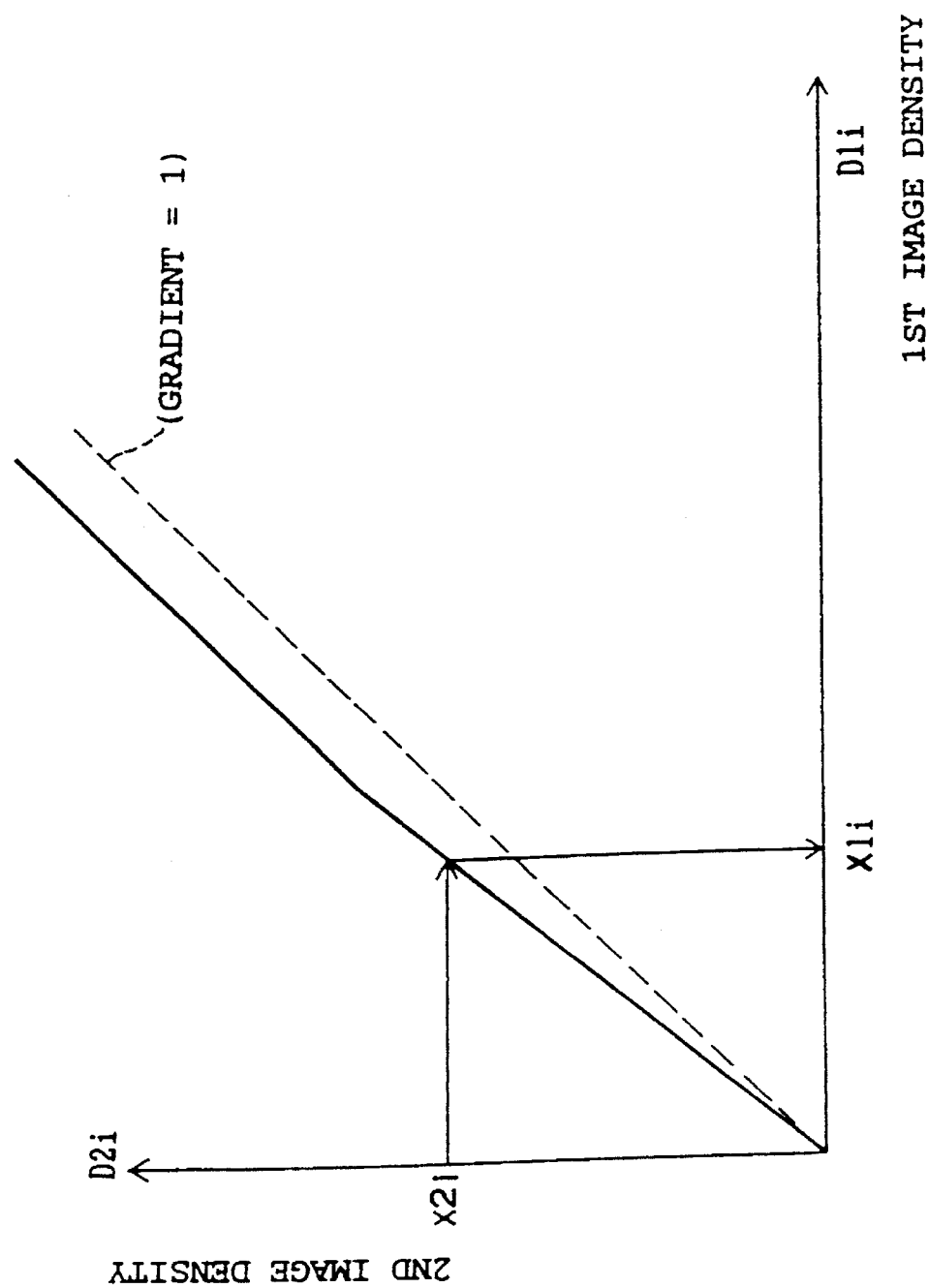

METHOD OF AND APPARATUS FOR DETERMINING EXPOSURE AMOUNT IN COPYING APPARATUS

This is a Continuation of application Ser. No. 08/076,890, filed Jun. 15, 1993, now abandoned.

BACKGROUND OF THE INVENTION

1. Field of the Invention

The present invention relates to a method of and an apparatus for determining exposure amount in a copying apparatus, and more particularly to a method of and an apparatus for determining exposure amount in a copying apparatus for reproducing an image recorded on a film onto a reproducing material such as a printing paper.

2. Description of the Related Art

In general, when a color image is copied onto a copying material such as a light-sensitive material from a color original picture, exposure amount is determined with respect to the respective colors of red (R), green (G), and blue (B) light by measuring integral transmission densities of the R, G, and B light by using a photometric device having color separation filters comprised of dye filters or evaporated filters. In order to determine the exposure amount accurately, it is necessary for the spectral sensitivity distribution of the photometric device to accurately coincide with the spectral sensitivity distribution of the copying material. The spectral sensitivity distribution of this copying material is a complicated distribution which exhibits asymmetry with respect to a wavelength at which sensitivity becomes maximum. For this reason, in preparing the color separation filters by means of the dye filters and evaporated filters, it is necessary to combine a multiplicity of filters, so that there are problems in that it is difficult to mass produce them and their accuracy is low.

Accordingly, in a photoresist exposure apparatus, a technique is known wherein the spectral sensitivity distribution of a photometric device is made to coincide with the spectral sensitivity distribution of a copying material by separating the light from an original picture into spectral components and by effecting processing by adding weight to the separated components. Japanese Patent Application Laid-Open No. 88624/1983 discloses a technique in which the aforementioned processing is effected by using a photoresist exposure apparatus comprising a diffraction grating, a convergent optical system, and a photodetector. However, a complicated mechanism is required to ensure that the spectral sensitivity characteristics will not change owing to the relative arrangement of these optical elements. Japanese Patent Application Laid-Open No. 95525/1986 discloses a photoresist exposure apparatus in which a multiplicity of interference filters are arranged instead of the aforementioned diffraction grating. However, since the interference filters of the same number as that of the separated components of light are required, if the number of photometric wavelengths is numerous, mass production is difficult.

In addition, in a color photographic printer, Japanese Patent Application Laid-Open No. 134353/1989 discloses a technique in which light transmitted through an image recorded on a film is separated into spectral components by means of a prism, a diffraction grating, or spectral filters, and an image of a part of a copy original is formed on a panel of photoelectric sensors into the configuration of a slit. In this technique, the light at different photometric positions is made incident along a row of the panel of the photoelectric sensors, and spectral light for each photometric position made incident along columns of the panel is converted to electrical signals. At the same time, by gradually moving the film, the portion of an original image through which the slit light is transmitted is moved, so as to photometrically measure the entire image plane. Each spectral component of each photometrically measured pixel is multiplied by a weighting coefficient corresponding to a spectral sensitivity distribution of the copying material, so as to determine photometric values which are equivalent to those obtained by conducting photometry by means of the sensors having a spectral sensitivity distribution equivalent to that of the copying material.

However, if the diffraction grating or the spectral filters are employed, the same problem as the one described above is encountered. If the prism is used, since the light is separated by refraction, there are drawbacks in that it is necessary to make the projected light into parallel light, that the apparatus becomes large in size, and that it is difficult to photometrically measure the spectra with the same quantity of light by using the same panel because of the spectral sensitivity distribution of the photoelectric sensors. In addition, there is a drawback in that since the rows are decomposed into the columns, there occurs a substantial decline in the quantity of light particularly when the density of the image is high. For this reason, photometry is conducted by decreasing the spectral resolution, and an interpolation is provided for the photometrically measured spectra.

Furthermore, Japanese Patent Application Laid-Open No. 142719/1989 discloses an apparatus comprising: a first photometrically measuring section for effecting photometry by using a two-dimensional array sensor by separating slit light projected onto an image recorded on a film into a multiplicity of spectra by means of a prism, a diffraction grating, and the like so as to determine an average density; and a second photometrically measuring section for determining an average density by means of scanning photometry so as to determine an exposure amount, wherein the exposure amount is corrected on the basis of results of comparison between the average density determined by the first photometrically measuring section and the average density determined by the second photometrically measuring section. However, since the prism and the diffraction grating are used, a problem similar to the above-described problem is encountered. In addition, since two photometrically measuring sections need to be provided, there has been drawbacks in that the apparatus becomes large in size, and that the restrictions imposed on the layout of the component parts become large.

To overcome these problems, the present applicant has proposed an exposure-amount controlling apparatus (Japanese Patent Application Laid-Open No. 230148/1991) comprising: a first sensor for separating a film image into a multiplicity of spectra and photometrically measuring them; and a second sensor having maximum sensitivities at wavelength bands corresponding to three sensitivity wavelength bands of a copying material for effecting photometry by dividing an image into a multiplicity of segments, wherein an average density $PD1j$ is determined by multiplying a photometric value of the first sensor by a weighting coefficient corresponding to a spectral sensitivity distribution of the copying material, a tricolor average density $PD2j$ and a correction amount $PD3j$ are determined by the second sensor, and an exposure amount is determined on the basis of the two variables. In this technique, the exposure control amount for determining the exposure amount $PDj$ is determined from $$PDj=PD1j+F\cdot f(PD2j+PD3j)$$

In the above-described exposure-amount controlling apparatus, it is possible to effect photometry by using diffused light since the first sensor is constituted by a two-dimensional image sensor and an interference filter in which the thickness of an interference film is varied continuously or in steps in such a manner that the wavelength of the color to be separated, i.e., the wavelength to be spectrally diffracted, changes. However, since it is necessary to provide two photometrically measuring sections, it is difficult to make the apparatus compact. In addition, unless the light transmitted through the film image and made incident upon the first sensor is diffused and rendered uniform, a spectral error occurs, so that a proper exposure amount cannot be obtained.

In addition, in the above-described technique, in a case where the spectral sensitivity distribution of the second sensor, in particular, is substantially different from the spectral sensitivity distribution of the copying material, and differs substantially from the spectral sensitivity distribution of the first sensor, e.g., in a case where the spectral sensitivity distribution is relatively sharp (the half-width is small), it is necessary to change the coefficient F in the formula of the exposure control amount PDj by a large degree in correspondence with the film type and the exposure level. Hence, it has been difficult to obtain a proper exposure amount.

In a method of determining exposure amount in an image copying apparatus (Japanese Patent Application Laid-Open No. 46648/1991), tricolor photometric data is set as tricolor normalized data by being transformed in accordance with a normalization condition, a comparison is made between the tricolor normalized data and a reference value to classify the tricolor normalized data, and the exposure amount is determined on the basis of an average density of the tricolor photometric data selected in accordance with that classification. As a result, a proper exposure amount is obtained irrespective of the type of film on which the image is recorded, but no consideration is given to the matching of the spectral sensitivity distribution of the photometrically measuring means with the spectral sensitivity distribution of the copying material.

Meanwhile, a method has been conceived in which the energy distribution of a light source used for photometry, the spectral sensitivity distribution of a photometric device, and the like are determined in advance, and through the calculation of a microcomputer photometric values are obtained which are equivalent to those obtained when photometry is conducted by a photometric device exhibiting a spectral sensitivity distribution equivalent to the spectral sensitivity distribution of a copying material, thereby to determine an exposure amount.

That is, if it is assumed that the spectral energy distribution of a light source used for photometry is $P(\lambda)$, the spectral sensitivity distribution of the photometric device is $S(\lambda)$, and development silver or a coloring dye on the film is $\rho(\lambda)$, a density D photometrically measured by a photometric device having wavelength regions s to 1 is expressed by the following Formula (1):

$$D = \log \frac{\int_s^l P(\lambda) \cdot S(\lambda) d\lambda}{\int_s^l P(\lambda) \cdot S(\lambda) \cdot \rho(\lambda) d\lambda} \tag{1}$$

where $$\int_s^l P(\lambda) \cdot S(\lambda) d\lambda$$

is a bundle of rays made incident upon the film, and $$\int_s^l P(\lambda) \cdot S(\lambda) \cdot \rho(\lambda) d\lambda$$

is a bundle of rays transmitted through the film

Accordingly, the density D photometrically measured by the photometric device exhibiting a spectral sensitivity distribution equivalent to a spectral sensitivity distribution $Sp(\lambda)$ of the copying material, can be obtained if $S(\lambda)$ in Formula (1) above is substituted by the spectral sensitivity distribution $Sp(\lambda)$ of the copying material.

Since the spectral energy distribution $P(\lambda)$ of the light source and the spectral sensitivity distribution $Sp(\lambda)$ of the copying material are obtained by being measured in advance, if the spectral transmittance distribution $\rho(\lambda)$ of the film, which differs depending on the type of film, is estimated, a density photometrically measured by the photometric device exhibiting a spectral sensitivity distribution equivalent to that of the spectral sensitivity distribution of the copying material can be obtained from Formula (1) above. Then, exposure amount can be determined on the basis of this density. In accordance with this method, since it is unnecessary to use a diffraction grating or a multiplicity of interference filters in the manner stated in the above-described prior art, the photometric device can be made compact and can be manufactured at low cost.

However, with the above-described method of calculation using the microcomputer, a method of accurately estimating the spectral transmittance distribution of the film has not been established, so that there has been a drawback in that photometric values obtained by the photometric device having a spectral sensitivity distribution equivalent to that of the copying material cannot be obtained accurately by calculation.

Furthermore, to determine the exposure amount accurately, it is preferable to determine the exposure amount after the image is divided into pixels by the sensors of the photometrically measuring section, and each pixel is separated into a multiplicity of colors and photometrically measured, and after the spectral distribution of the entire pixels is measured or estimated. However, there is a problem in that a long calculation period is required since the spectral distribution is calculated for each pixel. Furthermore, although it is necessary that the position of each pixel at the time when the image is divided by the sensors is accurately aligned at the actual position, to meet this requirement, it is necessary to effect the positioning of the sensors (so-called registration) with high accuracy. Therefore, much time is required in its adjustment.

SUMMARY OF THE INVENTION

Accordingly, it is an object of the present invention to provide an apparatus and a method for determining exposure amount in a copying apparatus which make it possible to determine an optimum exposure amount with a small amount of photometric data and make it possible to render the apparatus compact, thereby overcoming the above-described drawbacks of the conventional art.

To this end, in accordance with a first aspect of the invention, there is provided an apparatus for determining exposure amount in a copying apparatus, comprising: photometrically measuring means for effecting photometry by dividing an image recorded on a recording material into a multiplicity of segments and by separating each segment into a multiplicity of colors consisting of predetermined four or more colors; storage means for storing photometric data on the multiplicity of colors obtained from photometry by the photometrically measuring means; image-density calculating means for calculating an image density equivalent to an image density obtained by photometrically measuring the image by means of the photometrically measuring means exhibiting a spectral sensitivity distribution equivalent to that of a copying material, on the basis of the photometric data on the multiplicity of colors and the spectral sensitivity distribution of the copying material; correction-amount determining means for determining a correction amount with respect to the image density on the basis of the photometric data on at least three colors among the stored photometric data on the multiplicity of colors; correcting means for correcting the determined correction amount in such a manner that the correction amount becomes equivalent to the correction amount obtained by photometrically measuring the image by means of the photometrically measuring means exhibiting the spectral sensitivity distribution equivalent to that of the copying material; and exposure-amount determining means for determining the exposure amount by using the image density and the corrected correction amount.

Preferably, the image-density calculating means determines a weighting coefficient on the basis of the photometric data on the multiplicity of colors and a plurality of main-component spectral distributions determined in advance, estimates the spectral distribution of the image by determining a linear sum of the plurality of main-component spectral distributions by using the weighting coefficient, and calculates an image density equivalent to an image density obtained by photometrically measuring the image by means of the photometrically measuring means exhibiting the spectral sensitivity distribution equivalent to that of the copying material, on the basis of the estimated spectral distribution of the image and the spectral sensitivity distribution of the copying material.

In accordance with a second aspect of the invention, the apparatus comprises: photometrically measuring means for effecting photometry by dividing an image recorded on a recording material into a multiplicity of segments and by separating each segment into at least three colors; image-density calculating means for calculating an image density by using photometric data obtained from photometry by the photometrically measuring means; correction-amount determining means for determining a correction amount with respect to the image density on the basis of the photometric data; correcting means for correcting an exposure control amount determined from the image density and the determined correction amount in such a manner that the exposure control amount becomes equivalent to an exposure control amount obtained by photometrically measuring the image by means of the photometrically measuring means exhibiting a spectral sensitivity distribution equivalent to that of a copying material; and exposure-amount determining means for determining the exposure amount by using the corrected exposure control amount.

In accordance with a third aspect of the invention, the apparatus comprises: photometrically measuring means for effecting photometry by dividing an image recorded on a recording material into a multiplicity of segments and by separating each segment into at least three colors; image-density calculating means for calculating an image density by using photometric data obtained from photometry by the photometrically measuring means; correction-amount determining means for determining a correction amount with respect to the image density on the basis of the photometric data; correcting means for correcting the image density and the determined correction amount in such a manner that the image density and the determined correction amount become equivalent to an image density and a correction amount obtained by photometrically measuring the image by means of the photometrically measuring means exhibiting a spectral sensitivity distribution equivalent to that of a copying material; and exposure-amount determining means for determining the exposure amount by using the corrected image density and correction amount.

The correcting means is capable of effecting the correction by using a relationship between a first image density equivalent to an image density obtained by photometrically measuring the image by means of the photometrically measuring means exhibiting the spectral sensitivity distribution equivalent to that of the copying material and a second image density determined from photometric data obtained by dividing the image into the multiplicity of segments and by separating each segment into at least three colors and photometrically measuring the image.

The first image density equivalent to the image density obtained by photometrically measuring the image by means of the photometrically measuring means exhibiting the spectral sensitivity distribution equivalent to that of the copying material may be determined by determining a weighting coefficient on the basis of the photometric data on the multiplicity of colors and a plurality of main-component spectral distributions determined in advance, by estimating the spectral distribution of the image by determining a linear sum of the plurality of main-component spectral distributions by using the weighting coefficient, and by using the estimated spectral distribution of the image and the spectral sensitivity distribution of the copying material.

The aforementioned relationship may be determined by using a plurality of the first image densities and a plurality of the second image densities.

The aforementioned relationship may be determined by using a multiplicity of the first image densities and a multiplicity of the second image densities which are obtained by photometrically measuring a multiplicity of images recorded on the recording material of a same kind.

The first image density and the second image density may be determined from photometric data obtained by photometrically measuring at least two portions of the image where the density differs.

The aforementioned relationship is preferably predetermined and stored.

To attain the above-described object, in accordance with a fourth aspect of the invention, the apparatus comprises: photometrically measuring means for effecting photometry by dividing an image recorded on a recording material into a multiplicity of segments and by separating each segment into a multiplicity of colors consisting of predetermined four or more colors; storage means for storing photometric data on the multiplicity of colors obtained from photometry by the photometrically measuring means; estimating means for estimating a spectral distribution of each pixel obtained by dividing the image into a multiplicity of pixels or the entire image plane of the image or a portion of the image plane thereof, by using the photometric data on the multiplicity of colors stored in the storage means; image-density calculating means for calculating an image density equivalent to an image density obtained by photometrically measuring the image by means of the photometrically measuring means exhibiting a spectral sensitivity distribution equivalent to that of a copying material, on the basis of the estimated spectral distribution and the spectral sensitivity distribution of the copying material; correction-amount determining means for determining correction amounts for three colors with respect to the image density on the basis of the photometric data on at least three colors among the stored photometric data on the multiplicity of colors; and exposure-amount determining means for determining a copying exposure amount by correcting the image density with the correction amount determined by the correction-amount determining means.

The estimating means preferably estimates the spectral distribution of the image by determining a weighting coefficient to be imparted to each of a plurality of predetermined main-component spectral distributions on the basis of the photometric data on the multiplicity of colors and the plurality of main-component spectral distributions, and by determining a linear sum of the plurality of main-component spectral distributions by using the weighting coefficient.

The photometrically measuring means preferably effects photometry by means of light radiated from a light source for copying and transmitted through or reflected from the image.

The photometrically measuring means may be constituted by two or more area sensors for effecting photometry by dividing the image into the multiplicity of segments and by separating each segment into two or more colors.

In a case where the photometrically measuring means is constituted by two or more area sensors, at least one of the area sensors may exhibit maximum sensitivities to wavelength bands corresponding to sensitivity wavelength bands of the copying material with respect to three colors, R, G, and B, and may effect photometry of the corresponding wavelength bands.

The photometrically measuring means may be constituted by four or more line sensors for effecting photometry by dividing the image into a multiplicity of segments.

In addition, the photometrically measuring means may be constituted by a plurality of line sensors to effect photometry by dividing the image into a multiplicity of segments and by separating each segment into four or more colors.

To attain the above-described object, in accordance with a fifth aspect of the invention, the apparatus comprises: photometrically measuring means for effecting photometry by dividing an image recorded on a recording material into a multiplicity of pixels and by separating each pixel into a multiplicity of colors consisting of predetermined four or more colors; storage means for storing photometric data on the multiplicity of colors obtained from photometry by the photometrically measuring means; pixel selecting means for selecting pixels to be used for the photometric data in the determination of exposure amount on the basis of the photometric data on at least three colors among the photometric data on the multiplicity of colors stored in the storage means; average-value calculating means for calculating for each of the colors an average value of the photometric data on the pixels selected by the pixel selecting means; average-density calculating means for determining an average density equivalent to an average density obtained by conducting photometry by means of the photometrically measuring means exhibiting a spectral sensitivity distribution equivalent to that of a copying material with respect to a region consisting of the selected pixels, by using the first weighting coefficient obtained from the spectral sensitivity distribution of the copying material and the average value of the photometric data for each of the colors; and exposure-amount determining means for determining the exposure amount on the basis of the average density.

Preferably, the average-density calculating means has estimating means for estimating the spectral distribution of the region consisting of the selected pixels on the basis of the average values for each of the colors of the photometric data of the selected pixels, and calculates the average density by using the estimated spectral distribution and the first weighting coefficient.

Preferably, the estimating means determines a second weighting coefficient on the basis of the average values for each of the colors of the photometric data of the selected pixels and a plurality of predetermined main-component spectral distributions, and estimates the spectral distribution of the region consisting of the selected pixels by determining a linear sum of the plurality of main-component spectral distributions by using the second weighting coefficient.

In accordance with a sixth aspect of the invention, the apparatus comprises: photometrically measuring means for effecting photometry by dividing an image recorded on a recording material into a multiplicity of pixels and by separating each pixel into a multiplicity of colors consisting of predetermined four or more colors; storage means for storing photometric data on the multiplicity of colors obtained from photometry by the photometrically measuring means; pixel selecting means for selecting pixels to be used for the photometric data in the determination of exposure amount on the basis of the photometric data on at least three colors among the photometric data on the multiplicity of colors stored in the storage means; estimating means for estimating a spectral distribution of the selected pixels on the basis of the photometric data on the pixels selected by the pixel selecting means; average-density calculating means for determining an average density equivalent to an average density obtained by conducting photometry by means of the photometrically measuring means exhibiting a spectral sensitivity distribution equivalent to that of a copying material with respect to a region consisting of the selected pixels, by using the estimated spectral distribution of the selected pixels and the first weighting coefficient obtained from the spectral sensitivity distribution of the copying material; and exposure-amount determining means for determining the exposure amount on the basis of the average density.

The photometrically measuring means may be constituted by two or more area sensors for effecting photometry by dividing the image into the multiplicity of segments and by separating each segment into two or more colors.

In the case where the photometrically measuring means is constituted by two or more area sensors, at least one of the area sensors may effect photometry of three colors, R, G, and B.

The area sensor for effecting photometry of the three colors, R, G, and B, may be arranged to exhibit maximum sensitivities to wavelength bands corresponding to sensitivity wavelength bands of the copying material with respect to the three colors, R, G, and B.

The selecting means may select pixels on the basis of the photometric data obtained from photometry by the area sensor for effecting the photometry of the three colors, R, G, and B.

The photometrically measuring means may be constituted by a plurality of line sensors, and may effect photometry by dividing the image into a multiplicity of segments and by separating each segment into four or more colors.

In accordance with a seventh aspect of the invention, there is provided a method of determining exposure amount in a copying apparatus, comprising the steps of: effecting photometry by dividing an image recorded on a recording material into a multiplicity of pixels and by separating each pixel into a multiplicity of colors consisting of predetermined four or more colors; selecting pixels to be used for photometric data in the determination of exposure amount on the basis of the photometric data on at least three colors among the photometric data on the multiplicity of colors; and determining an exposure amount by using the photometric data on the multiplicity of colors of the selected pixels.

The exposure amount may be determined by estimating a spectral distribution of a region consisting of the selected pixels on the basis of the photometric data on the multiplicity of colors of the selected pixels, by determining an average density equivalent to an average density obtained by conducting photometry by means of photometrically measuring means exhibiting a spectral sensitivity distribution equivalent to that of a copying material with respect to the region consisting of the selected pixels by using the estimated spectral distribution of the selected pixels and the spectral sensitivity distribution of the copying material, and by being based on the average density.

The exposure amount may be determined by estimating a spectral distribution of the pixels selected on the basis of the photometric data on the multiplicity of colors of the selected pixels, by determining an average density equivalent to an average density obtained by conducting photometry by means of photometrically measuring means exhibiting a spectral sensitivity distribution equivalent to that of a copying material with respect to a region consisting of the selected pixels by using the estimated spectral distribution of the selected pixels and the spectral sensitivity distribution of the copying material, and by being based on the average density.

In addition, the estimation of the spectral distribution may be effected by using a plurality of predetermined main-component spectral distributions.

In the first aspect of the invention, photometry is effected by photometrically measuring means by dividing an image recorded on a recording material into a multiplicity of segments and by separating each segment into a multiplicity of colors consisting of predetermined four or more colors. Then, an image density, which is equivalent to an image density obtained by photometrically measuring the image by means of said photometrically measuring means exhibiting a spectral sensitivity distribution equivalent to that of a copying material, is determined on the basis of the photometric data on the multiplicity of colors obtained by photometry and the spectral sensitivity distribution of the copying material. The calculation of this image density can be effected by determining a weighting coefficient on the basis of the photometric data on the multiplicity of colors and a plurality of main-component spectral distributions determined in advance, by estimating the spectral distribution of the image to be copied by determining a linear sum of the plurality of main-component spectral distributions by using the weighting coefficient, and by using the estimated spectral distribution of the image and the spectral sensitivity distribution of the copying material.

For instance, as the image density, it is possible to use an average density, and this average density can be determined by a formula in which $S(\lambda)$ in Formula (1) above is substituted by the spectral sensitivity distribution $Sp(\lambda)$ of the copying material. As a result, the effect due to the difference between the spectral sensitivity distribution of the photometrically measuring means and the spectral sensitivity distribution of the copying material can be eliminated, and an accurate density of the image to be copied can be obtained.

In addition, an exposure amount with respect to the aforementioned image density is determined on the basis of the photometric data on at least three colors among the photometric data on the multiplicity of colors. Then, the determined correction amount is corrected in such a manner that the correction amount becomes equivalent to a correction amount obtained by photometrically measuring the image by means of said photometrically measuring means exhibiting a spectral sensitivity distribution equivalent to that of the copying material. The correction of this correction amount can be effected by using a relationship between a first image density equivalent to an image density obtained by photometrically measuring the image by means of said photometrically measuring means exhibiting the spectral sensitivity distribution equivalent to that of the copying material and a second image density determined from photometric data obtained by dividing the image into the multiplicity of segments and by separating each segment into at least three colors and photometrically measuring the image. Consequently, even if the tricolor spectral sensitivity distribution of the photometrically measuring means is substantially different from the spectral sensitivity distribution of the copying material, the effect of the error due to the difference in the spectral sensitivity distribution can be eliminated from the correction amount, so that it is possible to obtain an appropriate correction amount.

Thus, the spectral distribution of the image can be estimated with high accuracy on the basis of the photometric data obtained by separating the image into a multiplicity of colors consisting of four or more colors and by photometrically measuring it. Since an appropriate image density can be obtained from this spectral distribution, it becomes unnecessary to separate the image into a multiplicity of spectra by using an optical element such as a prism, a diffraction grating, spectral filters, or the like. Accordingly, it is possible to substantially reduce the number of colors to be separated into at the time of photometry. In addition, it becomes unnecessary to effect photometry with parallel rays of light, and since photometry can be conducted by using diffused light, the photometrically measuring means can be installed in the exposing section of the copying apparatus. Thus, it becomes possible to render the copying apparatus compact.

In addition, since the correction amount with respect to the image density is determined on the basis of the photometric data on at least three colors among the photometric data on the multiplicity of colors, and the correction amount is corrected into an appropriate correction amount by the correcting means, it is unnecessary to separately provide a photometrically measuring means for obtaining the photometric data on the three colors. Additionally, it is possible to obtain an appropriate exposure amount on the basis the image density and the correction amount which are determined from a small amount of photometric data. Accordingly, since the copying exposure amount is determined on the basis of the photometric data obtained from photometry by a single photometrically measuring means, the copying apparatus can be made further compact. At the same time, in a copying apparatus which uses, for instance, an elongated film as the recording material, a changeover (longitudinal feeding, transverse feeding, etc.) in the film transport and the transport of piece negatives is facilitated, and the operational efficiency of the copying apparatus improves. Furthermore, as compared with a case where the light transmitted through the film is diffused and color-separated, the effect of irregular light can be eliminated.

In the second and third aspects of the invention, the image is separated into at least three colors and photometrically measured, the image density is determined by using the photometric data obtained by photometry, and the correction amount with respect to the image density is determined on the basis of the photometric data. In the second aspect of the invention, the exposure control amount determined from the image density and the correction amount is corrected by the correcting means in such a manner that the exposure control amount becomes equivalent to an exposure control amount obtained by photometrically measuring the image by means of the photometrically measuring means having a spectral sensitivity distribution equivalent to that of the copying material. Meanwhile, in the third aspect of the invention, the image density and the correction amount are corrected in such a manner as to become identical to the image density and correction amount obtained by photometrically measuring the image by means of the photometrically measuring means having a spectral sensitivity distribution equivalent to that of the copying material.

This correction can be effected by using the relationship between the first image density equivalent to an image density obtained by photometrically measuring the image by means of the photometrically measuring means having a spectral sensitivity distribution equivalent to that of the copying material and the second image density determined from the photometric data obtained by dividing the image into a multiplicity of segments and by separating each segment into at least three colors and photometrically measuring it.

As a result, even if the spectral sensitivity distribution of the photometrically measuring means is substantially different from that of the copying material, since the effect of an error due to the difference in the spectral sensitivity distribution can be eliminated from the image density and the correction amount, it is possible to obtain an appropriate image density and an appropriate correction amount. If the relationship between the first image density and the second image density are predetermined and stored, an appropriate exposure amount can be obtained by simply separating the image into at least three colors and photometrically measuring it by means of the photometrically measuring means.

As described above, in the first aspect of the invention, the image is divided into a multiplicity of segments, each segment is separated into a multiplicity of colors consisting of four or more colors and photometrically measured. An image density, which is equivalent to an image density obtained by photometrically measuring the image by means of the photometrically measuring means exhibiting a spectral sensitivity distribution equivalent to that of the copying material, is calculated, and a correction amount with respect to the image density is determined on the basis of the photometric data on the three colors. The correction amount is corrected in such a manner as to become equivalent to the correction amount obtained by photometrically measuring the image by means of the photometrically measuring means exhibiting the spectral sensitivity distribution equivalent to that of the copying material, and the exposure amount is determined by using the image density and the corrected correction amount. Therefore, it is possible to obtain outstanding advantages in that an optimum exposure amount can be determined with a small amount of photometric data, and that the apparatus can be made compact.

In the second aspect of the invention, the image is divided into a multiplicity of segments, and each segment is separated into at least three colors and photometrically measured. An image density is determined by using photometric data obtained by photometry, and a correction amount with respect to the image density is determined on the basis of the photometric data. An exposure control amount determined from the image density and the correction amount is corrected in such a manner as to become equivalent to an exposure control amount obtained by photometrically measuring the image by means of the photometrically measuring means exhibiting a spectral sensitivity distribution equivalent to that of the copying material, and the exposure amount is determined by using the corrected exposure control amount. Therefore, it is possible to obtain outstanding advantages in that an optimum exposure amount can be determined with a small amount of photometric data, and that the apparatus can be made compact.

In the third aspect of the invention, the image is divided into a multiplicity of segments, and each segment is separated into at least three colors and photometrically measured. An image density is determined by using photometric data obtained by photometry, and a correction amount with respect to the image density is determined on the basis of the photometric data. The image density and the correction amount are corrected in such a manner as to become equivalent to an image density and a correction amount obtained by photometrically measuring the image by means of the photometrically measuring means exhibiting a spectral sensitivity distribution equivalent to that of the copying material, and the exposure amount is determined by using the corrected image density and correction amount. Therefore, it is possible to obtain outstanding advantages in that an optimum exposure amount can be determined with a small amount of photometric data, and that the apparatus can be made compact.

In the fourth aspect of the invention, photometry is effected by the photometrically measuring means by dividing the image recorded on the recording material into a multiplicity of segments and by separating each segment into a multiplicity of colors consisting of predetermined four or more colors, and a spectral distribution of each pixel obtained by dividing the image into a multiplicity of pixels or the entire image plane of the image or a portion of the image plane thereof is estimated by using the photometric data obtained by photometry. Then, an image density, which is equivalent to an image density obtained by photometrically measuring the image by means of the photometrically measuring means exhibiting a spectral sensitivity distribution equivalent to that of the copying material, is determined on the basis of the estimated spectral distribution and the spectral sensitivity distribution of the copying material. For instance, by using an average density as the image density, the average density is determined by a formula in which $S(\lambda)$ in Formula (1) above is substituted by the spectral sensitivity distribution $Sp(\lambda)$ of the copying material. In addition, correction amounts for three colors with respect to the average density are determined on the basis of the photometric data on at least three colors among the photometric data on the multiplicity of colors, and a copying exposure amount is determined by correcting the average density with the correction amount.

Thus, in accordance with the fourth aspect of the invention, since the spectral distribution of the image can be estimated with high accuracy on the basis of the photometric data, it becomes unnecessary to separate the image into a multiplicity of spectra by using an optical element such as a prism, a diffraction grating, spectral filters, or the like. Accordingly, it is possible to substantially reduce the number of colors to be separated into at the time of photometry, so that an optimum exposure amount can be determined with a small amount of photometric data. In addition, it becomes unnecessary to effect photometry with parallel rays of light, and since photometry can be conducted by using diffused light, the photometrically measuring means can be installed in the exposing section of the copying apparatus. Thus, it becomes possible to render the copying apparatus compact.

In addition, since the correction amount with respect to the image density is determined on the basis of the photometric data on at least three colors among the photometric data on the multiplicity of colors, it is unnecessary to separately provide a photometrically measuring means for obtaining the photometric data on the three colors. Accordingly, since the copying exposure amount is determined on the basis of the photometric data obtained from photometry by a single photometrically measuring means, the copying apparatus can be made further compact. At the same time, in a copying apparatus which uses, for instance, an elongated film as the recording material, a changeover (longitudinal feeding, transverse feeding, etc.) in the film transport and the transport of piece negatives is facilitated, and the operational efficiency of the copying apparatus improves. Furthermore, as compared with a case where the light transmitted through the film is diffused and color-separated, the effect of irregular light can be eliminated.

The photometrically measuring means preferably effects photometry by means of light radiated from a light source for copying and transmitted through or reflected from the image recorded on the film. As a result, it becomes unnecessary to provide a light source for photometry which is separate from the light source for copying, thereby making it possible to make the copying apparatus further compact.

As described above, the image recorded on the recording material is divided into a multiplicity of segments, and the spectral distribution of the image is estimated by using the photometric data obtained by separating the image into four or more colors and photometrically measuring it. An image density, which is equivalent to an image density obtained by photometrically measuring the image by means of the photometrically measuring means exhibiting a spectral sensitivity distribution equivalent to that of the copying material, is determined on the basis of the estimated spectral distribution and the spectral sensitivity distribution of the copying material. Correction amounts are determined on the basis of the photometric data on at least three colors among the stored photometric data on the multiplicity of colors, and a copying exposure amount is determined by correcting the image density with the correction amount. Therefore, it is possible to obtain outstanding advantages in that an optimum exposure amount can be determined with a small amount of photometric data, and that the apparatus can be made compact.

In the fifth aspect of the invention, photometry is effected by dividing the image recorded on the recording material into a multiplicity of pixels and by separating each pixel into a multiplicity of colors consisting of predetermined four or more colors. Pixels to be used for the photometric data in the determination of exposure amount are selected on the basis of the photometric data on at least three colors among the photometric data on the multiplicity of colors. As a method of selecting the pixels, it is possible to use methods disclosed in Japanese Patent Application Laid-Open Nos. 93450/1990 and 198144/1986, or the like. As a result, it is possible to remove the effect of, for instance, highly saturated pixels which exert an adverse effect in the determination of exposure amount.

Then, an average value of the photometric data on the selected pixels is calculated for each color, and an average density, which is equivalent to an average density obtained by conducting photometry by means of the photometrically measuring means exhibiting a spectral sensitivity distribution equivalent to that of the copying material with respect to a region consisting of the selected pixels, is determined by using the first weighting coefficient obtained from the spectral sensitivity distribution of the copying material and the average value of the photometric data for each of the colors. This calculation of the average density can be effected by estimating the spectral distribution of the region consisting of the selected pixels on the basis of the average values for each of the colors of the photometric data of the selected pixels, and by using the estimated spectral distribution and the first weighting coefficient.

In the fifth aspect of the invention, an average value of the photometric data on the pixels for each color is calculated, and an average density, which is equivalent to an average density obtained by conducting photometry by means of the photometrically measuring means exhibiting a spectral sensitivity distribution equivalent to that of the copying material, is determined by using the first weighting coefficient obtained from the spectral sensitivity distribution of the copying material and the average value of the photometric data for each of the colors, in accordance with a formula in which $S(\lambda)$ in Formula (1) above is substituted by the spectral sensitivity distribution $Sp(\lambda)$ of the copying material, so as to determine the exposure amount.

Thus, the spectral distribution of the image can be estimated with high accuracy on the basis of the photometric data obtained by separating the image into four or more colors and by photometrically measuring it. Since an appropriate exposure amount can be obtained from this spectral distribution, it becomes unnecessary to separate the image into a multiplicity of spectra by using an optical element such as a prism, a diffraction grating, spectral filters, or the like. Accordingly, it is possible to substantially reduce the number of colors to be separated into at the time of photometry, and an optimum exposure amount can be determined with a small amount of photometric data. In addition, it becomes unnecessary to effect photometry with parallel rays of light, and since photometry can be conducted by using diffused light, the photometrically measuring means can be installed in the exposing section of the copying apparatus. Thus, it becomes possible to render the copying apparatus compact.

In addition, since the selection of pixels to be used for the determination of exposure amount is effected on the basis of the photometric data on at least three colors among the photometric data on the multiplicity of colors, it is unnecessary to separately provide a photometrically measuring means for obtaining the photometric data on the three colors. Accordingly, since the copying exposure amount is determined on the basis of the data obtained from photometry by a single photometrically measuring means, the copying apparatus can be made further compact. At the same time, in a copying apparatus which uses, for instance, an elongated film as the recording material, a changeover (longitudinal feeding, transverse feeding, etc.) in the film transport and the transport of piece negatives is facilitated, and the operational efficiency of the copying apparatus improves. Furthermore, as compared with a case where the light transmitted through the film is diffused and color-separated, the effect of irregular light can be eliminated.

In the sixth aspect of the invention, photometry is effected by dividing the image recorded on the recording material into a multiplicity of pixels and by separating each pixel into a multiplicity of colors consisting of predetermined four or more colors. Pixels to be used for the determination of exposure amount are selected on the basis of the photometric data on at least three colors among the photometric data on the multiplicity of colors, and a spectral distribution of the selected pixels is estimated on the basis of the photometric data on the selected pixels. In addition, in the same manner as described above, an average density, which is equivalent to an average density obtained by conducting photometry by means of the photometrically measuring means exhibiting a spectral sensitivity distribution equivalent to that of the copying material, is determined with respect to a region consisting of the selected pixels, by using the spectral distribution of the pixels and the first weighting coefficient obtained from the spectral sensitivity distribution of the copying material, thereby to determine an exposure amount.

Thus, since the spectral distribution of each pixel is estimated on the basis of the photometric data obtained by separating each pixel into four or more colors, it becomes unnecessary to separate the image into a multiplicity of spectra by using an optical element such as a prism, a diffraction grating, spectral filters, or the like. Accordingly, it is possible to substantially reduce the number of colors to be separated into at the time of photometry, and an optimum exposure amount can be determined with a small amount of photometric data. In addition, since the spectral distribution of the selected pixels is estimated, it is possible to shorten the calculation period as compared with the case where the spectral distribution of the entire pixels of the image is estimated.

In a case where the photometrically measuring means is constituted by two or more area sensors, one of the area sensors should preferably effect photometry of the three colors, R, G, and B. To select the pixels, it is necessary to effect the positioning of the sensors (so-called registration) with high accuracy. However, since the photometric data obtained from photometry by the other area sensors is used only for obtaining the average density, the accuracy of positioning can be relatively low (no major effect is exerted even if the image is offset by a half pixel portion or by one pixel or thereabouts), so that the positional adjustment of the area sensors serving as the photometrically measuring means can be effected in a short time.

In the seventh aspect of the invention, photometry is effected by dividing the image recorded on the recording material into a multiplicity of pixels and by separating each pixel into a multiplicity of colors consisting of predetermined four or more colors. Pixels to be used for the photometric data in the determination of exposure amount are selected on the basis of the photometric data on at least three colors among the photometric data on the multiplicity of colors. Then, the exposure amount is determined by using the photometric data on the multiplicity of colors of the selected pixels.

Determination of the exposure amount may be effected, for instance, by estimating a spectral distribution of a region consisting of the selected pixels on the basis of the photometric data on the multiplicity of colors of the selected pixels, by determining an average density equivalent to an average density obtained by conducting photometry by means of photometrically measuring means exhibiting a spectral sensitivity distribution equivalent to that of a copying material with respect to the region consisting of the selected pixels by using the estimated spectral distribution of the selected pixels and the spectral sensitivity distribution of the copying material, and by being based on the average density. Also, the exposure amount may be determined by estimating a spectral distribution of the pixels selected on the basis of the photometric data on the multiplicity of colors of the selected pixels, by determining an average density equivalent to an average density obtained by conducting photometry by means of photometrically measuring means exhibiting a spectral sensitivity distribution equivalent to that of a copying material with respect to a region consisting of the selected pixels by using the estimated spectral distribution of the selected pixels and the spectral sensitivity distribution of the copying material, and by being based on the average density.

Accordingly, in the same way as the fifth and sixth aspects of the invention, since it becomes unnecessary to separate the image into a multiplicity of spectra by using an optical element such as a prism, a diffraction grating, spectral filters, or the like, it is possible to substantially reduce the number of colors to be separated into at the time of photometry, and an optimum exposure amount can be determined with a small amount of photometric data.

In the fifth aspect of the invention, photometry is effected by dividing the image into a multiplicity of pixels and by separating each pixel into a multiplicity of colors consisting of predetermined four or more colors; pixels to be used for the photometric data in the determination of exposure amount are selected on the basis of the photometric data on at least three colors among the photometric data on the multiplicity of colors; an average value of the photometric data on the selected pixels is calculated for each color; an average density, which is equivalent to an average density obtained by conducting photometry by means of the photometrically measuring means exhibiting a spectral sensitivity distribution equivalent to that of the copying material with respect to a region consisting of the selected pixels, is determined by using the first weighting coefficient obtained from the spectral sensitivity distribution of the copying material and the average value of the photometric data for each of the colors, thereby to determine an exposure amount. Therefore, it is possible to obtain outstanding advantages in that an optimum exposure amount can be determined with a small amount of photometric data, and that the apparatus can be made compact.

In the sixth aspect of the invention, photometry is effected by dividing the image into a multiplicity of pixels and by separating each pixel into a multiplicity of colors consisting of predetermined four or more colors; pixels to be used for the photometric data in the determination of exposure amount are selected on the basis of the photometric data on at least three colors among the photometric data on the multiplicity of colors; a spectral distribution of the selected pixels is estimated on the basis of the photometric data on the selected pixels; an average density, which is equivalent to an average density obtained by conducting photometry by means of the photometrically measuring means exhibiting a spectral sensitivity distribution equivalent to that of the copying material, is determined with respect to a region consisting of the selected pixels, by using the spectral distribution of the pixels and the first weighting coefficient obtained from the spectral sensitivity distribution of the copying material, thereby to determine an exposure amount. Therefore, it is possible to obtain outstanding advantages in that an optimum exposure amount can be determined with a small amount of photometric data, and that the apparatus can be made compact.

In the seventh aspect of the invention, photometry is effected by dividing the image into a multiplicity of pixels and by separating each pixel into a multiplicity of colors consisting of predetermined four or more colors; pixels to be used for the photometric data in the determination of exposure amount are selected on the basis of the photometric data on at least three colors among the photometric data on the multiplicity of colors; and the exposure amount is determined by using the photometric data on the multiplicity of colors of the selected pixels. Therefore, it is possible to obtain outstanding advantages in that an optimum exposure amount can be determined with a small amount of photometric data, and that the apparatus can be made compact.

In the present invention, it is more effective to set the number of divisions of the image (the number of pixels) for the photometric data for determining the image density to be greater than the number of divisions of the image (the number of pixels) for the photometric data for determining the correction amount with respect to the image density.

In addition, to determine an accurate correction amount with respect to the image density, it is more effective to use small pixels (i.e., to increase the number of pixels). Nevertheless, it does not follow that the smaller the pixels, the more preferable as the photometric data for determining the image density; on the contrary, the smaller the pixels, the more calculating time is required. Therefore, the number of pixels should preferably be as small as possible to such an extent that high photometric accuracy is ensured.

The above and other objects, features and advantages of the invention will become more apparent from the following detailed description of the invention when read in conjunction with the accompanying drawings.

BRIEF DESCRIPTION OF THE DRAWINGS

FIG. 4 is a top plan view of a pattern formed on a substrate of filters constituting an area sensor together with a two-dimensional image sensor;

FIG. 18 is a diagram illustrating 1st to 3rd main-component transmission density distributions of a plurality of negative films;

FIG. 23 is a diagram illustrating the relationship between the first image density and the second image density for explaining correction processing in accordance with the third embodiment;

FIGS. 25A and 25B are flowcharts illustrating exposure control processing in accordance with a fifth embodiment.

DESCRIPTION OF THE PREFERRED EMBODIMENTS

Figure 1:
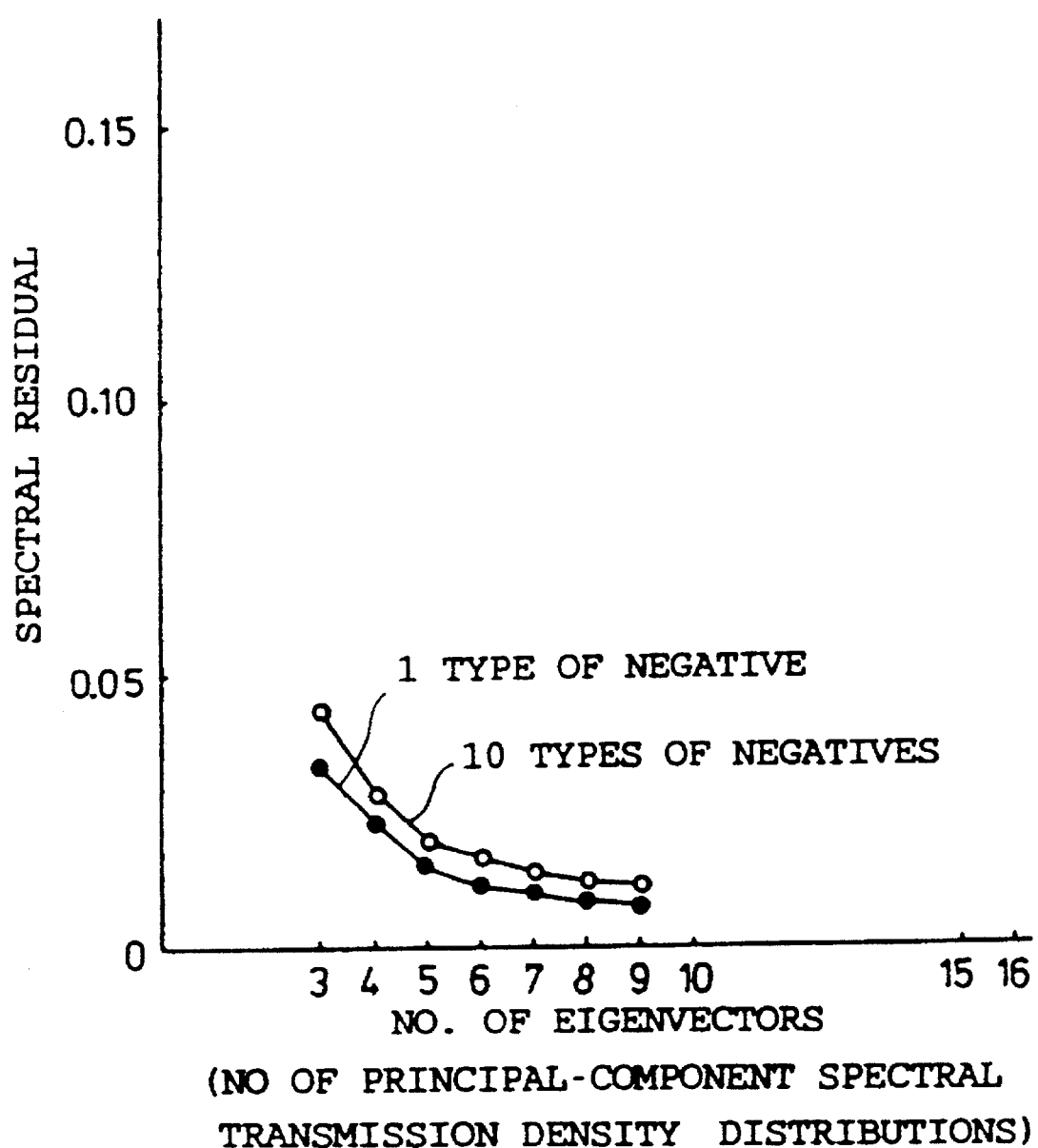
FIG. 1 is a diagram illustrating the relationship between the number of eigenvectors and the spectral residual for explaining the operation of the present invention.

Referring now to the accompanying drawings, a detailed description will be given of a first embodiment of the present invention. It should be noted that although a description will be given by using numerical values which are appropriate for the present invention, the present invention is not to be restricted to the numerical values given herein.

First, as an example of a method of estimating a spectral distribution, a description will be given of a method of estimating a spectral transmittance distribution of an image recorded on a negative film as a recording material by using main-component spectral transmittance distributions.

If it is assumed that a spectral transmittance distribution $\rho(\lambda)$ of an image can be estimated not necessarily by using all of N, i.e., 1st to N-th, main-component spectral transmittance distributions $e_1(\lambda), e_2(\lambda), e_3(\lambda), \ldots, e_N(\lambda)$ but from a linear sum of k, i.e., 1st to k-th, main-component spectral transmittance distributions among them, this spectral transmittance distribution $\rho(\lambda)$ can be expressed by the following Formula (2):

$$\rho(\lambda)=a_1 \cdot e_1(\lambda)+a_2 \cdot e_2(\lambda)+a_3 \cdot e_3(\lambda)+ \ldots +a_k \cdot e_k(\lambda) \quad (2)$$

where $a_1, a_2, \ldots, a_k$ are weighting coefficients.

These N main-component spectral transmittance distributions $e_1(\lambda), e_2(\lambda), e_3(\lambda) \ldots, e_N(\lambda)$ can be determined by preparing M color sample images of a multiplicity of colors (e.g. 72 colors) with respect to one or a plurality of types (e.g. 10 types) of color negative films, and by analyzing the measured results of a spectrometer. That is, spectral transmittances obtained by measuring the sample images for each wavelength, for instance, at intervals of 5 nm to 10 nm with respect to wavelengths ranging from 400 nm to 760 nm are set as $\rho_1$–$\rho_M$, as shown in Formula (3) below. In the case of 10 nm intervals, N=36. It should be noted that $\rho_{11}, \rho_{12}, \ldots, \rho_{N1}$ in Formula (3) indicate spectral transmittances measured at 10 nm intervals, for instance.

$$\begin{aligned} \rho_1 &= (\rho_{11}, \rho_{21}, \rho_{31}, \ldots, \rho_{N1}) \\ \rho_2 &= (\rho_{12}, \rho_{22}, \rho_{32}, \ldots, \rho_{N2}) \\ &\vdots \\ \rho_M &= (\rho_{1M}, \rho_{2M}, \rho_{3M}, \ldots, \rho_{NM}) \end{aligned} \quad (3)$$

Formula (3) is employed in main-component analysis to determine a principal-axis vector ei (where, i=1, 2, ..., N). As for the method of determination, a correlational matrix $\Sigma$ of Formula (4) below is first determined, and eigenvalues and eigenvectors are determined with respect to $\Sigma$.

$$\Sigma = \frac{1}{M} \begin{pmatrix} \sum_{i=1}^{M} \rho 1i^2 & \sum_{i=1}^{M} \rho 1i\rho 2i & \ldots & \sum_{i=1}^{M} \rho 1i\rho Ni \\ \sum_{i=1}^{M} \rho 2i\rho 1i & \sum_{i=1}^{M} \rho 2i^2 & \ldots & \sum_{i=1}^{M} \rho 2i\rho Ni \\ \vdots & \vdots & & \vdots \\ \sum_{i=1}^{M} \rho Ni\rho 1i & \sum_{i=1}^{M} \rho Ni\rho 2i & \ldots & \sum_{i=1}^{M} \rho Ni^2 \end{pmatrix} \quad (4)$$

Since the matrix $\Sigma$ is a symmetric matrix, eigenvalues become 0 or more, and the eigenvalues are set in a descending order as $U_1^2, U_2^2, U_3^2, \ldots U_N^2$, and eigenvectors corresponding to the respective eigenvalues are normalized and set as $e_1, e_2, e_3, \ldots, e_N$.

If the matrix e is set as $e=[e_1, e_2, e_3, \ldots, e_N]$, we have $$e_T \rho e = \begin{pmatrix} U_1^2 & 0 & \ldots & 0 \\ 0 & U_2^2 & \ldots & 0 \\ \vdots & \vdots & & \vdots \\ 0 & 0 & \ldots & U_N^2 \end{pmatrix} \quad (5)$$

(where T is a transposed matrix)
Thus, the matrix is made symmetric. Here, if the vector ei is denoted by $e_i(\lambda)$, the optical transmittance distribution $\rho(\lambda)$ of the color sample can be expressed as $$\rho(\lambda) = \sum_{i=1}^{N} b_i e_i(\lambda) \quad (6)$$

An expression in which the terms up to the k-th term are summed in Formula (6) corresponds to Formula (2). Accordingly, if the weighting coefficients (corresponding to second weighting coefficients) $a_1, a_2, \ldots, a_k$ in Formula (2) are determined, the spectral transmittance distribution $\rho(\lambda)$ of the film image can be estimated. In addition, since the density is the logarithm of the transmittance, the spectral transmission density distribution can also be determined.

Then, a description will be given of a method of determining the weighting coefficients $a_1, a_2, \ldots, a_k$. If the spectral transmittance distribution $\rho(\lambda)$ of the image recorded on the film is expressed as a linear sum of main-component spectral transmittance distributions $e_1(\lambda), e_2(\lambda), \ldots, e_k(\lambda)$ by assuming that the spectral energy distribution of a light source is $P(\lambda)$, and that the spectral sensitivity distributions of k sensors are $S_1(\lambda), S_2(\lambda) \ldots, S_k(\lambda)$, then the outputs of the respective sensors, i.e., photometric values, are expressed as $$\begin{aligned}
\int P(\lambda) \cdot \rho(\lambda) \cdot S_1(\lambda) d\lambda \\
= a_1 \int P(\lambda) \cdot e_1(\lambda) \cdot S_1(\lambda) d\lambda \\
+ a_2 \int P(\lambda) \cdot e_2(\lambda) \cdot S_1(\lambda) d\lambda \\
\ldots \\
+ a_k \int P(\lambda) \cdot e_k(\lambda) \cdot S_1(\lambda) d\lambda \\
\int P(\lambda) \cdot \rho(\lambda) \cdot S_2(\lambda) d\lambda \\
= a_1 \int P(\lambda) \cdot e_1(\lambda) \cdot S_2(\lambda) d\lambda \\
+ a_2 \int P(\lambda) \cdot e_2(\lambda) \cdot S_2(\lambda) d\lambda \\
\ldots \\
+ a_k \int P(\lambda) \cdot e_k(\lambda) \cdot S_2(\lambda) d\lambda \\
\vdots \\
\int P(\lambda) \cdot \rho(\lambda) \cdot S_k(\lambda) d\lambda \\
= a_1 \int P(\lambda) \cdot e_1(\lambda) \cdot S_k(\lambda) d\lambda \\
+ a_2 \int P(\lambda) \cdot e_2(\lambda) \cdot S_k(\lambda) d\lambda \\
\ldots \\
+ a_k \int P(\lambda) \cdot e_k(\lambda) \cdot S_k(\lambda) d\lambda
\end{aligned} \quad (7)$$

Here, if the photometric values $\int P(\lambda) \cdot \rho(\lambda) \cdot S_1(\lambda) d\lambda$, $\int P(\lambda) \cdot \rho(\lambda) \cdot S_2(\lambda) d\lambda, \ldots, \int P(\lambda) \cdot \rho(\lambda) \cdot S_k(\lambda) d\lambda$, are respectively set as $q_1, q_2, \ldots, q_k$, and the photometric values $\int P(\lambda) \cdot e_1(\lambda) \cdot S_1(\lambda) d\lambda$, $\int P(\lambda) \cdot e_2(\lambda) \cdot S_1(\lambda) d\lambda, \ldots, \int P(\lambda) \cdot e_k(\lambda) \cdot S_k(\lambda) d\lambda$ are set as $e_{11}, e_{21}, \ldots, e_{kk}$, and if they are expressed as matrices, we have $$\begin{pmatrix} q_1 \\ q_2 \\ \vdots \\ q_k \end{pmatrix} = \begin{pmatrix} e_{11}, & e_{21}, & \ldots, & e_{k1} \\ e_{12}, & e_{22}, & \ldots, & e_{k2} \\ \vdots & \vdots & & \vdots \\ e_{1k}, & e_{2k}, & \ldots, & e_{kk} \end{pmatrix} \begin{pmatrix} a_1 \\ a_2 \\ \vdots \\ a_k \end{pmatrix} = e_k \begin{pmatrix} a_1 \\ a_2 \\ \vdots \\ a_k \end{pmatrix} \quad (8)$$

$$\begin{pmatrix} a_1 \\ a_2 \\ \cdot \\ \cdot \\ \cdot \\ a_k \end{pmatrix} = \begin{pmatrix} e_{11}, & e_{21}, & \ldots, & e_{k1} \\ e_{12}, & e_{22}, & \ldots, & e_{k2} \\ \cdot & \cdot & & \cdot \\ \cdot & \cdot & & \cdot \\ \cdot & \cdot & & \cdot \\ e_{1k}, & e_{2k}, & \ldots, & e_{kk} \end{pmatrix}^{-1} \begin{pmatrix} q_1 \\ q_2 \\ \cdot \\ \cdot \\ \cdot \\ q_k \end{pmatrix} \quad (9)$$

thus the weighting coefficients $a_1, a_2, \ldots, a_k$ are obtained on the basis of the photometric values and a plurality of main-component spectral transmittance distributions. Then, by substituting these values for Formula (2), the spectral transmittance distribution $\rho(\lambda)$ of the film image can be estimated. In addition, the spectral transmission strength distribution or the spectral transmission density distribution can be estimated from this spectral transmittance distribution.

Accordingly, a spectral distribution of a region consisting of selected pixels can be estimated if the weighting coefficients $a_1, a_2, \ldots, a_k$ are determined on the basis of average values of the photometric data on the selected pixels with respect to the respective colors and on the basis of a plurality of predetermined main-component spectral distributions, and if the linear sum of the plurality of main-component spectral distributions is determined by using these weighting coefficients.

The above-described case is premised on the fact that photometry is conducted by using sensors each displaying a spectral distribution of a predetermined width, but in a case where the spectral distributions of the sensors are narrow bands, photometry is conducted for each wavelength $\lambda_1, \lambda_2, \ldots, \lambda_k$. In this case, a formula corresponding to Formula (7) becomes such as Formula (10) below, while a formula corresponding to Formula (9) becomes such as Formula (11) below.

$$\rho(\lambda_1) = a_1 \cdot e_1(\lambda_1) + a_2 \cdot e_2(\lambda_1) + \ldots + a_k \cdot e_k(\lambda_1) \quad (10)$$

$$\rho(\lambda_2) = a_1 \cdot e_1(\lambda_2) + a_2 \cdot e_2(\lambda_2) + \ldots + a_k \cdot e_k(\lambda_2)$$

$$\rho(\lambda_k) = a_1 \cdot e_1(\lambda_k) + a_2 \cdot e_2(\lambda_k) + \ldots + a_k \cdot e_k(\lambda_k)$$

$$\begin{pmatrix} a_1 \\ a_2 \\ \cdot \\ \cdot \\ \cdot \\ a_k \end{pmatrix} = \begin{pmatrix} e_1(\lambda_1), & e_2(\lambda_1), & \ldots, & e_k(\lambda_1) \\ e_1(\lambda_2), & e_2(\lambda_2), & \ldots, & e_k(\lambda_2) \\ \cdot & \cdot & & \cdot \\ \cdot & \cdot & & \cdot \\ \cdot & \cdot & & \cdot \\ e_1(\lambda_k), & e_2(\lambda_k), & \ldots, & e_k(\lambda_k) \end{pmatrix}^{-1} \begin{pmatrix} \rho(\lambda_1) \\ \rho(\lambda_2) \\ \cdot \\ \cdot \\ \cdot \\ \rho(\lambda_k) \end{pmatrix} \quad (11)$$

Although, in the above, the main-component spectral transmittance distributions have been used, the spectral transmission density distribution can be estimated by using 1st to k-th main-component spectral transmission density distributions obtained by analyzing the spectral transmission density distributions of one or a plurality of types (e.g. 10 types) of sample images, as follows.

First, if a spectral transmission density distribution $D(\lambda)$ is expressed by a linear sum of main-component spectral transmission density distributions $e'_j(\lambda)$ ($j=1, 2, \ldots, k$), we have $$D(\lambda) = \sum_{j=1}^{k} a_j e'_j(\lambda) \quad (12)$$

Meanwhile, the photometric value $q_1$ ($i=1, 2, \ldots, k$) is expressed as follows.

$$q_i = \int P(\lambda) \cdot \rho(\lambda) \cdot S_i(\lambda) d\lambda \quad (13)$$

Since the relationship of $D(\lambda) = -\log \rho(\lambda)$ holds between the transmittance and the density, Formula (13) can be expressed by using $D(\lambda)$, as follows.

$$q_i = \int P(\lambda) \cdot 10^{-D(\lambda)} \cdot S_i(\lambda) d\lambda$$

That is, $$q_i = \int P(\lambda) \cdot 10^{-\sum_{j=1}^{k} a_j e'_j(\lambda)} \cdot S_i(\lambda) d\lambda \quad (14)$$

By solving Formula (14) by making use of an nonlinear optimization method (e.g. Newton-Raphson's method), the coefficient $a_j$ can be obtained. If this coefficient $a_j$ and the spectral transmission density distribution $e'_j(\lambda)$ are used, it is possible to estimate the spectral transmission density distribution from Formula (12). In addition, it is possible to estimate the spectral transmittance distribution and the like from this spectral transmission density distribution.

In the case where the sensitivity distribution of the sensor is a narrow band, in the case of one point at a specific wavelength $\lambda_0$, for example, Formula (14) is expressed as shown below, so that it becomes easy to obtain the solution of $a_j$.

$$q_i = P(\lambda_0) \cdot 10^{-\sum_{j=1}^{k} a_j e'_j(\lambda_0)} \cdot S_i(\lambda_0) \quad (15)$$

In a case where solutions of the coefficients $a_1, a_2, a_3, \ldots, a_k$ are obtained by means of a computer by setting the number of photometric values and the number of main-component spectral transmittance distributions or main-component spectral transmission density distributions to be identical and by using Formulae (9) and (14), there are cases where it is difficult to obtain the solutions. In that case, it suffices if the number of photometric values using the sensors is increased by 1 or a few number and a calculation is conducted as explained below. If the number of the photometric values is increased to an excess, it becomes necessary to use a multiplicity of interference filters as in the conventional case, so that it is preferred that the number of the photometric values be increased by 1 or two. Below, a description will be given of an example in which the number of the photometric values is increased by 1 in a case where the spectral transmittance distribution is estimated by using the main-component spectral transmittance distributions, but the same holds true of a case where the number of the photometric values is increased by 2 or more, or the main-component spectral transmission density distributions are used. If the increased photometric value is assumed to be $q_{k+1}$, Formula (8) is rewritten as $$\begin{pmatrix} q_1 \\ q_2 \\ \cdot \\ \cdot \\ \cdot \\ q_k \\ q_{k+1} \end{pmatrix} = \begin{pmatrix} e_{11}, & e_{21}, & \ldots, & e_{k1} \\ e_{12}, & e_{22}, & \ldots, & e_{k2} \\ \cdot & \cdot & & \cdot \\ \cdot & \cdot & & \cdot \\ \cdot & \cdot & & \cdot \\ e_{1k}, & e_{2k}, & \ldots, & e_{kk} \\ e_{1k+1}, & e_{2k+1}, & \ldots, & e_{kk+1} \end{pmatrix} \begin{pmatrix} a_1 \\ a_2 \\ \cdot \\ \cdot \\ \cdot \\ a_k \end{pmatrix} \quad (16)$$

Formula (16) is expressed as follows:

$$[q] = [e][a] \quad (17)$$

If both sides of Formula (17) are multiplied by a transposed matrix $[e]^T$ of $[e]$, then $[e]^T[e]$ become square matrices, so that if they are substituted by [E], [a] can be expressed from Formula (17) as follows:

$$[e]^T[q] = [e]^T[e][a] \quad (18)$$
$$= [E][a]$$

That is, $[a] = [E]^{-1}[e]^T[q]$

The results shown in FIG. 1 were obtained when the present inventor examined the relationship between the number of main-component spectral transmission density distributions obtained by analyzing spectral transmission density distributions of one type of negative film and the spectral residual of estimated values with respect to measured values, as well as the relationship between the number of main-component spectral transmission density distributions obtained by analyzing the spectral transmission density distributions of 10 types of negative films and the spectral residual. As can be appreciated from FIG. 1, if three, i.e., 1st to 3rd, main-component spectral transmission density distributions were used, with respect to one type of negative film, the spectral residual was small and excellent results were obtained.

Meanwhile, if four, i.e., 1st to 4th, main-component spectral transmission density distributions among the spectral transmission density distributions obtained from 10 types of negative films are used, the spectral residual becomes substantially the same as in the case where the three main-component spectral transmission density distributions were used for one type of negative film. Accordingly, with respect to a plurality of negative films, if at least four main-component spectral transmission density distributions are used, the spectral transmission density distribution can be determined without needing to specify the film type.

Figure 2:
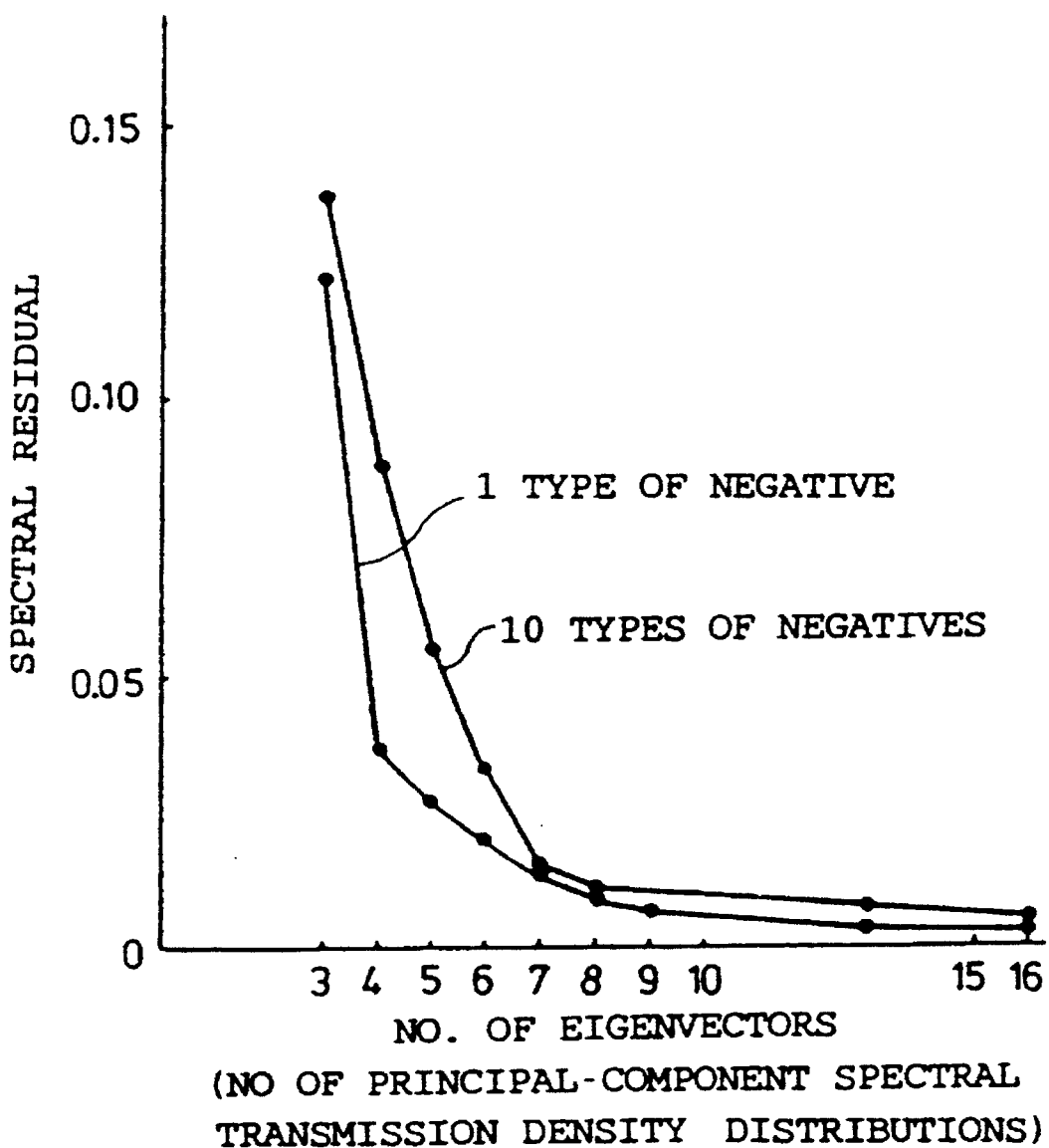
FIG. 2 is a diagram illustrating the relationship between the number of eigenvectors and the spectral residual.

FIG. 2 shows the relationship between the number of main-component spectral transmittance distributions obtained by analyzing spectral transmittance distributions of one type of negative film and the spectral residual, as well as the relationship between the number of main-component spectral transmittance distributions obtained by analyzing the spectral transmittance distributions of 10 types of negative films and the spectral residual. As can be appreciated from FIG. 2, if four, i.e., 1st to 4th, main-component spectral transmittance distributions are used, it is possible to estimate the spectral transmittance distribution with a relatively small spectral residual. In this case, since better estimation accuracy can be obtained if the film type is specified, in a case where four or five main-component spectral transmittance distributions are used, it is preferable to specify the film type.

In addition, it has been verified that if the sum of eight terms, i.e., $$\rho(\lambda) = a_1 \cdot e_1(\lambda) + a_2 \cdot e_2(\lambda) + \ldots + a_8 \cdot e_8(\lambda)$$

is used, namely, if 1st to 8th main-component spectral transmittance distributions are used, the spectral transmittance distribution of a film can be estimated with a density error of 0.03 or thereabouts with respect to all the film types without discriminating the film type.

It should be noted that the minimum value of the main-component spectral transmittance distributions, at a time When the spectral transmittance distributions of a plurality of film types without discriminating the film type are estimated, is 4. This is because if the number of main-component spectral transmittance distributions is set to 3, the estimation accuracy deteriorates, as described above. In addition, if the number is set to 9 or more, although the estimation accuracy improves, there is no major difference with the case where the number is set to 8. Even if the appearance of unknown films in the future is taken into consideration in addition to all the presently available color films, the required number of main-component spectral transmittance distributions is 15 or thereabouts at maximum.

Accordingly, if four or more main-component spectral distributions are determined in advance by analyzing spectral distributions (spectral transmittance distributions or spectral density distributions) of a multiplicity of sample films, and if the image recorded on a recording material is separated into four or more colors and photometrically measured, then the spectral distribution of the image can be estimated with high accuracy on the basis of the photometric data and the four or more main-component spectral distributions.

A description will now be given of an embodiment in which the method of estimating the spectral distribution of a film in accordance with the present invention is applied to a photographic printing method.

Figure 3:
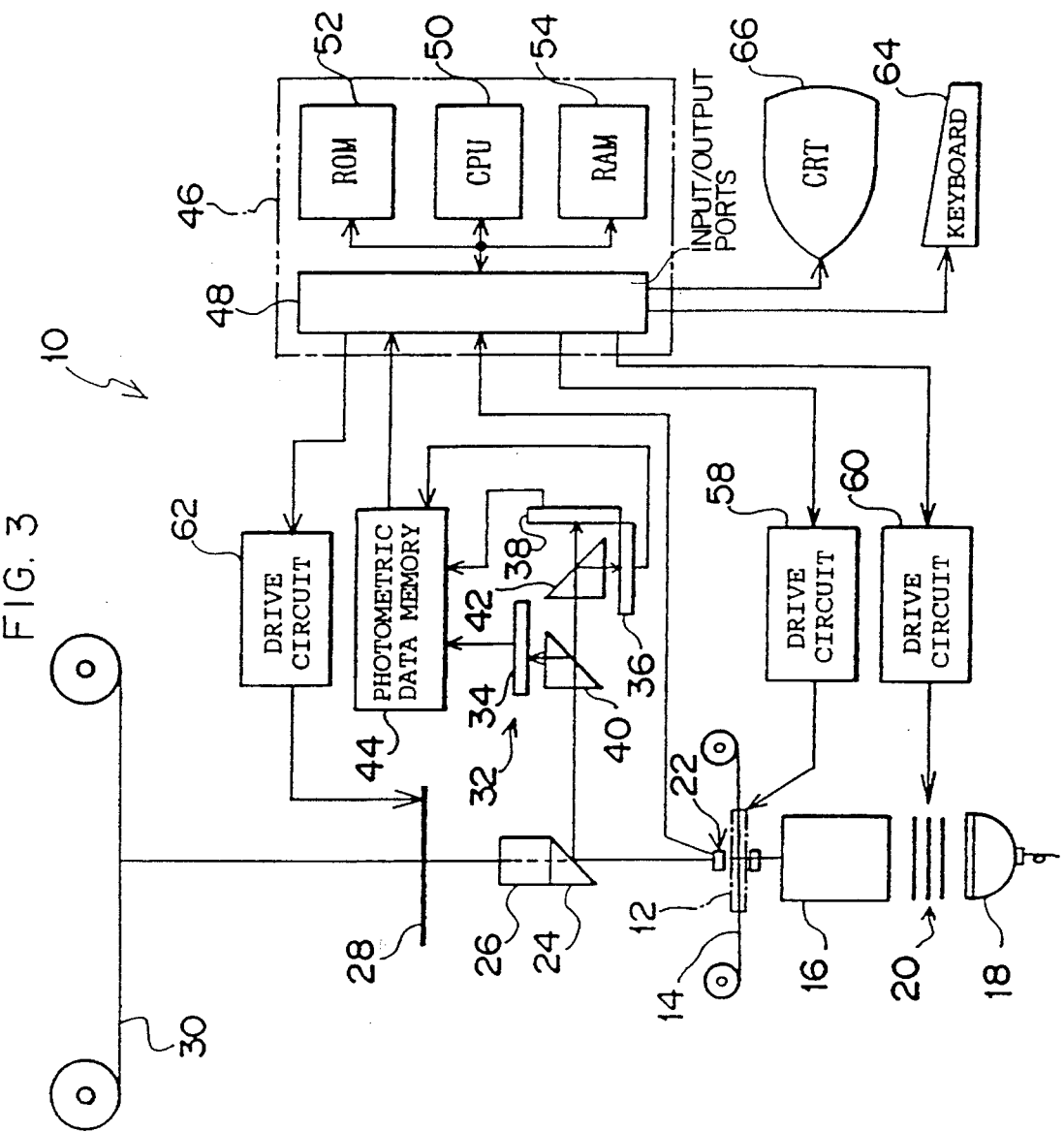
FIG. 3 is a schematic diagram of an automatic printer.

FIG. 3 shows an automatic printer 10 for exposing a color paper to the light transmitted through an image recorded on a color negative film.

A color negative film 14 set on a negative carrier 12 is transported to an exposing position by means of the negative carrier 12. A mirror box 16 and a lamp house 18 having a halogen lamp are arranged below the exposing position. A light-adjusting filter unit 20 is interposed between the mirror box 16 and the lamp house 18. The light-adjusting filter unit 20 is comprised of three filters, yellow (Y), magenta (M), and cyan (C) filters, as well as an neutral density (ND) filter which serves as a reference filter and will be described later.

A DX code indicating the type of negative film 14 is recorded on an edge of the negative film 14, and a notch is formed therein. To detect the DX code and the notches, a detector 22 constituted by a light-emitting element and a light-receiving element is arranged in such a manner as to sandwich the edge of the negative film 14.

A prism 24, a lens 26, a black shutter 28, and a color paper 30 are arranged above the exposing position in that order. The prism 24 causes part of the light emitted from the lamp house 18 and made incident through the light-adjusting filter unit 20, the mirror box 16, and the negative film 14 to be reflected substantially orthogonally toward a photometric unit 32. Meanwhile, the light transmitted through the prism 24 is focused on the color paper 30 by means of the lens 26.

The photometric unit 32 is comprised of three area sensors 34, 36, and 38 and two prisms 40 and 42. Of the light reflected by the prism 24, the prism 40 allows one third of the quantity of light to be reflected sideways so as to be made incident upon the area sensor 34, and the remainder of the light to be transmitted therethrough. The light transmitted through the prism 40 is made incident upon the prism 42. Of the light made incident upon the prism 42, the prism 40 allows one half of the quantity of light to be reflected sideways so as to be made incident upon the area sensor 36, and the remainder of the light to be transmitted therethrough so as to be made incident upon the area sensor 38. Accordingly, one third of the quantity of light of the light made incident upon the photometric unit 32 is made incident upon each of the area sensors 34, 36, and 38.

It should be noted that a half mirror may be used instead of the prism 24. Also, a mirror for reflecting one third of the quantity of light of the incident light may be used instead of the prism 40, and a half mirror for reflecting one half of the quantity of light of the incident light may be used instead of the prism 42. Furthermore, the arrangement of the area sensors 34, 36, and 38 and the prisms 40 and 42 of the photometric unit 32 is not restricted to the example shown in FIG. 3, and it suffices if the arrangement provided is such that a substantially equal amount of light is made incident upon each area sensor. In addition, although in the foregoing example the photometric unit 32 is arranged in a direction perpendicular to the direction emergence of the light from the light source, the photometric unit 32 may be arranged at an angle other than 90°, i.e., diagonally, with respect to the light.

The area sensor 38 is comprised of filters and a two-dimensional image sensor. FIG. 4 shows an area sensor disclosed in Japanese Patent Application Laid-Open No. 180660/1987, in which the filters are arranged such that a multiplicity of filters, each having a configuration in which three substantially square blocks are arranged in an L-shape, are formed on a substrate. The multiplicity of filters formed on the substrate are classified into three types according to the transmission wavelength bands. The central wavelengths of the respective transmission wavelength bands corresponding to the sensitivity wavelength bands of the three colors, R, G, and B of the color paper 30 are approx. 430 nm (B: blue), approx. 510 nm (G: green), and approx. 590 nm (R: red), and their half-widths are approx. 20 nm, respectively.

The light made incident upon the area sensor 38 is radiated to these filters, is color-separated into different wavelength bands according to the filters at the radiated positions, and is made incident upon the two-dimensional image sensor. The two-dimensional image sensor has a multiplicity of light-receiving elements. These light-receiving elements are arrayed in such a manner as to correspond one-to-one with the substantially square blocks forming the filter. Hence, the light which has passed through the single L-shaped filter is received by three light-receiving elements.

As shown in FIG. 4, the light which has been transmitted through one pixel (the size of one pixel being approx. 1 mm square on the film) of the image recorded on the negative film 14 is radiated to filter portions having an area consisting of three substantially L-shaped filters. Accordingly, the light which has been transmitted through one pixel is received by nine light-receiving elements of the two-dimensional image sensor. As is apparent from FIG. 4, of the nine light-receiving elements, every three light-receiving elements receive the light which has passed through the filters of the same type. Accordingly, in the area sensor 38, the image recorded on the negative film 14 is resolved for each pixel, and the light transmitted through each pixel is separated into the colors, B, G, and R, respectively, and is photometrically measured. Thus, since the sum of outputs from the three light-receiving elements for the respective colors, which are arranged in a dispersed manner, is used as an output value of one pixel, the dependence on the positions of the three colors within one pixel, which is a problem in color separation using an area sensor, is reduced.

Figure 5:
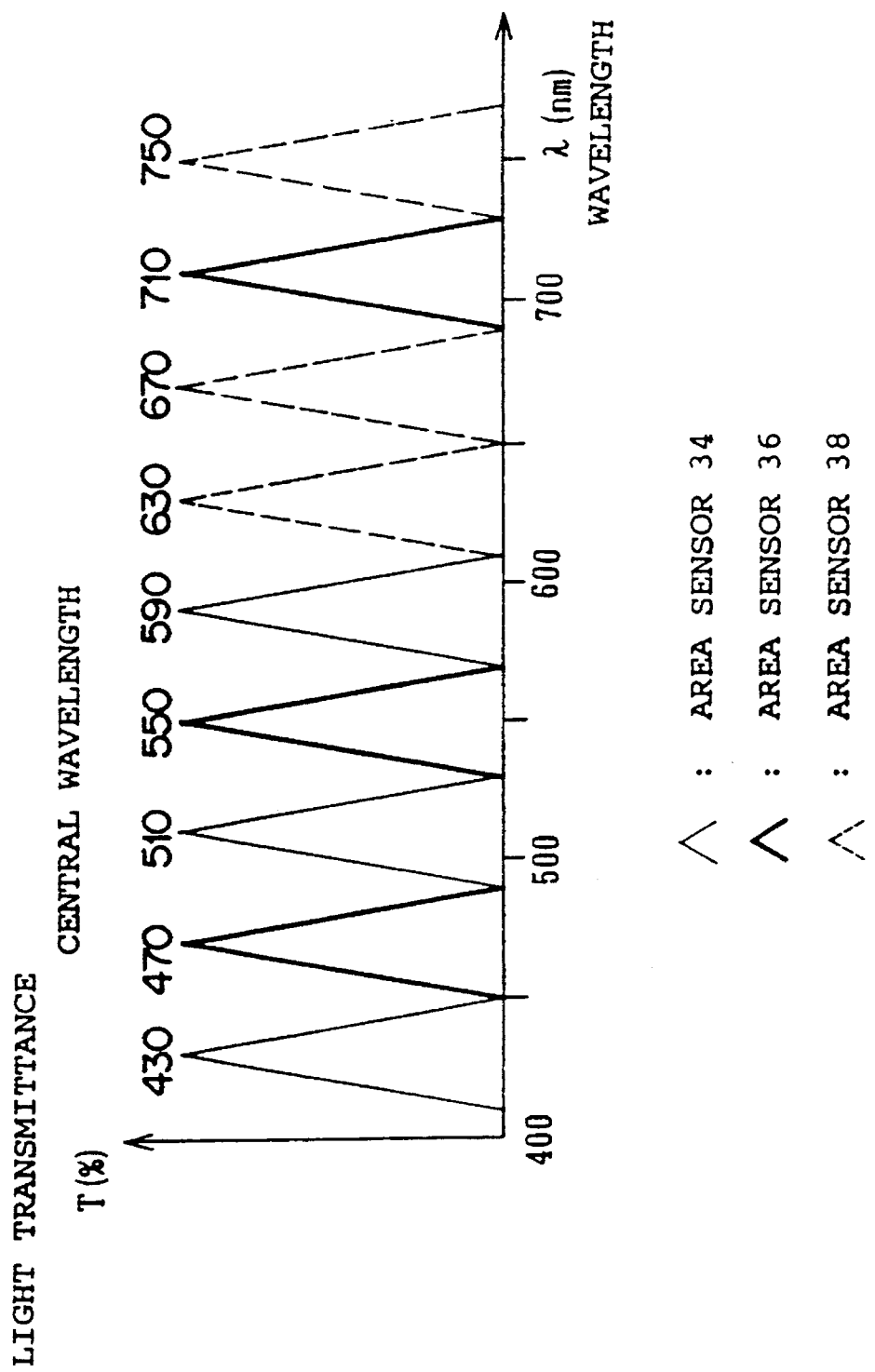
FIG. 5 is a diagram illustrating the spectral sensitivity characteristic of a photometrically measuring section.

The area sensor 34 is comprised of a two-dimensional image sensor and three filters having central wavelengths of approx. 430 nm, approx. 510 nm, and approx. 590 nm and half-widths of approx. 20 nm, respectively. The area sensor 34 makes it possible to color-separate the incident light into the aforementioned three wavelength bands by means of the filters, and to divide the light into a multiplicity of portions by means of the two-dimensional image sensor to effect photometry. Similarly, the area sensor 36 is comprised of a two-dimensional image sensor and three filters having central wavelengths of approx. 630 nm, approx. 670 nm, and approx. 750 nm and half-widths of approx. 20 nm, respectively, and makes it possible to color-separate the incident light into the aforementioned three wavelength bands and to divide the light into a multiplicity of portions to effect photometry. Accordingly, through photometry by these area sensors 34 and 36, it is possible to obtain photometric data color-separated for each wavelength band with respect to the overall image plane of the image or a portion of the image plane. Thus, in the photometric unit 32, the incident light is separated into nine colors by the area sensors 34, 36, and 38, as shown in FIG. 5, to effect photometry.

The area sensors 34, 36, 38 of the photometric unit 32 are connected to a controller 46 constituted by a microcomputer, via a photometric data memory 44 for storing the photometric data obtained from photometry by the photometric unit 32. It should be noted that the photometric unit 32, the photometric data memory 44, and the controller 46 constitute an exposure-amount determining device of the present invention. The controller 46 comprises input/output ports 48, a central processing unit (CPU) 50, a read-only memory (ROM) 52, a random-access memory (RAM) 54, and buses 56 constituted by data buses and control buses for connecting them.

Figure 6:
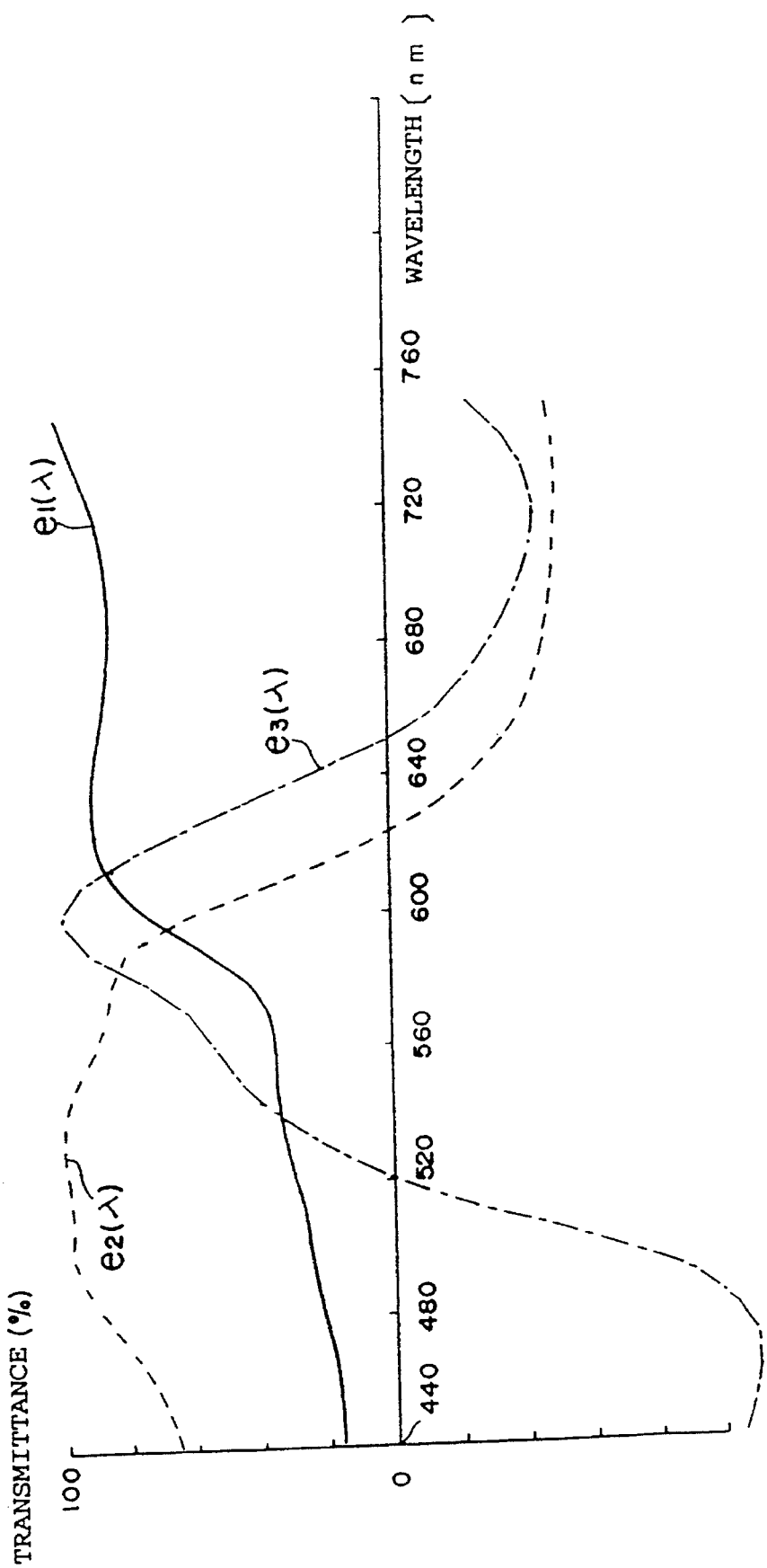
FIG. 6 is a diagram illustrating 1st to 3rd main-component spectral transmittance distributions of a plurality of negative films.
Figure 7:
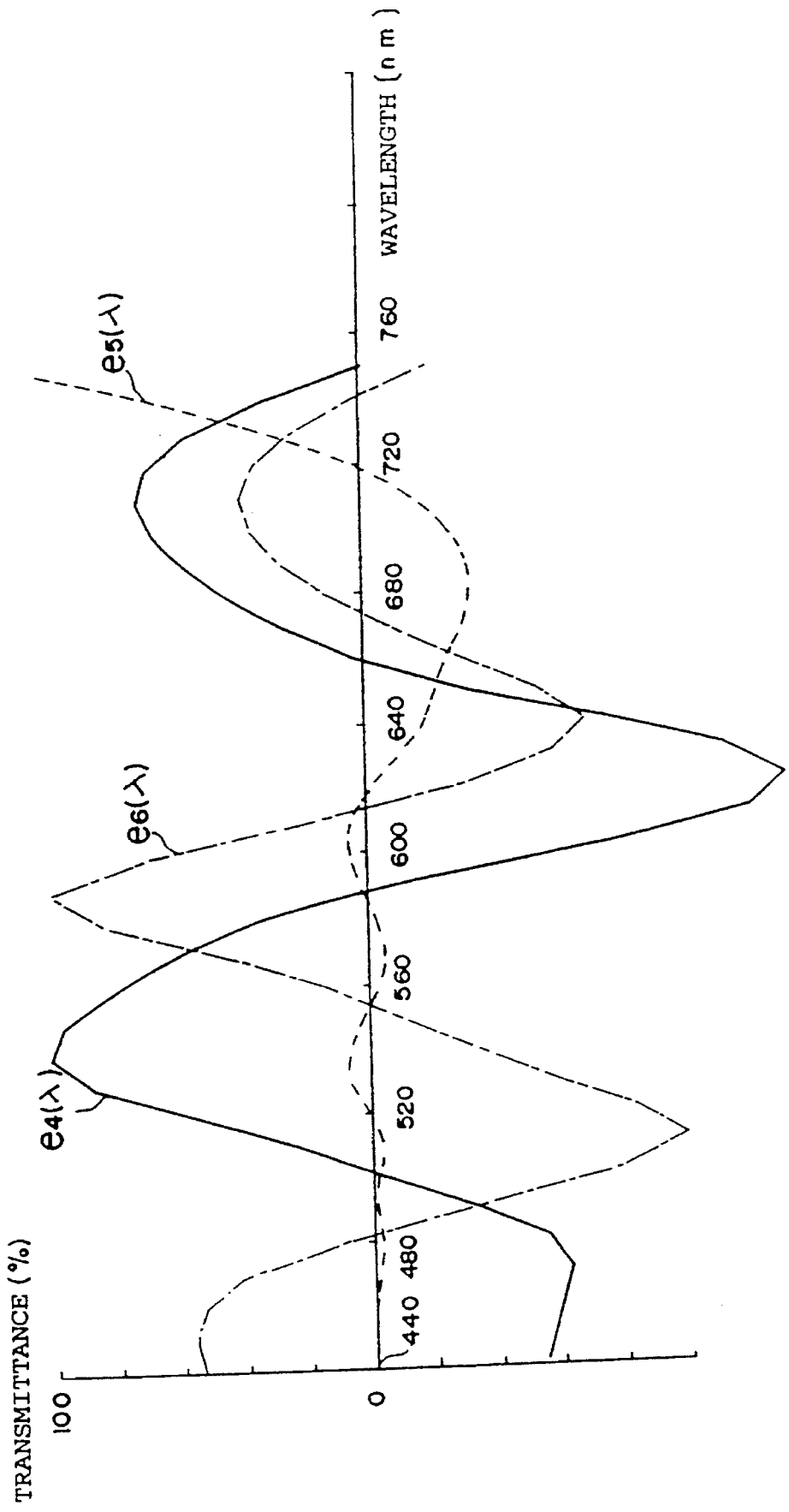
FIG. 7 is a diagram illustrating 4th to 6th main-component spectral transmittance distributions of the plurality of negative films.
Figure 8:
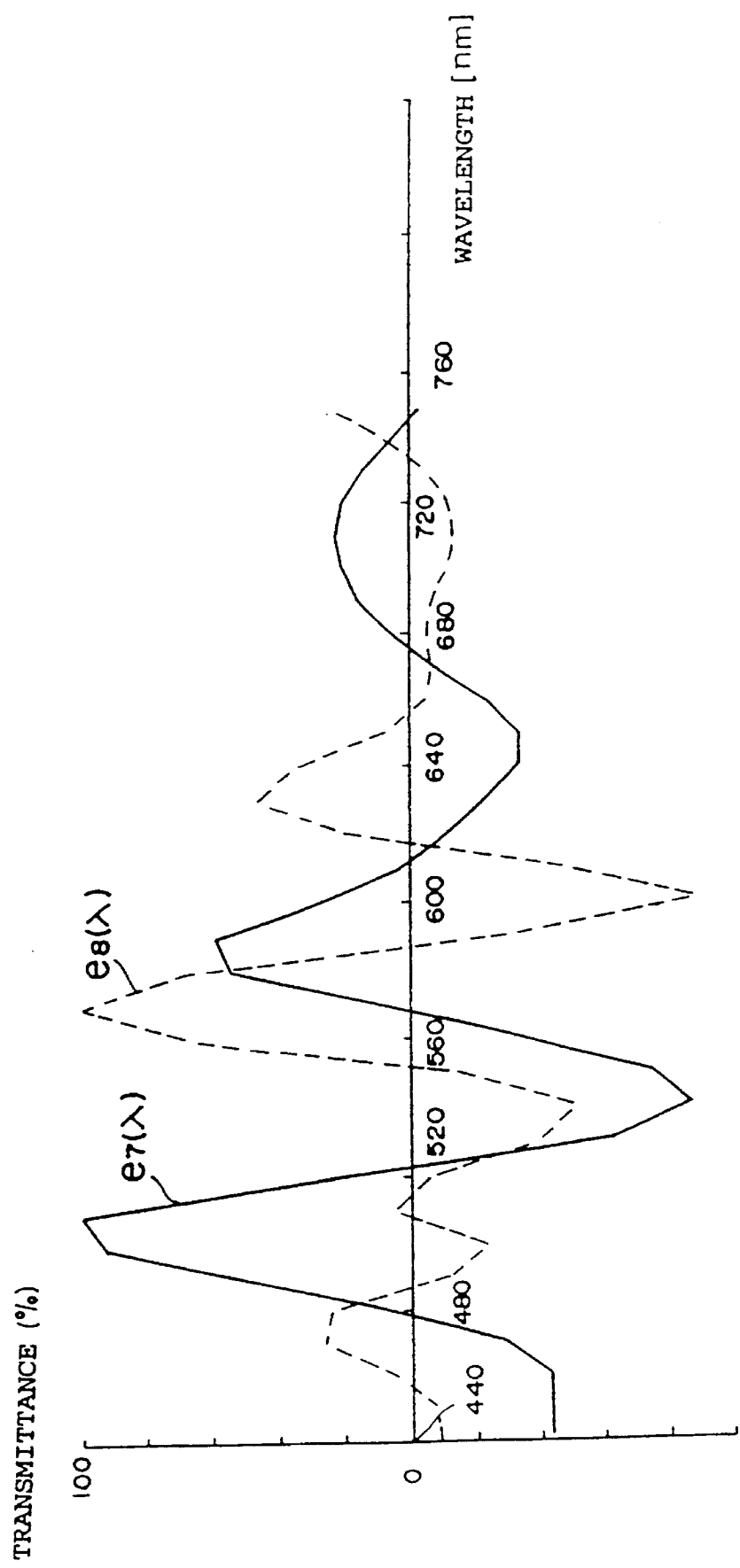
FIG. 8 is a diagram illustrating 7th and 8th main-component spectral transmittance distributions of the plurality of negative films.

Stored in the ROM 52 are the program of an exposure-amount control routine, which will be described later, and eight main-component spectral transmittance distributions (normalized at a transmittance of 100%) $e_1(\lambda)$, $e_2(\lambda)$, $e_3(\lambda)$, $e_8(\lambda)$ expressed in terms of the transmittance with respect to the wavelength and shown in FIGS. 6 to 8. It should be noted that the main-component spectral transmittance distributions in FIGS. 6 to 8 are determined by analyzing the spectral transmittance distributions of 10 types of film. Also stored in advance in the ROM 52 are the spectral energy distribution of the halogen lamp in the lamp house 18, the spectral sensitivity distribution $Si(\lambda)$ of the color paper 30 used, and the spectral sensitivity distributions of the area sensors 34, 36, and 38.

Figure 19:
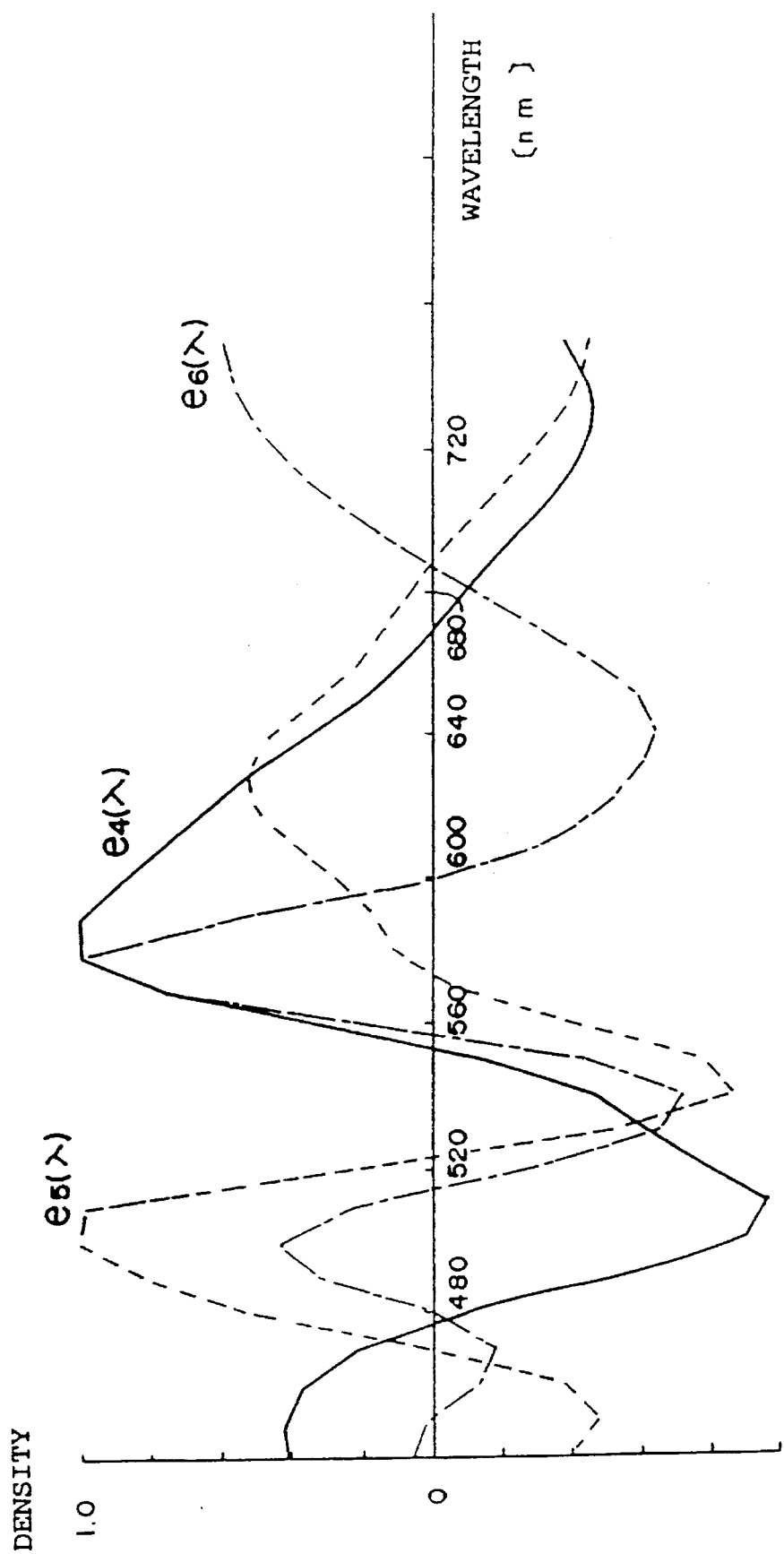
FIG. 19 is a diagram illustrating 4th to 6th main-component transmission density distributions of the plurality of negative films.
Figure 20:
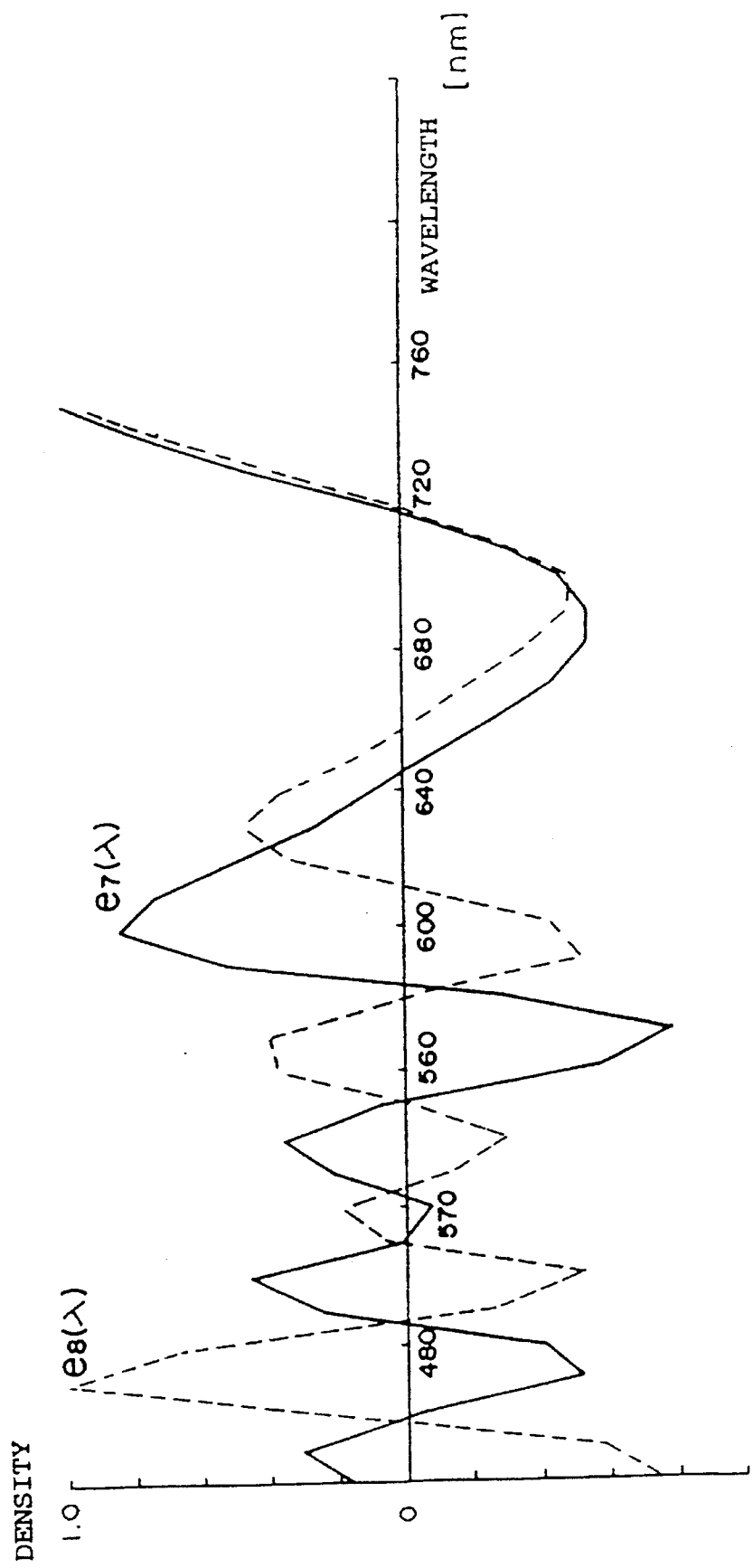
FIG. 20 is a diagram illustrating 7th and 8th main-component transmission density distributions of the plurality of negative films.

It should be noted that, instead of the aforementioned main-component spectral transmittance distributions, it is possible to store eight main-component transmission density distributions (normalized at a density of 1.0) expressed in terms of the transmission density with respect to the wavelength, as shown in FIGS. 18 to 20.

The controller 46 is connected to the photometric data memory 44 via the input/output ports 48, and controls the write and read timings of the photometric data memory 44 and fetches the photometric data stored in the photometric data memory 44. Also connected to the input/output ports 48 of the controller 46 are a drive circuit 58 for driving the detector 22 and the negative carrier 12, a drive circuit 60 for driving the CC filters of the light-adjusting filter unit 20, and a drive circuit 62 for driving the black shutter 28. The controller 46 controls the operation of the negative carrier 12 in correspondence with the presence or absence of notch detection, and controls the driving of the light-adjusting filter unit 20 and the black shutter 28 during exposure. Additionally, a key board 64 for entering data and a CRT 66 for displaying the results of processing are connected to the input/output ports 48.

Figure 9:
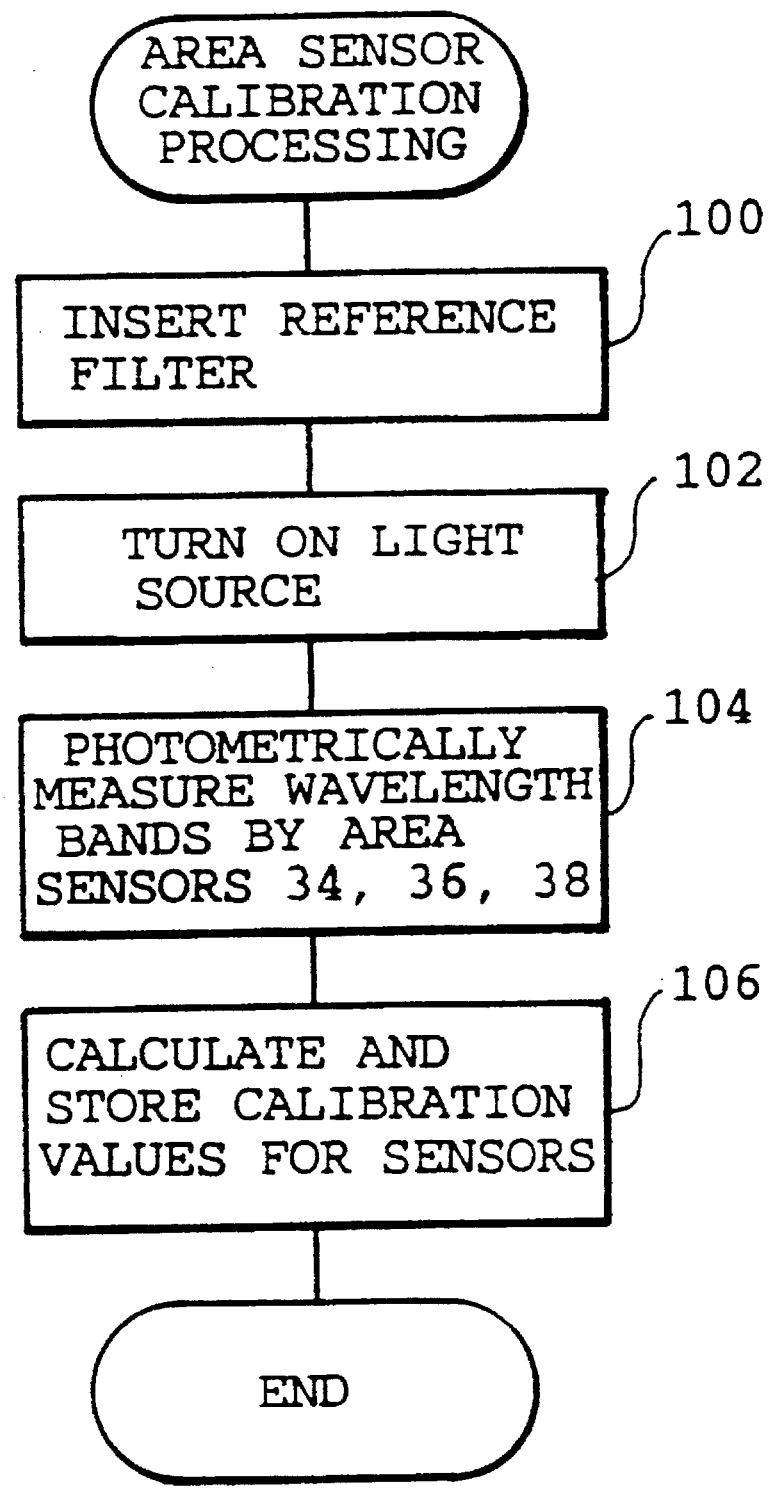
FIG. 9 is a flowchart illustrating calibration processing of an area sensor.

Next, referring to the flowcharts shown in FIGS. 9, 10A, and 10B, a description will be given of the operation of this first embodiment. First, with reference to the flowchart shown in FIG. 9, a description will be given of calibration processing for the area sensors 34, 36, and 38 of the photometric unit 32. This calibration processing is for correcting the variation in the quantity of light of the light source, the nonuniformity in the quantity of light made incident upon the photometric unit 32 and irregularity in color, variations in the sensitivity of each area sensor, and the like. This calibration processing is carried out, for instance, when the power source of the automatic printer 10 is turned on and when the light source lamp is replaced.

In Step 100, the reference filter of the light-adjusting filter unit 20 is inserted into the optical path of the light emitted from the lamp house 18. As a result, the quantity of light made incident upon the area sensors 34, 36, and 38 is reduced, thereby making it possible to prevent the output signals from the area sensors from becoming saturated with respect to the quantity of incident light. In Step 102, the light source lamp in the lamp house 18 is turned on. As a result, the light which is transmitted through the reference filter is made incident upon each area sensor of the photometric unit 32.

The light made incident upon the photometric unit 32 is color-separated into nine kinds of wavelength bands by the filters of the area sensors 34, 36, and 38. In an ensuing Step 104, the quantity of light in each of the aforementioned wavelength bands is measured by the area sensors 34, 36, and 38. In Step 106, a comparison is made between the data measured in Step 104 and the spectral energy distribution of the light source lamp stored in advance in the ROM 52, and differences in the aforementioned nine kinds of wavelength bands are respectively calculated as calibration data to be set for each area sensor. On the basis of the differences thus calculated, the calibration data are calculated to correct the variation in the quantity of light, the nonuniformity in the quantity of light, irregularity in color, variations in the sensitivity of each sensor, and the like, and are stored in the RAM 54, and this calibration processing ends.

Referring now to the flowcharts shown in FIGS. 10A and 10B, a description will be given of exposure control processing in accordance with this first embodiment. In Step 120, the negative carrier 12 is driven via the drive circuit 58 to transport the negative film 14. In the meantime, the presence or absence of a notch formed in the negative film 14 is detected by the detector 22. In Step 122, a determination is made as to whether or not the notch has been detected by the detector 22. While NO is being given in the determination in Step 122, Steps 120 and 122 are repeated, and the transport of the negative film 14 is continued.

When the notch is detected, and YES is given as the answer in the determination in Step 122, the transport of the negative film 14 is stopped, and the operation proceeds to Step 124 in a state in which the image recorded on the negative film 14 is stopped at an exposing position. In Step 124, the light transmitted through the image and made incident upon the photometric unit 32 is color-separated into the respective wavelength bands to effect photometry. This photometry is carried out by scanning with the multiplicity of light-receiving elements of the area sensors and by fetching the photometric data outputted from the light-receiving elements.

In Step 126, the calibration data determined in the above-described calibration processing are fetched, the photometric data are calibrated by the calibration data and are stored in the photometric data memory 44. As a result, errors due to the effects of the variation in the quantity of light, the nonuniformity in the quantity of light, irregularity in color, and variations in the sensitivity of each sensor are eliminated from the photometric data. In an ensuing Step 128, the eight main-component spectral transmittance distributions are fetched from the ROM 52. In Step 130, the spectral transmittance distribution $T(\lambda)$ (or the spectral transmission density distribution) of the overall image plane of the image is estimated by using the photometric data as well as the main-component spectral transmittance distributions and the spectral sensitivity distribution of each area sensor fetched from the ROM 52, as described above.

Figure 12:
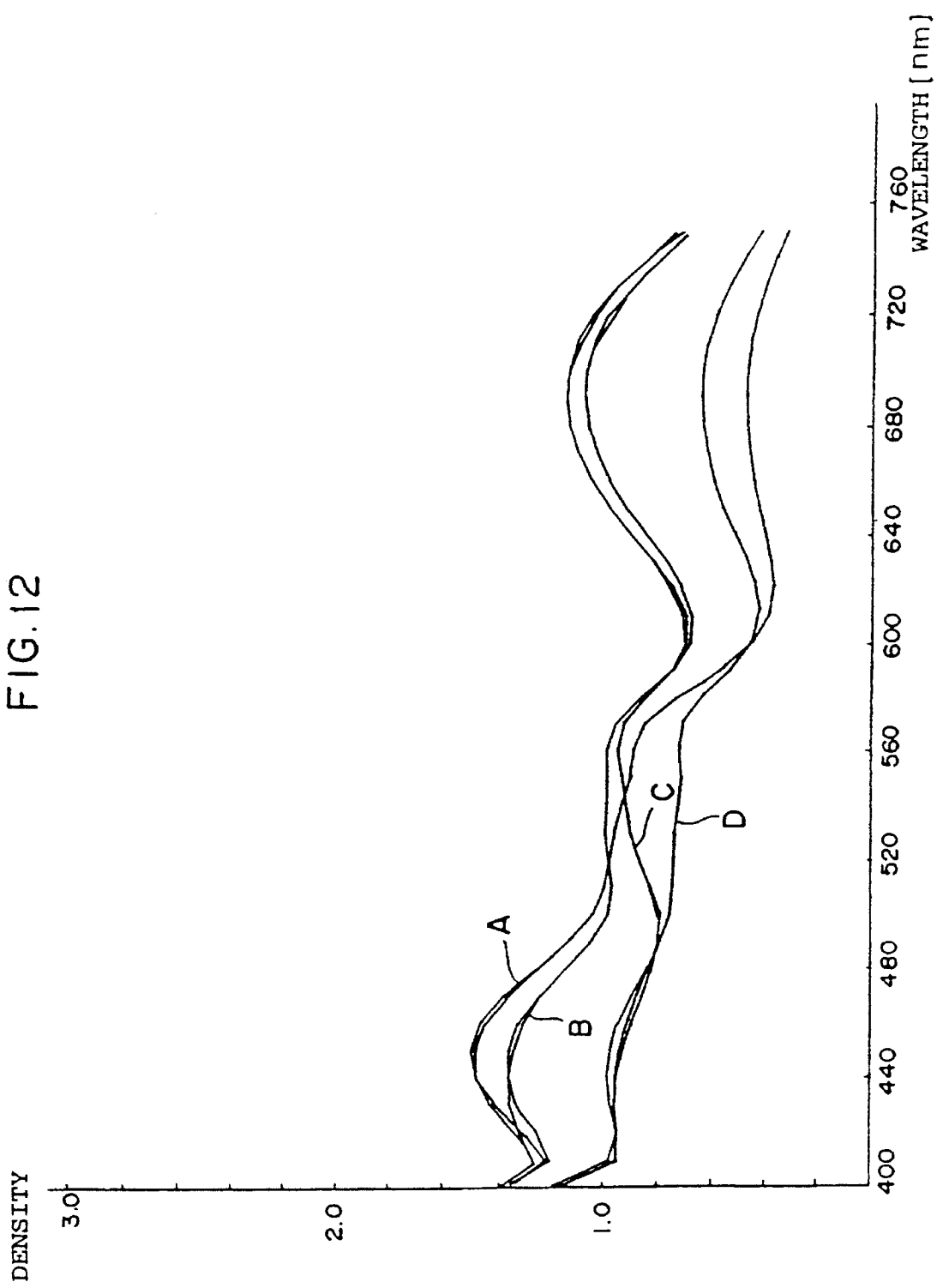
FIG. 12 is a diagram illustrating a comparison between estimated spectral transmission density distributions and actually measured spectral transmission density distributions.

The spectral transmittance distribution or the spectral transmission density distribution thus estimated agrees with actually measured values with high accuracy, as shown in FIG. 12 which is given by way of an example. In FIG. 12, actually measured values and estimated values of the spectral transmission density distributions are plotted with respect to four kinds of images A, B, C, and D. Although errors within a permissible range occurred in the wavelength regions in the vicinities of 440 nm, 620 nm, and 720 nm, virtual agreement can be noted in the other regions. Although the spectral distribution of the overall image plane of the image is estimated, it is possible to estimate the spectral distribution of a predetermined region (a portion of the image plane) selected by a predetermined method.

In an ensuing Step 132, the spectral sensitivity distribution $Si(\lambda)$ of the color paper 30 is fetched from the ROM 52. In Step 134, an image density is determined which is equivalent to the image density determined by conducting photometry by the photometric unit 32 exhibiting a spectral sensitivity distribution identical to the spectral sensitivity distribution $Si(\lambda)$ of the color paper 30. As the photometric data for determining the image density, an average value obtained by combining a plurality of (e.g. four) adjacent pixels is used. In this embodiment, a calculation is made by using an average density MD1i as the image density and by using the spectral transmittance distribution $T(\lambda)$ of the image estimated in Step 130 and the spectral sensitivity distribution $Si(\lambda)$ of the color paper 30 in accordance with the following formula (19):

$$MDli = -\log \left[ \sum_{\lambda=\lambda_{mini}}^{\lambda_{maxi}} T(\lambda) \cdot Si(\lambda) \right] \quad (19)$$

where i represents any one of R, G, and B, $\lambda_{min}$ is a minimum value of an adding section (corresponding to the wavelength band of any one of R, G, and B), and $\lambda_{max}$ is a maximum value of the adding section. Although $Si(\lambda)$ is the spectral sensitivity distribution of the color paper as described above, $Si(\lambda)$ in Formula (19) above serves as a coefficient for weighting the spectral transmittance distribution of the image in correspondence with the spectral sensitivity distribution of the color paper 30. Therefore, it is possible to obtain the average density MD1i which is equivalent to an average density obtained by conducting photometry by a photometrically measuring means exhibiting a spectral sensitivity distribution matching the spectral sensitivity distribution of the color paper 30.

When the type of the color paper 30 is changed, the spectral sensitivity distributions $Si(\lambda)$ of a plurality of types of color paper 30 may be stored in advance in the ROM 52, and the spectral sensitivity distribution $Si(\lambda)$ of the color paper 30 to be used may be selected by means of the keyboard 64. Alternatively, the spectral sensitivity distributions of a plurality of types of color paper 30 stored in an external storage means such as a floppy disk may be fetched to the RAM 54, as necessary.

Figure 11:
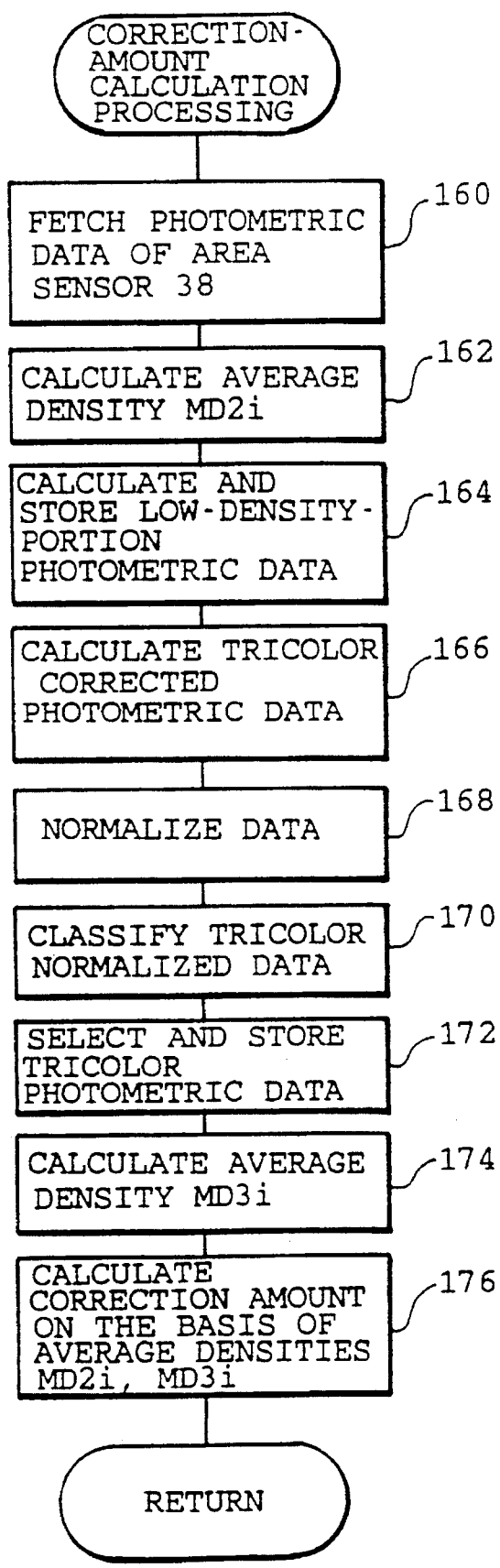
FIG. 11 is a flowchart illustrating details of correction-value calculation processing.

In an ensuing Step 136, an amount of correction for correcting the average density MD1i is calculated. If a detailed description is given of this correction-amount calculation processing with reference to the flowchart shown in FIG. 11, in Step 160, of the photometric data stored in the photometric data memory 44, photometric data D2ij on the three colors obtained from photometry by the area sensor 38 is fetched to the RAM 54. In an ensuing Step 162, the average density MD2ji of the fetched photometric data D2ij on the three colors is calculated in accordance with the following Formula (20):

$$MD2i = -\log\left[\frac{1}{n}\sum_{J=1}^{n} D2ij\right] \quad (20)$$

where n denotes the number of pixels of the image, i denotes any one of R, G, and B, and j denotes a number allotted to each pixel.

In Step 164, tricolor low-density-portion photometric data MIN(R), MIN(G), and MIN(B) are calculated on the basis of a value, e.g., an average mask density, stored in advance in the ROM 52 and are stored in the RAM. It should be noted that this average mask density is obtained by averaging mask densities or mean minimum densities of various types of film. Specifically, a comparison is made between a value which is larger than the average mask density by a predetermined value $\alpha$ (e.g., a value of 0 to 0.6) and a lowest density value of the tricolor photometric data or an average value of the tricolor photometric data, and if (average mask density+$\alpha$)>(lowest density value of the tricolor photometric data or the average value of the tricolor photometric data), the lowest density value of the tricolor photometric data or the average value of the tricolor photometric data is set as the low-density-portion photometric data. Meanwhile, if (average mask density+$\alpha$)<(lowest density value of the tricolor photometric data or the average value of the tricolor photometric data), the value which is larger than the average mask density by the predetermined value $\alpha$ is set as the low-density-portion photometric data.

In an ensuing Step 166, the tricolor corrected photometric data R, G, and B are calculated by subtracting the low-density-portion photometric data MIN(R), MIN(G), and MIN(B) from the respective tricolor photometric data. This corrected photometric data assumes an approximate characteristic irrespective of the type of film, as described in Japanese Patent Application Laid-Open No. 230148/1991.

Figure 13:
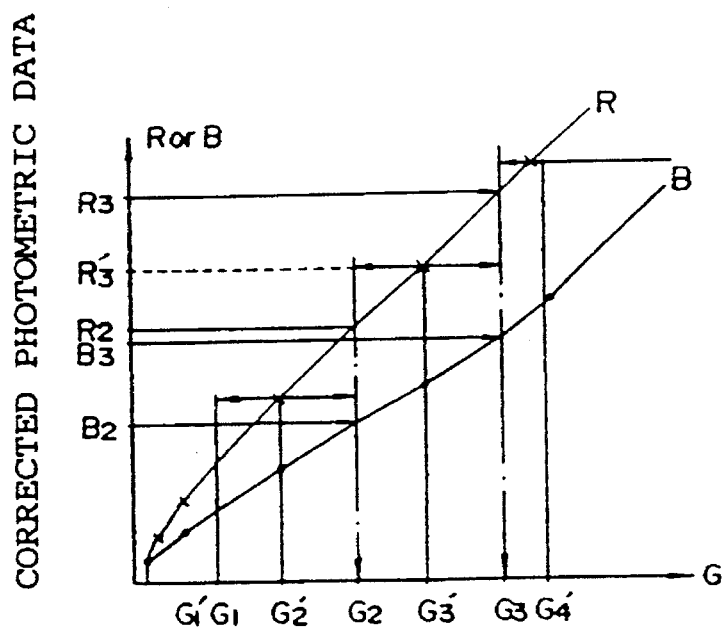
FIG. 13 is a diagram illustrating normalized curves.

In an ensuing Step 168, the corrected photometric data R and B are transformed into the density of G by using normalization curves shown in FIG. 13 so as to be normalized, thereby calculating tricolor normalized photometric data.

The film density and the gradation balance vary depending on the exposure level and the type of film, so that when an identical object is photographed, the image density and color vary due to the exposure level and the type of film. The normalization processing is provided to obtain a fixed density and color on the negative film, irrespective of the exposure level and the type of film, by correcting the same for the identical object. In addition, a normalization table is prepared on the basis of a curve (FIG. 13) indicating the relationship between the average value of the photometric data G and the average value of the photometric data R, as well as a curve (FIG. 13) indicating the relationship between the average value of the photometric data G and the average value of the photometric data B, all of these data being stored in the RAM.

The aforementioned corrected photometric data R and B are transformed into the density of G by using the aforementioned normalization table. As shown in FIG. 13, the average value $R_3'$ of the corrected photometric data $R_2$ to $R_3$ is transformed into the average value $G_3'$ of $G_2$ and $G_3$, and the average value $B_3'$ (not shown) of corrected photometric data of $B_2$ to $B_3$ is similarly transformed into the average value $G_3'$. At this time, the corrected photometric data G is used as it is without being transformed. As a method for this normalization, it is possible to use the methods disclosed in Japanese Patent Application Laid-Open Nos. 1039/1978 and 144158/1987.

Through such normalization of corrected photometric data, it is possible to use the same color coordinates even if the film density and the film type differ, and it is possible to set the origin of the coordinate at an arbitrary color. If it is assumed that the average value of the photometric data on a multiplicity of films is gray, the three colors of the normalized data on a gray object assume an identical density by means of the above-described normalization. In practice, since the average value of the photometric data on a multiplicity of films is slightly different from gray, a correction is made by an amount corresponding to that difference.

Figure 14:
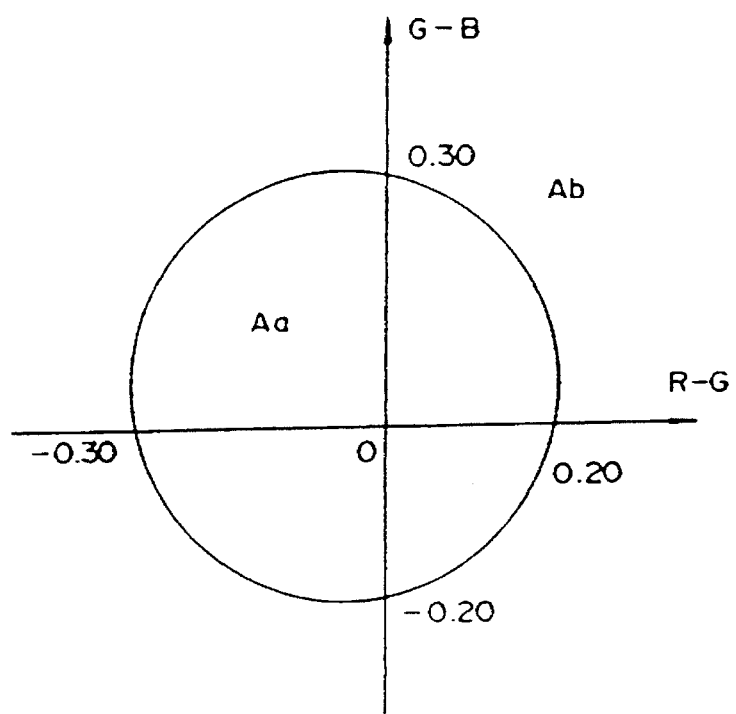
FIG. 14 is a diagram illustrating color coordinates for classifying tricolor normalized data.

In an ensuing Step 170, as shown in FIG. 14, the tricolor normalized data is classified by determining the color region to which the tricolor normalized data belongs, i.e., between a color region $A_a$ including the origin or a color region $A_b$ excluding the color region $A_a$, both regions being set on color coordinates with the difference, R–G, between the normalized data R and G taken as the abscissa and the difference, G–B, between the normalized data G and B taken as the ordinate. The tricolor normalized data is classified with the boundary between the color region $A_a$ and the color region $A_b$ serving as a line of demarcation, so that the tricolor normalized data is classified into data belonging to a region where the color difference from a reference value (origin) is small and into data belonging to a region where the color difference from the reference value is large.

The following table shows an example of color regions, tricolor normalized data classified for each of these color regions, and tricolor photometric data corresponding to the tricolor normalized data.

TABLE 1

| Region | Photometric No. | Tricolor Photometric Data | | | Tricolor Normalized Data | | |
|---|---|---|---|---|---|---|---|
| | | R | G | B | R | G | B |
| Aa | 1 | 0.72 | 1.03 | 1.17 | 0.60 | 0.63 | 0.57 |
| Aa | 2 | 0.69 | 1.05 | 1.19 | 0.57 | 0.65 | 0.59 |
| Ab | 3 | 0.62 | 1.15 | 1.21 | 0.50 | 0.75 | 0.61 |
| Ab | 4 | 0.60 | 1.18 | 1.20 | 0.48 | 0.78 | 0.60 |
| . | . | . | . | . | . | . | . |
| . | . | . | . | . | . | . | . |

In Step 172, the tricolor photometric data corresponding to the tricolor normalized data belonging to the color region $A_a$ in which the color difference from the reference value is small is selected and stored in the RAM 54. In an ensuing Step 174, an arithmetic mean of the selected tricolor photometric data is obtained in accordance with Formula (20) or the like so as to calculate the selected average density MD3i is calculated. It should be noted that in cases where the tricolor normalized data is classified on the basis of coordinates having color ratios as axes, the tricolor photometric data corresponding to the tricolor normalized data belonging to a color region in which a color ratio with respect to the reference value is small is selected, and this tricolor photometric data is averaged so as to calculate the selected average density MD3i.

In Step 176, a correction amount K2i is calculated on the basis of the average density MD2i of the tricolor photometric data and the selected average density MD3i of the tricolor photometric data. The correction amount K2i can be obtained in accordance with the following Formula (21):

$$K2i = f(MD2i, MD3i) \tag{21}$$

$$= MD3i - MD2i - \left( \sum_{i=1}^{3} MD3i - \sum_{i=1}^{2} MD2i \right) \div 3$$

Figure 10A:
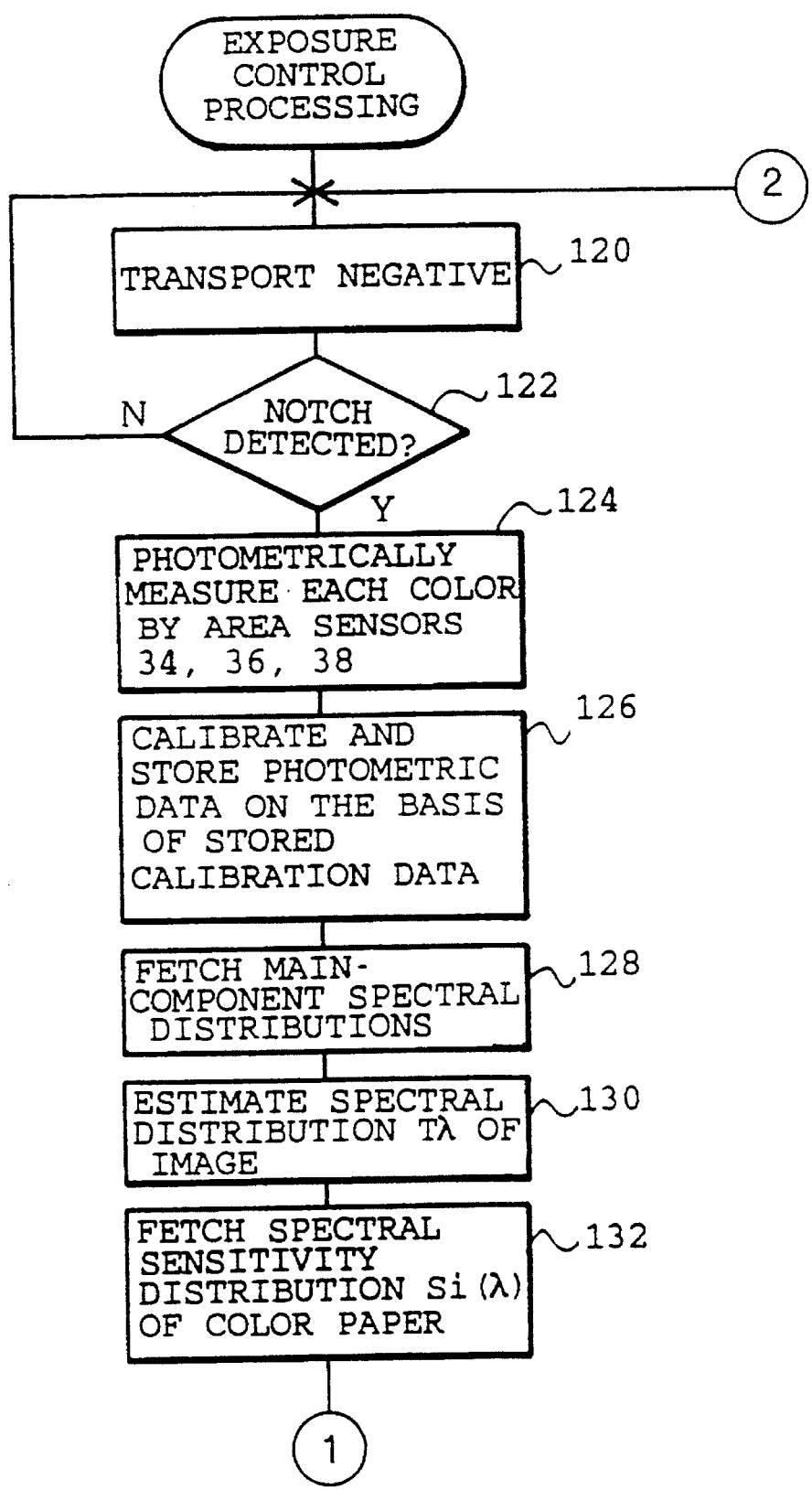
FIGS. 10A and 10B are flowcharts illustrating exposure control processing in accordance with a first embodiment.
Figure 10B:
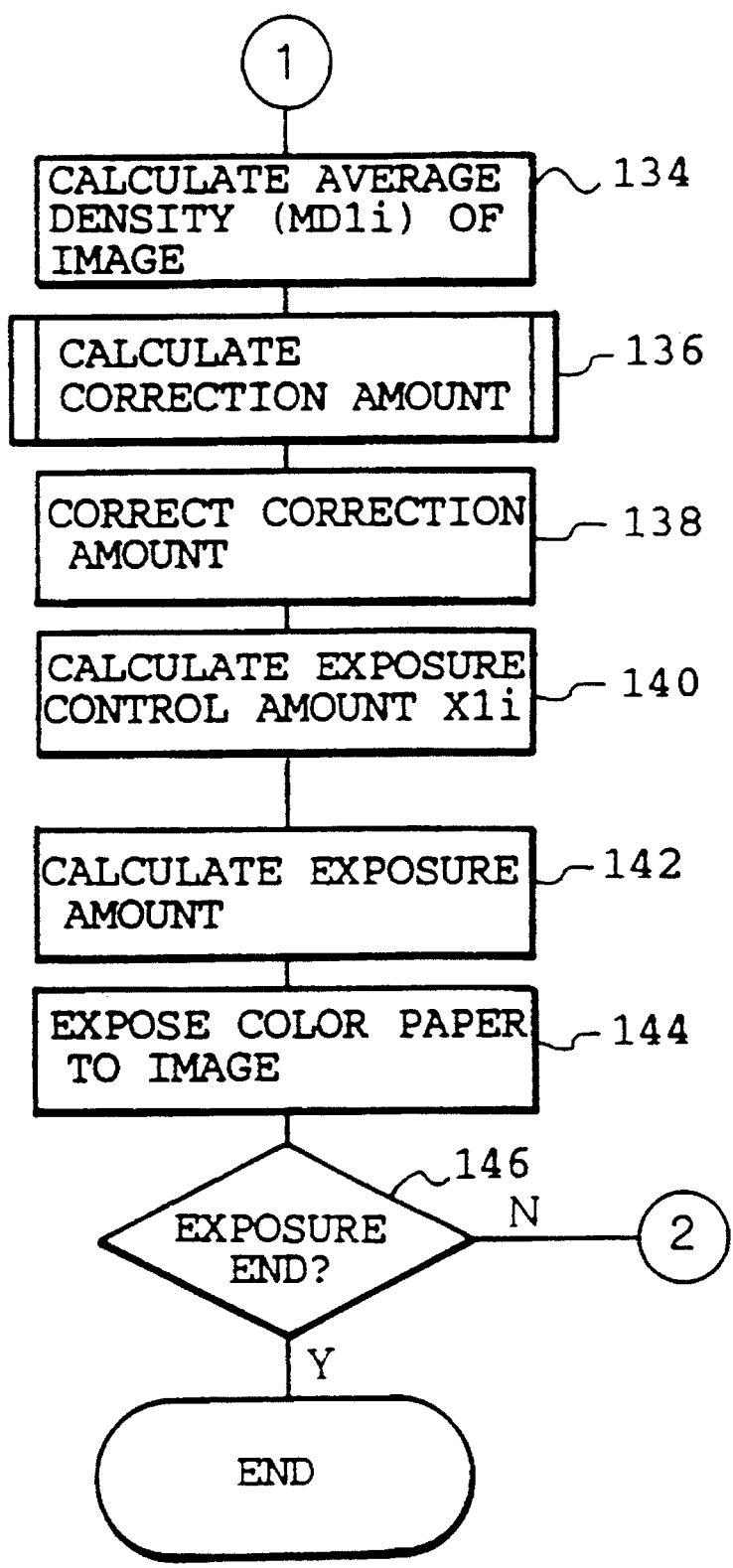

This completes the processing of the correction amount K2i, and the operation proceeds to Step 138 in the flowchart of FIG. 10B. It should be noted that the calculation of the correction amount using the tricolor photometric data is not limited to the above method, and it is possible to use methods of determining exposure amount disclosed in Japanese Patent Application Laid-Open Nos. 90140/1990, 93450/1990, and 46648/1991.

In Step 138, the correction amount K2i calculated above is corrected so that the effect of the difference between the spectral sensitivity distribution of the area sensor 38 and the spectral sensitivity distribution of the color paper 30 will be eliminated from the correction amount K2i. For example, as disclosed in Japanese Patent Application Laid-Open Nos. 230148/1991 and 142719/1989, in a case where the spectral sensitivity distribution of the area sensor 38 agrees with or is approximate to the spectral sensitivity distribution of the color paper 30, the aforementioned correction is not necessarily required. However, in a case where the spectral sensitivity distribution of the area sensor 38 is substantially different from the spectral sensitivity distribution of the color paper 30, the correction amount K2i includes a large error, so that it is impossible to obtain an appropriate exposure amount.

Figure 15A:
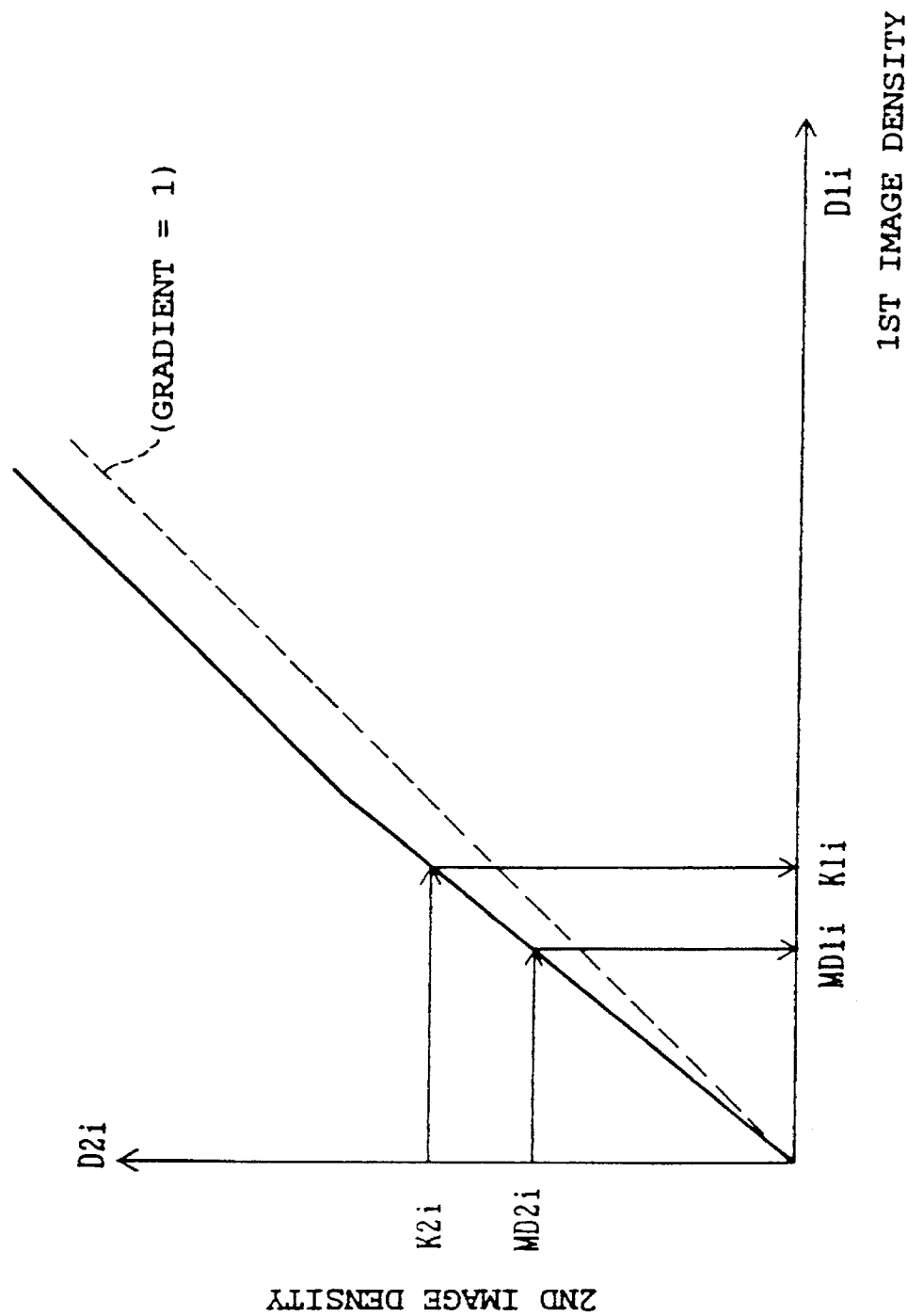
FIG. 15A is a diagram illustrating the relationship between a first image density and a second image density for explaining correction processing in accordance with the first embodiment.

That is, in a case where processing is effected with respect to a single image or a multiplicity of images by dividing the image into a multiplicity of segments (e.g., into pixels), by separating the divided segments into a multiplicity of colors and photometrically measuring them, and by separating the divided segments into the three colors and photometrically measuring them by the area sensor 38, and if a chart is plotted on the basis of a first image density (D1i) which is obtained from the multicolor photometric data and is equivalent to an image density obtained by photometrically measuring the image by a sensor exhibiting a spectral sensitivity distribution equivalent to that of the color paper 30 and a second image density (D2i) obtained from the tricolor photometric data, by using the first image density D1i as the ordinate and the second image density D2i as the abscissa, then if the spectral sensitivity distribution of the area sensor 38 is sharper (its half-width is smaller) than that of the color paper 30, the gradient becomes greater than 1, as shown in FIG. 15A. In this case, it is difficult to correct the aforementioned correction amount K2i to an appropriate value if a comparison is merely made between the average density (MD1i) obtained from the data transformed from the multicolor photometric data and the average density (MD2i) obtained from the tricolor photometric data.

For this reason, the relationship between the first image density and the second image density, which is shown in FIG. 15A, is determined in advance, and the correction amount K2i is corrected on the basis of this relationship in Step 138. As shown in FIG. 15A, this correction is equivalent to the determination of the value on the X-axis (hereafter referred to as a corrected correction amount K1i) when the value on the Y-axis in the aforementioned relationship is set as the correction amount K2i. Specifically, it suffices if a relation with respect to the first image density D1i is determined on the basis of the aforementioned relationship, and the correction amount K2i is transformed (corrected) into the corrected correction amount K1i in accordance with that relation. Consequently, the correction amount K2i is corrected into the corrected correction amount K1i which is equivalent to a correction amount obtained by photometrically measuring the image by a sensor exhibiting a spectral sensitivity distribution equivalent to that of the color paper 30. Alternatively, on the basis of the relationship such as the one shown in FIG. 15A, it is possible to determine a relation with respect to the average densities in which the photometric data is quantized into a plurality of density levels.

In addition, the relationship between the first image density and the second image density can be determined if the relationship is not necessarily plotted by conducting photometry for each pixel. For instance, the relationship can be determined if photometry is conducted with respect to at least two portions of the image where the density differs (e.g., a central portion and a peripheral portion, a portion of a maximum density and a portion of a minimum density, a portion of a higher density than an intermediate density and a portion of a lower density than the intermediate density, etc.), and if a chart is plotted for the respective portions on the basis of the photometric data. Furthermore, the density of the overall image may be photometrically measured and plotted on the basis of the photometric data, and the relationship may be determined approximately as a straight line connecting the origin and the plotted points.

Figure 15B:
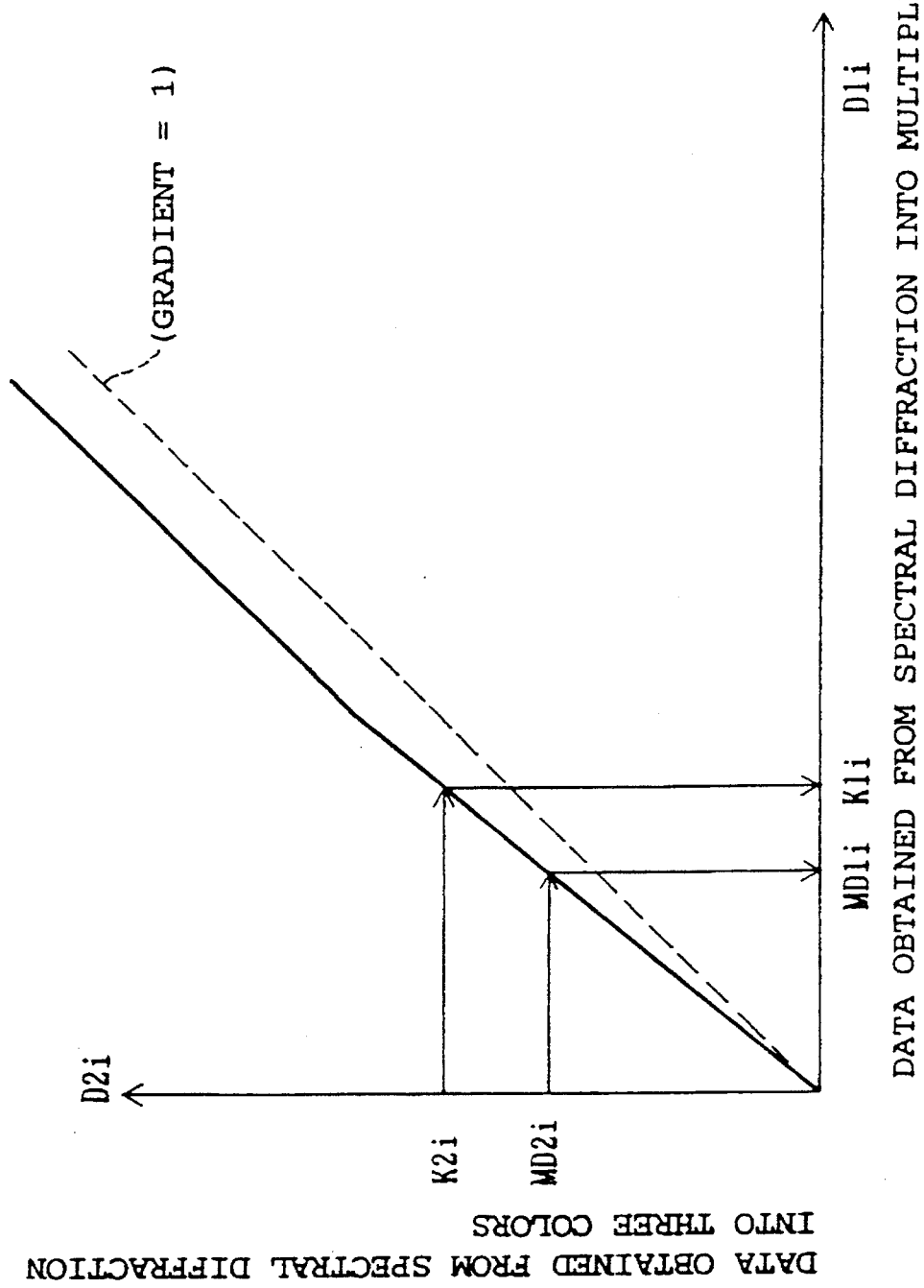
FIG. 15B is a diagram illustrating the relationship between photometric data obtained by separation into a multiplicity of colors and photometry and transformed in accordance with the spectral sensitivity of a color paper, and photometric data obtained by separation into three colors and photometry.

Meanwhile, in a case where processing is effected with respect to a single image or a multiplicity of images by dividing the image into a multiplicity of segments (e.g., into pixels), by separating the divided segments into a multiplicity of colors and photometrically measuring them, and by separating the divided segments into the three colors and photometrically measuring them by the area sensor 38, and if a chart is plotted on the basis of data obtained by transforming the multicolor photometric data in correspondence with the spectral sensitivity distribution of the color paper and on the basis of the tricolor photometric data, by using as the ordinate the image density (D1i) obtained from the photometric data transformed for the respective divided segments and using as the abscissa the image density (D2i) obtained from the tricolor photometric data, then if the spectral sensitivity distribution of the area sensor 38 is sharper (its half-width is smaller) than that of the color paper 30, the gradient becomes greater than 1, as shown in FIG. 15B. In this case, it is difficult to correct the aforementioned correction amount K2i to an appropriate value if a comparison is merely made between the average density (MD1i) obtained from the data transformed from the multicolor photometric data and the average density (MD2i) obtained from the tricolor photometric data.

For this reason, the relationship such as the one shown in FIG. 15B is determined in advance, and the correction amount K2i is corrected on the basis of this relationship in Step 138. As shown in FIG. 15B, this correction is equivalent to the determination of the value on the X-axis (the corrected correction amount K1i) when the value on the Y-axis in the aforementioned relationship is set as the correction amount K2i. Specifically, it suffices if a relation with respect to D1i is determined on the basis of the aforementioned relationship, and the correction amount K2i is transformed (corrected) into the corrected correction amount K1i in accordance with that relation. Alternatively, on the basis of the relationship such as the one shown in FIG. 15B, it is possible to determine a relation with respect to the average densities in which the photometric data is quantized into a plurality of density levels.

Although in the above-described example the correction amount K2i is transformed into the corrected correction amount K1i, and an exposure control amount X1i is determined on the basis of this corrected correction amount K1i in the ensuing step, an arrangement may be provided such that an exposure control amount X2i is determined on the basis of the tricolor photometric data and is transformed in the same way as described above, so as to determine the exposure control amount X1i. In this case, the average density MD1i of the first term in Formula (22) (which will be described later) for determining the exposure control amount X1i is determined by correcting the average density of the tricolor photometric data by using the relationship shown in FIG. 15B. Of the multicolor photometric data, the photometric data on colors other than the three colors is used only for deriving the relationship shown in FIG. 15B.

In addition, the relationship shown in FIG. 15B can be determined if the relationship is not necessarily plotted by conducting photometry for each pixel. For instance, the relationship can be determined if photometry is conducted with respect to at least two portions of the image (e.g., a central portion and a peripheral portion, a portion of a maximum density and a portion of a minimum density, a portion of a higher density than an intermediate density and a portion of a lower density than the intermediate density, etc.), and if a chart is plotted for the respective portions on the basis of the photometric data. Furthermore, the density of the overall image may be photometrically measured and plotted on the basis of the photometric data, and the relationship may be determined approximately as a straight line connecting the origin and the plotted points.

In an ensuing Step 140, the exposure control amount X1i is calculated on the basis of the corrected correction amount K1i determined in Step 138 and the average density MD1i determined from the multicolor photometric data, in accordance with the following Formula (22):

$$X1i = MD1i + F \cdot K1i \tag{22}$$

where, F: a constant (e.g., 1.0) or a value expressed by a function.

In Step 142, the exposure amount is determined on the basis of the exposure control amount X1i determined in Step 140. The exposure amount is determined in accordance with the following Formula (23):

$$\log Ei = Si \cdot Ai(X1i - D\phi i) + Ki \tag{23}$$

where, i: any one of R, G, and B log E: logarithm of the exposure amount $D\phi i$: density of the reference negative film Ki: constant determined by the color paper and the printer Si: slope control coefficient (=0.5 to 2.0)

Ai: color correction coefficient ($\approx 1.0$)

In Step 144, the driving of the light-adjusting filter unit 20 and the black shutter 28 is controlled in such a manner that the color paper 30 is exposed to the image positioned at the exposing position with the exposure amount determined as described above. In an ensuing Step 146, a determination is made as to whether or not the exposure of all the images on the negative film 20 set in the automatic printer 10 has been completed. If NO is the answer in the determination in Step 146, the operation returns to Step 120 to position an ensuing image at the exposing position and effect respective processing including photometry, determination of exposure amount, and exposure.

Thus, since the spectral distribution of the image is estimated on the basis of photometric data on nine colors in the above-described embodiment, it becomes unnecessary to effect color separation by using an optical element such as a prism, a diffraction grating, spectral filters, or the like, and it becomes possible to determine an optimum exposure amount by using a small amount of photometric data. In addition, it becomes unnecessary to effect photometry with parallel rays of light, and since photometry can be conducted by using diffused light, the automatic printer 10 can be made compact.

In addition, since a correction amount with respect to a basic exposure amount is determined on the basis of the tricolor photometric data of one area sensor 38 of the three area sensors for separating the light into nine colors to effect photometry, it becomes unnecessary to provide a separate photometrically measuring means for obtaining tricolor photometric data. Hence, the automatic printer 10 can be made further compact, and handling such as the changeover (longitudinal feeding, transverse feeding, etc.) of the transport of the negative film 14 and the transport of piece negatives is facilitated.

Next, a description will be given of a second embodiment of the present invention. It should be noted that those component parts that are identical to those of the first embodiment will be denoted by the same reference numerals, and a description thereof will be omitted.

In this second embodiment, in the same way as the filters of the area sensor 38, the filters of the area sensors 34 and 36 of the photometric unit 32 are arranged such that a multiplicity of filters, each having a configuration in which three substantially square blocks are arranged in an L-shape, are formed on a substrate (see FIG. 4). These filters of the area sensors 34 and 36 are capable of effecting photometry by separating the color into three kinds of wavelength bands for each pixel.

Referring now to the flowcharts shown in FIGS. 16A and 16B corresponding to FIGS. 10A and 10B, a description will be given of the operation of this second embodiment. In photometry in Step 124, the image is divided into each pixel by the respective area sensors 34, 36, and 38 and is color-separated into the respective wavelength bands so as to effect photometry. In Step 130, the spectral distribution (which may be either the spectral transmittance distribution or the spectral transmission density distribution) $Tj(\lambda)$ is estimated for each pixel on the basis of the photometric data thus obtained. It should be noted that j is a number allotted to each pixel for convenience' sake to distinguish the pixels.

In Step 134, the average density is calculated on the basis of the spectral distribution $Tj(\lambda)$ determined for each pixel and the spectral sensitivity distribution of the color paper 30 fetched in Step 132. It should be noted that in a case where the estimated spectral distribution is the spectral transmittance distribution, the average density Di can be determined in accordance with the following Formula (24):

$$Di = \left\{ \sum_{\lambda = \lambda_{mini}}^{\lambda_{maxi}} -\log(Tj(\lambda) \cdot Si(\lambda)) \right\} \div n \tag{24}$$

In Formula (24) above, n is the number of pixels used for determining the average density, but it is unnecessary for all the pixels making up the image to be used. For instance, it is possible to use the pixels selected in the same manner as in FIG. 11. It should be noted that processing in Step 136 and thereafter is the same as in the first embodiment.

A description will be given hereafter of a third embodiment of the present invention. It should be noted that those component parts that are identical to those of the first and second embodiments will be denoted by the same reference numerals, and a description thereof will be omitted.

Figure 21:
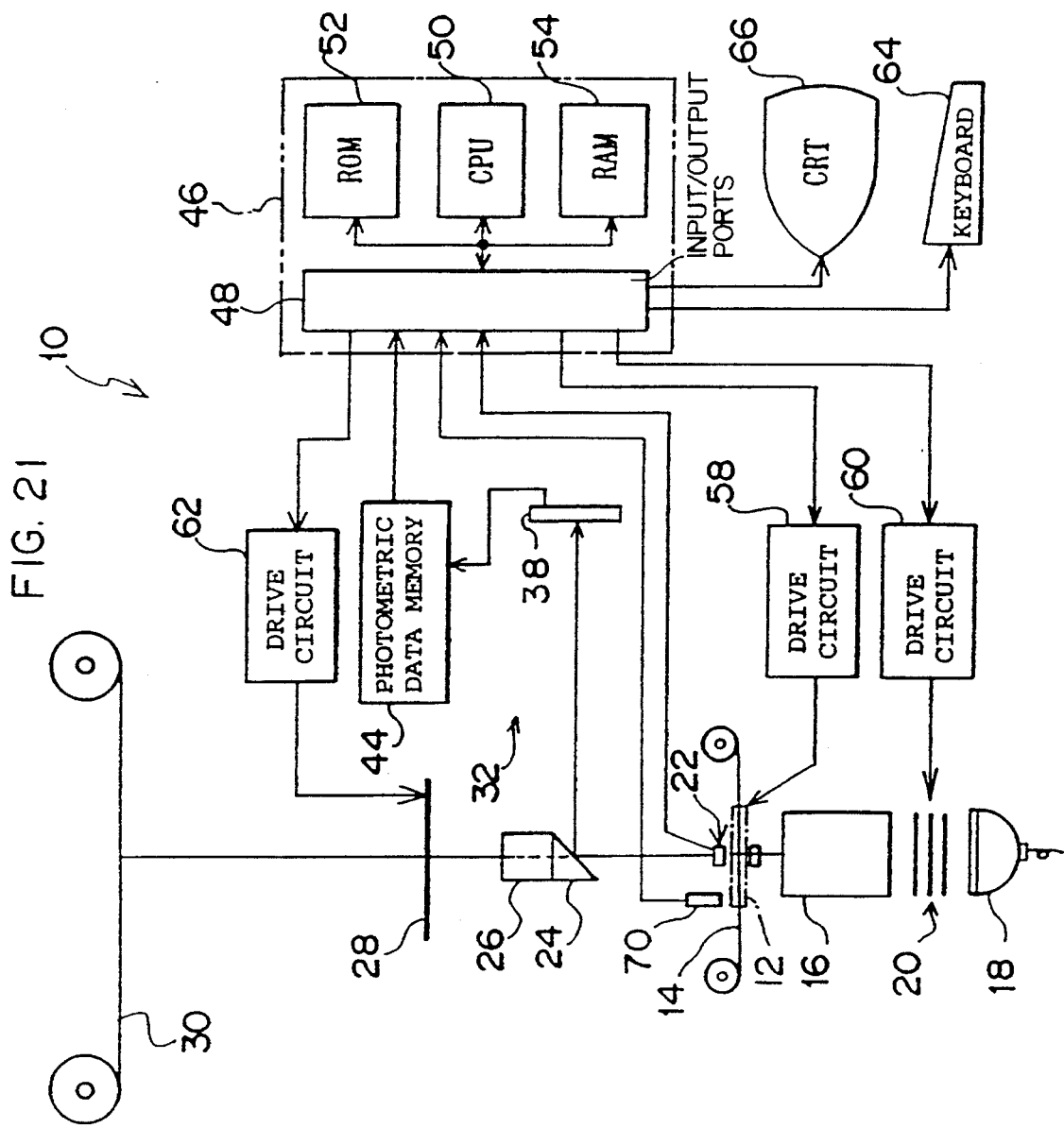
FIG. 21 is a schematic diagram of another automatic printer.

As shown in FIG. 21, in this third embodiment, the area sensors 34 and 36 are omitted, and the photometric unit 32 separates the image into three colors for each pixel by means of the area sensor 38 to effect photometry. A bar code sensor 70 is provided in the vicinity of the negative carrier 12 and reads a DX code recorded on the negative film 14 set in the automatic printer 10. The controller 46 determines the type of the negative film 14 on the basis of the DX code read by the bar code sensor 70. Meanwhile, in this third embodiment, a multiplicity of negative films 14 are photometrically measured in advance, and the relationship between the first image density D1i and the second image density D2i is determined in advance for each film type on the basis of the results of photometry, as shown in FIG. 15A. This relationship is stored in the ROM 52 of the controller 46 for each film type.

Figure 22A:
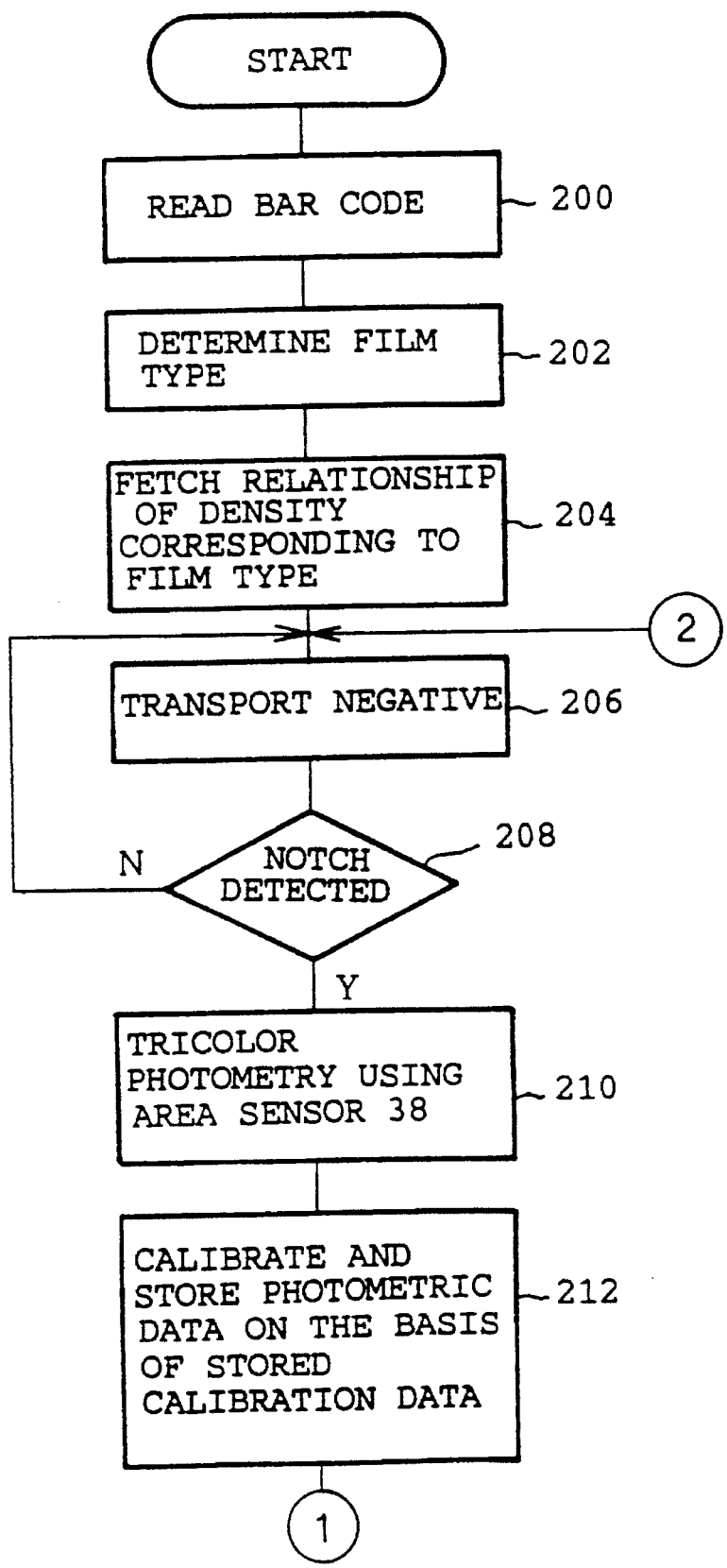
FIGS. 22A and 22B are flowcharts illustrating exposure control processing in accordance with a third embodiment.
Figure 22B:
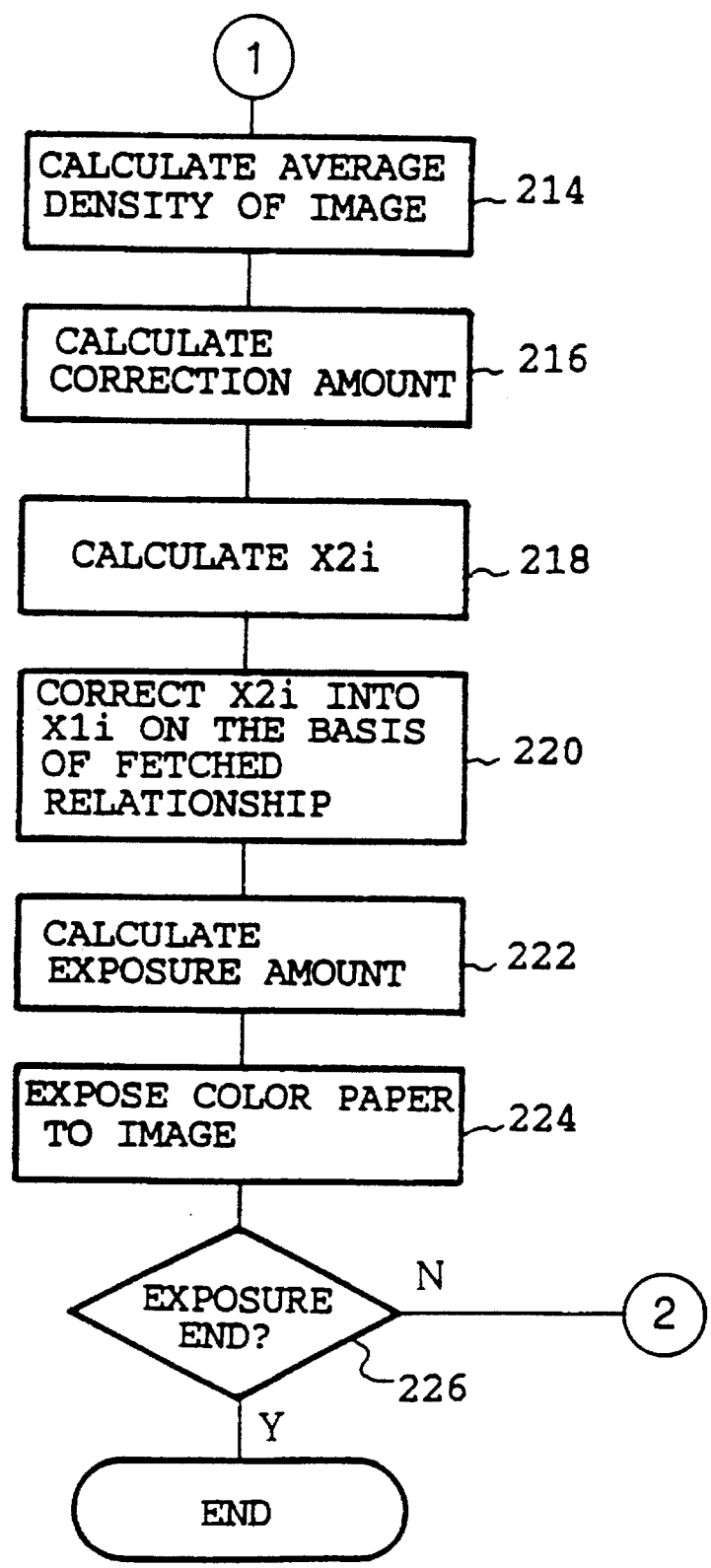

Referring now to the flowcharts shown in FIGS. 22A and 22B, a description will be given of the operation in accordance with this third embodiment. It should be noted that the flowcharts shown in FIGS. 22A and 22B are started when the negative film 14 is set in the automatic printer 10. In Step 200, the DX code allotted to the negative film 14 is read by the bar code sensor 70. In Step 202, the type of the negative film 14 is determined on the basis of the DX code thus read. In Step 204, of the relationship between the first image density D1i and the image density D2i stored in the ROM 52 for each film type, the relationship between the first image density D1i and the second image density D2i which correspond to the film type determined is fetched.

Figure 16A:
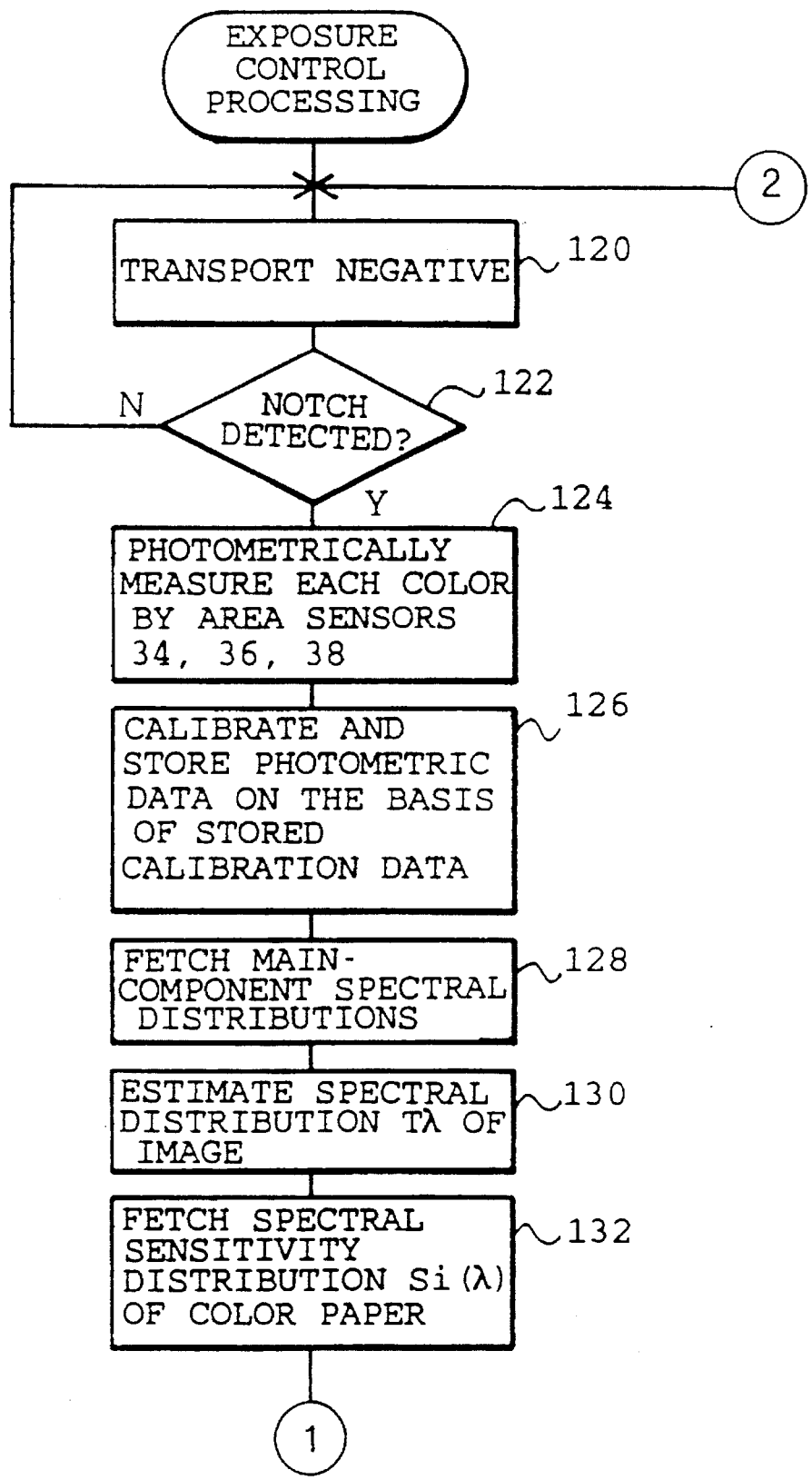
FIGS. 16A and 16B are flowcharts illustrating exposure control processing in accordance with a second embodiment.
Figure 16B:
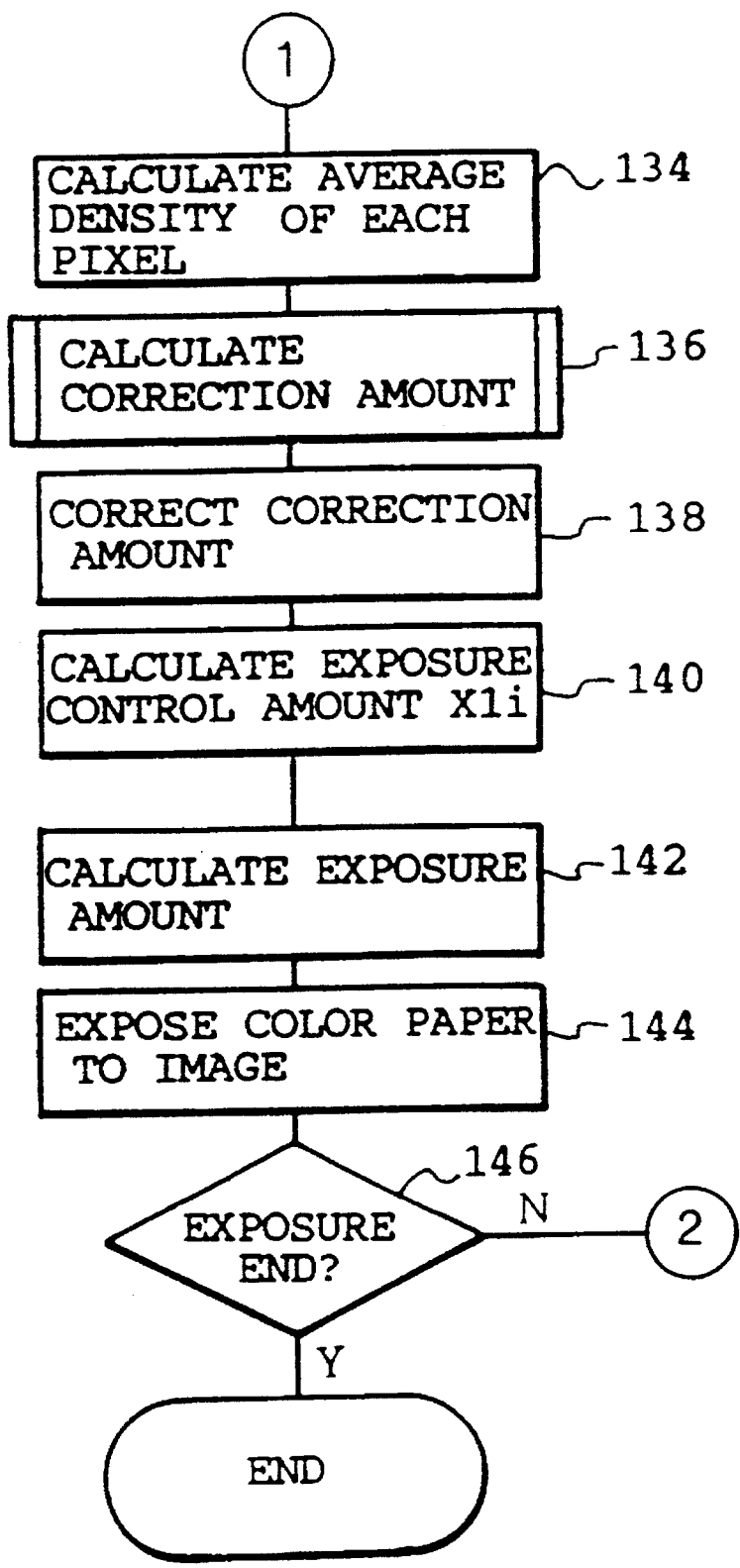

In Steps 206 and 208, in the same way as Steps 122 and 124 in the flowcharts shown in FIGS. 10A and 16A, the negative film 14 is transported, the image is positioned at the exposing position upon detection of a notch, and the transport is stopped. In Step 210, the image positioned at the exposing position is divided into pixels by the area sensor 38, and each pixel is separated into the three colors to effect photometry. In Step 212, the photometric data is calibrated by the calibration data, and is stored in the photometric data memory 44 as the tricolor photometric data D2ij.

In Step 214, the average density M2i of the tricolor photometric data D2ij is calculated as the image density by using Formula (20) above or the like. In an ensuing Step 216, the correction amount K2i is calculated on the basis of the tricolor photometric data D2ij. This correction amount K2i can be determined by performing processing in Steps 164 to 176 in the flowchart shown in FIG. 11, for example.

In an ensuing Step 218, the exposure control amount X2i is calculated on the basis of the average density M2i and the correction amount K2i derived from the tricolor photometric data, in accordance with the following Formula (25):

$$X2i = M2i + F \cdot K2i \quad (25)$$

where, F: constant (e.g., 1.0) or a value expressed by a function

In Step 220, in the same way as in Step 138 in the flowchart shown in FIG. 10B, on the basis of the relationship between the first image density D1i and the second image density D2i fetched in Step 204 the exposure control amount X2i is corrected into the exposure control amount X1i which is equivalent to an exposure control amount obtained by photometrically measuring the copying image by a sensor exhibiting a spectral sensitivity distribution equivalent to that of the color paper 30.

It should be noted that although, in the above, the exposure control amount X2i is calculated on the basis of the average density M2i and the correction amount K2i, and the exposure control amount X1i is determined by correcting the exposure control amount X2i, an arrangement may be alternatively provided such that the average density M2i and the correction amount K2i are corrected, and the exposure control amount X1i is determined from the average density M1i and the correction amount K1i thus corrected.

Thus, in this third embodiment, the relationship between the first image density D1i and the second image density D2i is determined in advance, the exposure control amount X2i is determined on the basis of the tricolor photometric data, and this exposure control amount X2i is corrected on the basis of the aforementioned relationship, so as to determine the exposure control amount X1i. Accordingly, it suffices if the image is separated into the three colors and photometrically measured by the photometric unit 32, so that the arrangement of the photometric unit 32 can be made simple. In this case, of the multicolor photometric data measured by the photometric unit 32 in the first and second embodiments, the photometric data other than that on the three colors is used only for calculating the first image density D1i and deriving the relationship between the first image density D1i and the second image density D2i.

Figure 17A:
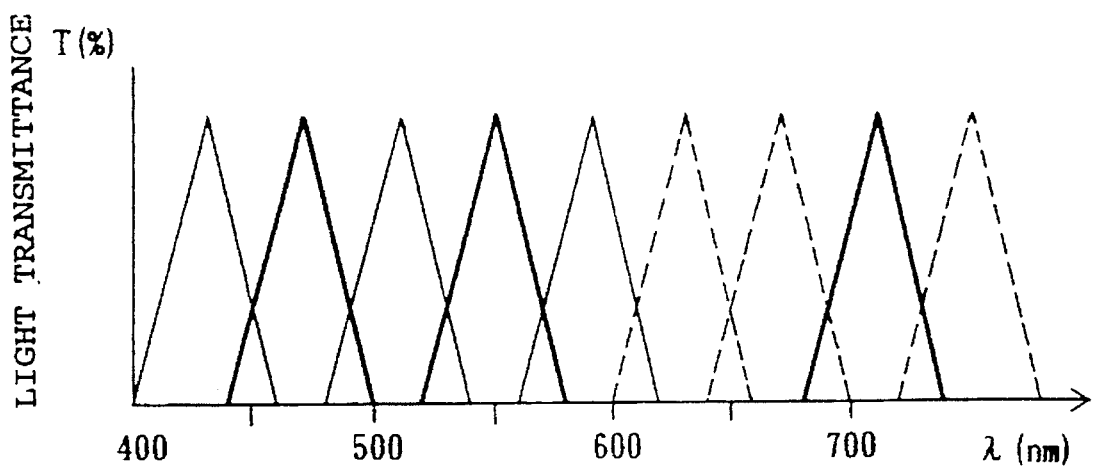
FIGS. 17A and 17B are diagrams illustrating other examples of photometric spectra obtained by the photometrically measuring section.
Figure 17B:
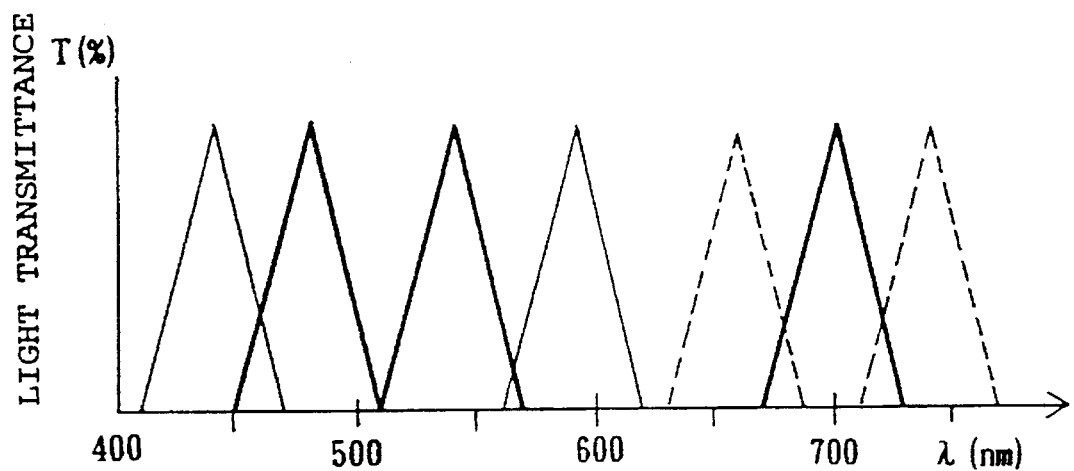

Although, in the first and second embodiments, the photometric unit 32 is arranged to effect photometry by color separation, as shown in FIG. 5, the photometric unit 32 is not confined to this arrangement. For instance, the spectra separated by the respective sensors may overlap, as shown in FIG. 17A. In addition, the area sensors 34 and 36 may be arranged to effect photometry by separating the image into two colors, respectively. In this case, since the photometric unit 32 carries out photometry by separating the image into seven colors, the spectral distribution of the image is determined from a maximum of seven main-component spectral distributions. In addition, the image density includes not only the average density of the overall image or of a partial region of the image, but also average values or a cumulative histogram of selected pixels (it suffices if there are at least two pixels), such as pixels in which a low-density portion of the image is removed.

In addition, the sensors for photometry are not restricted to area sensors, and line sensors or the like may be used. In this case, an arrangement is provided such that slit light is radiated to an image, and the slit light transmitted through the image is made incident upon the line sensor, and the image may be scanned by the slit light while the negative film 14 is being gradually moved.

Although in the foregoing embodiment the photometric data on the respective colors obtained by separating the image into the three colors and conducting photometry by means of the area sensor 38 is used to determine the correction amounts for the three colors, the correction amounts for the respective colors may be determined from the weighted average values of photometric data on a plurality of colors. For instance, in FIG. 17A, weighted average values of photometric values of 670 nm, 710 nm, and 750 nm are used instead of the photometric value of R of 710 nm. Similarly, as for the photometric values of G and B, values obtained from two or more photometric values may be used. The tricolor data in this case becomes close to a value photometrically measured by a photometrically measuring means exhibiting a spectral sensitivity distribution equivalent to that of the copying material, so that the correction amount in the correcting means can be made small.

Although, in the above examples, the exposure-amount determining apparatus in accordance with the present invention is installed integrally with the automatic printer 10 as a copying apparatus, the exposure-amount determining apparatus may be formed separately from the copying apparatus.

Although, in the above examples, the relationship between the first image density and the second image density is stored in advance, the exposure amount may be determined by using the relationship after the relation is determined by using the photometric data obtained by photometrically measuring the image to be copied. In addition, after the relationship is determined by photometrically measuring images in a number of frames from the leading end of the negative film 14, the negative film 14 may be rewound, and the exposure amount of the respective image frames may be determined by using the relationship.

Although, in the above examples, a description has been given of the automatic printer 10 for copying the image recorded on the negative film 14 onto the color paper 30 as the copying apparatus, the present invention is not limited to the same. For instance, the present invention can be applied to a copying apparatus for copying a positive image recorded on a reversal film onto a color copying material, or to a copying apparatus for copying a color reflection original. In addition, in addition to the copying apparatus for copying an image by means of the plane exposure, the present invention can be applied to the determination of exposure amount for a copying apparatus for copying an image by means of a digital means such as a laser beam and CRT light.

Next, a description will be given of a fourth embodiment. The automatic printer of this embodiment is similar to the automatic printer (FIG. 3) of the first embodiment with the exception of the area sensors. Each of the area sensors 34 and 36 is comprised of filters and two-dimensional image sensor. In the same way as the area sensor 38 of the first embodiment, the filters of the area sensor 34 are arranged such that a multiplicity of filters of three kinds having central wavelengths of approx. 430 nm, approx. 510 nm, and approx. 590 nm and half-widths of approx. 20 nm, respectively, are formed on one substrate. The filters of the area sensor 34 are capable of effecting photometry by color-separating the light transmitted through the pixels into three kinds of wavelength bands. In addition, the filters of the area sensor 36 are similarly arranged such that a multiplicity of filters of three kinds having central wavelengths of approx. 630 nm, approx. 670 nm, and approx. 750 nm and half-widths of approx. 20 nm, respectively, are formed on one substrate. The filters of the area sensor 34 are capable of effecting photometry by color-separating the light transmitted through the pixels into three kinds of wavelength bands. Accordingly, in the photometric unit 32, the incident light is resolved into the pixels and is separated into nine colors by the area sensors 34, 36, and 38 to effect photometry, as shown in FIG. 5.

Next, a description will be given of the operation of this embodiment with reference to a flowchart. The calibration processing is similar to that of the first embodiment. In FIGS. 24A, 24B, 25A, and 25B, components parts corresponding to those of the first embodiment are denoted by the same reference numerals, and a description thereof will be omitted.

In Step 228, of the photometric data stored in the photometric data memory 44, the tricolor photometric data obtained by photometry using the area sensor 38 and calibrated is fetched to the RAM 54.

In Step 238, the tricolor photometric data and pixels, corresponding to the tricolor normalized data belonging to a region $A_a$ where the color difference from a reference value is small, are selected and stored in the RAM 54. It should be noted that in a case where the tricolor normalized data is classified by the coordinates having color ratios as axes, it is possible to select tricolor photometric data corresponding to the tricolor normalized data belonging to a color region where the color ratio with respect to the reference value is small. In Step 240, the multicolor photometric data on the pixels selected as described above is fetched, and an average value of each color of the photometric data in the region made up of the aforementioned pixels is calculated.

Here, if it is assumed that a number allotted to each pixel for convenience' sake to distinguish the pixels is j, the numbers of n pixels selected are $s_1, s_2, \ldots, s_n$, and the photometric data of a predetermined pixel at the wavelength $\lambda$ is $ej\lambda$, the average value $E\lambda$ of the photometric data at the wavelength $\lambda$ can be determined in accordance with the following Formula (26):

$$E\lambda = \frac{1}{n} \sum_{j=s_1}^{s_n} ej\lambda \qquad (26)$$

In an ensuing Step 242, eight main-component spectral transmittance distributions are fetched from the ROM 52. In Step 244, the spectral transmittance distribution $T(\lambda)$ (or the spectral transmission density distribution) of the region made up of the selected pixels is estimated by using the average densities of the respective colors calculated as described above, the main-component spectral transmittance distributions fetched from the ROM 52, and the spectral sensitivity distributions of the area sensors. The spectral transmittance distribution or the spectral transmission density distribution thus estimated agrees with actually measured values with high accuracy, as shown in FIG. 12.

In an ensuing Step 246, the spectral sensitivity distribution $Si(\lambda)$ of the color paper 30 is fetched from the ROM 52. In Step 248, as the exposure control amount Xi, the average density is determined which is equivalent to an average density obtained by conducting photometry by the photometric unit 32 having a spectral sensitivity distribution identical to the spectral sensitivity distribution $Si(\lambda)$ of the color paper 30. This exposure control amount Xi is calculated by using the spectral transmittance distribution $T(\lambda)$ of the image estimated in Step 246 and the spectral sensitivity distribution $Si(\lambda)$ of the color paper 30, in accordance with the following Formula (27) which is similar to Formula (19) above:

$$Xi = -\log \left[ \sum_{\lambda=\lambda_{mini}}^{\lambda_{maxi}} T(\lambda) \cdot Si(\lambda) \right] \qquad (27)$$

where i represents any one of R, G, and B, $\lambda_{min}$ is a minimum value of an adding section (corresponding to the wavelength band of any one of R, G, and B), and $\lambda_{max}$ is a maximum value of the adding section. Although $Si(\lambda)$ is the spectral sensitivity distribution of the color paper as described above, $Si(\lambda)$ in Formula (27) above serves as a first coefficient for weighting the spectral transmittance distribution of the image in correspondence with the spectral sensitivity distribution of the color paper 30. Therefore, it is possible to obtain the average density, i.e., the exposure control amount Xi, which is equivalent to an average density obtained by conducting photometry by a photometrically measuring means exhibiting a spectral sensitivity distribution matching the spectral sensitivity distribution of the color paper 30.

When the type of the color paper 30 is changed, the spectral sensitivity distributions $Si(\lambda)$ of a plurality of types of color paper 30 may be stored in advance in the ROM 52, and the spectral sensitivity distribution $Si(\lambda)$ of the color paper 30 to be used may be selected by means of the keyboard 64. Alternatively, the spectral sensitivity distributions of a plurality of types of color paper 30 stored in an external storage means such as a floppy disk may be fetched to the RAM 54, as necessary.

In Step 250, the exposure amount is determined on the basis of the exposure control amount Xi determined in Step 258. The exposure amount is determined in accordance with the following Formula (28) which is similar to Formula (23) above:

$$\log Ei = Si \cdot Ai(Xi - D\phi i) + Ki \tag{28}$$

In Step 252, the driving of the light-adjusting filter unit 20 and the black shutter 28 is controlled in such a manner that the color paper 30 is exposed to the image positioned at the exposing position with the exposure amount determined as described above. In an ensuing Step 246, a determination is made as to whether or not the exposure of all the images on the negative film 20 set in the automatic printer 10 has been completed. If NO is the answer in the determination in Step 246, the operation returns to Step 220 to position an ensuing image at the exposing position and effect respective processing including photometry, determination of exposure amount, and exposure.

Thus, in this fourth embodiment, each pixel is separated into nine colors and photometrically measured, and the spectral distribution of a region made up of the selected pixels is estimated on the basis of the average value for each color of the photometric data on the selected pixels. Therefore, the number of colors to be separated into can be small, and it becomes unnecessary to separate the image into a multiplicity of spectra by using an optical element such as a prism, a diffraction grating, spectral filters, or the like. Accordingly, it becomes possible to determine an optimum exposure amount by using a small amount of photometric data. In addition, it becomes unnecessary to effect photometry with parallel rays of light, and since photometry can be conducted by using diffused light, the automatic printer 10 can be made compact.

In addition, since the pixels are selected on the basis of the tricolor photometric data of one area sensor 38 of the three area sensors for separating the light into nine colors for photometry, it becomes unnecessary to provide a separate photometrically measuring means for obtaining tricolor photometric data. Hence, the automatic printer 10 can be made further compact, and handling such as the changeover (longitudinal feeding, transverse feeding, etc.) of the transport of the negative film 14 and the transport of piece negatives is facilitated.

Next, a description will be given of a fifth embodiment of the present invention. It should be noted that those component parts that are identical to those of the fourth embodiment will be denoted by the same reference numerals, and a description thereof will be omitted. This fifth embodiment has the same configuration as that of the fourth embodiment, and a description will be given hereafter of the operation of this fifth embodiment with reference to the flowcharts shown in FIGS. 25A and 25B.

Figure 24A:
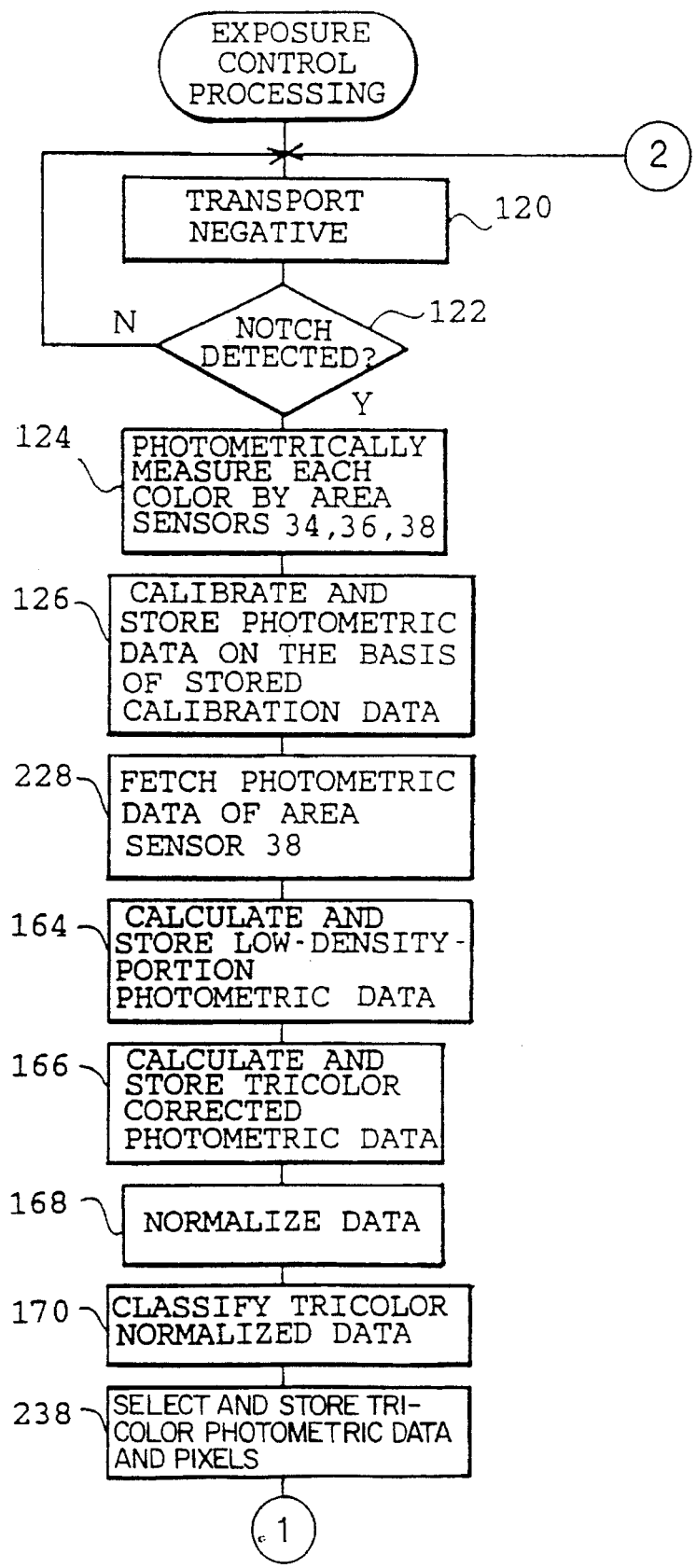
FIGS. 24A and 24B are flowcharts illustrating exposure control processing in accordance with a fourth embodiment.
Figure 24B:
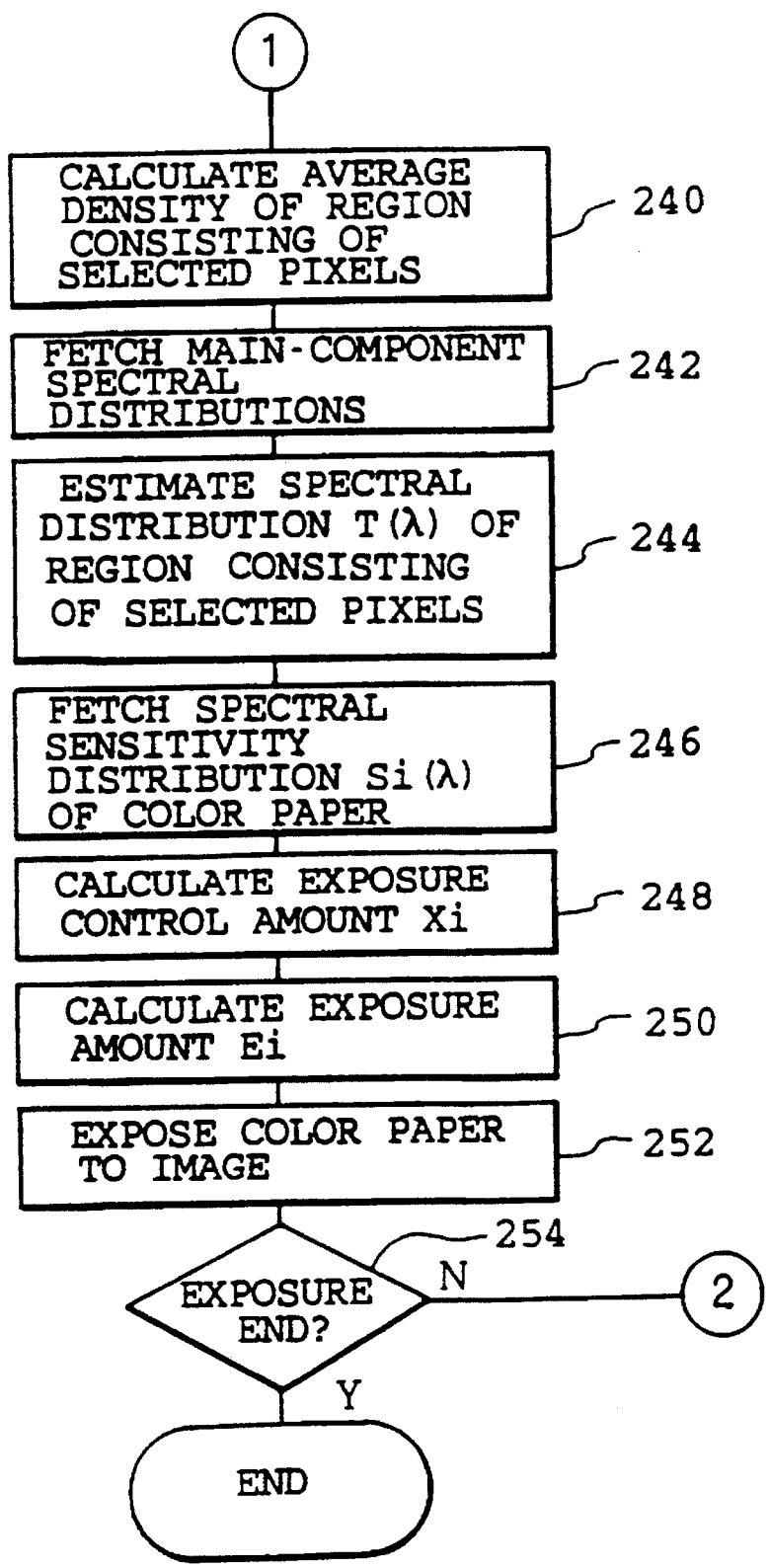

In Steps 260 to 278 in the flowchart shown in FIG. 25A, processing is carried out in the same way as in Steps 120 to 238 in FIG. 24A. That is, the image recorded on the negative film 14 is positioned at the exposing position, the image is divided into pixels, and the pixels are separated into a multiplicity of colors and photometrically measured. The photometric data, after being subjected to calibration, is stored in the photometric data memory 44. Then, tricolor photometric data and pixels belonging to a color region in which the color difference from a reference value is small are selected on the basis of the tricolor photometric data obtained from photometry by the area sensor 38.

In an ensuing Step 280 the main-component spectral distribution (which may be either the main-component spectral transmittance distribution or the main-component spectral transmission density distribution) is fetched. In Step 282, the spectral distribution $Tj(\lambda)$ is estimated for each selected pixel. In Step 284, the spectral sensitivity distribution $Si(\lambda)$ of the color paper 30 is fetched. In Step 286, the tricolor density dij of each pixel is calculated on the basis of the spectral distribution $Tj(\lambda)$ determined for each pixel and the fetched spectral sensitivity distribution $Si(\lambda)$ of the color paper 30. Incidentally, in a case where the estimated spectral density is a spectral transmittance distribution, the tricolor density dij of each pixel can be determined in accordance with the following Formula (29):

$$dij = \left\{ \sum_{\lambda=\lambda_{mini}}^{\lambda_{maxi}} -\log(Tj(\lambda) \cdot Si(\lambda)) \right\} \tag{29}$$

In an ensuing Step 288, the average value of the density values of the three colors of each pixel is calculated as the exposure control amount Xi. If the numbers of n pixels selected are assumed to be $s_1, s_2, \ldots, s_n$, this exposure control amount Xi can be determined in accordance with the following Formula (30):

$$Xi = \frac{1}{n} \sum_{j=s_1}^{s_n} dij \tag{30}$$

Thereafter, the exposure amount is calculated in accordance with Formula (28) shown in the fourth embodiment, and exposure control processing is effected in the same manner as in the fourth embodiment.

Thus, in this fifth embodiment, since each pixel is separated into nine colors and photometrically measured, pixels are selected on the basis of the tricolor photometric data, and the spectral distributions of the selected pixels are estimated. Hence, as compared with the case where the spectral distributions of the entire pixels of the image are estimated, it is possible to reduce the time for calculation of the exposure amount. Furthermore, since the number of colors to be separated into can be small, it becomes unnecessary to separate the image into a multiplicity of spectra by using an optical element such as a prism, a diffraction grating, spectral filters, or the like. Accordingly, it becomes possible to determine an optimum exposure amount by using a small amount of photometric data.

Although, in the foregoing embodiment, the photometric unit 32 is arranged to effect photometry by color separation, as shown in FIG. 5, the photometric unit 32 is not confined to this arrangement. For instance, the spectra separated by the respective sensors may overlap, as shown in FIG. 17A. In addition, the area sensors 34 and 36 may be arranged to effect photometry by separating the image into two colors, respectively. In this case, since the photometric unit 32 carries out photometry by separating the image into seven colors, the spectral distribution of a region made up of selected pixels or the spectral distribution of each selected pixel is determined from a maximum of seven main-component spectral distributions.

In addition, the sensors for photometry are not restricted to area sensors, and line sensors or the like may be used. In this case, an arrangement is provided such that slit light is radiated to an image, and the slit light transmitted through the image is made incident upon the line sensor, and the image may be scanned by the slit light while the negative film 14 is being gradually moved. The photometric data for determining a correction amount with respect to the image density can be measured by using this line sensor.

Although in the foregoing embodiment the photometric data on the respective colors obtained by separating the image into the three colors and conducting photometry by means of the area sensor 38 is used to determine the correction amounts for the three colors, the correction amounts for the respective colors may be determined from the weighted average values of photometric data on a plurality of colors. For instance, in FIG. 17A, weighted average values of photometric values of 670 nm, 710 nm, and 750 nm are used instead of the photometric value of R of 710 nm. Similarly, as for the photometric values of G and B, values obtained from two or more photometric values may be used. As for the tricolor data in this case, it is possible to obtain a characteristic quite close to the spectral sensitivity distribution of the copying material.

Although, in the above examples, the exposure-amount determining apparatus in accordance with the present invention is installed integrally with the automatic printer 10 as a copying apparatus, the exposure-amount determining apparatus may be formed separately from the copying apparatus.

Although, in the above examples, a description has been given of the automatic printer 10 for copying the image recorded on the negative film 14 onto the color paper 30 as the copying apparatus, the present invention is not limited to the same. For instance, the present invention can be applied to a copying apparatus for copying a positive image recorded on a reversal film onto a color copying material, or to a copying apparatus for copying a color reflection original. In addition, in addition to the copying apparatus for copying an image by means of the plane exposure, the present invention can be applied to the determination of exposure amount for a copying apparatus for copying an image by means of a digital means such as a laser beam and CRT light.

What is claimed is:

1. A method of determining an exposure amount in a copying apparatus for copying a recorded image onto a copying material, the method comprising the steps of:

transmitting light from a light source through a negative film having the image recorded thereon, thereby projecting the image;

photometrically measuring the image by dividing the image into a plurality of pixels and by separating each pixel into a plurality of color wavelength bands, thereby generating, for each pixel j, photometric data attributable to each of the plurality of color wavelength bands;

fetching a plurality of stored main-component spectral distributions $e(\lambda)$ which are determined in advance;

estimating a spectral distribution $T(\lambda)$ of the image using the main-component spectral distributions $e(\lambda)$ and the photometric data attributable to each of the plurality of color wavelength bands;

fetching a stored spectral sensitivity distribution $Si(\lambda)$ of the copying material which is determined in advance;

determining, for each of at least three individual color wavelength bands which are a subset of the plurality of color wavelength bands, an average image density D1 using the spectral distribution $T(\lambda)$ and the spectral sensitivity distribution of the copying material $Si(\lambda)$, the average image density D1 being equivalent to an image density obtained by photometrically measuring the image using photometric measuring means exhibiting a spectral sensitivity distribution equivalent to the spectral sensitivity distribution $Si(\lambda)$ of the copying material;

calculating, for each average image density D1, a correction amount K2 on the basis of the photometric data attributable to the at least three individual color wavelength bands contributing to said image density D1;

obtaining, for each correction amount K2, a corresponding adjusted correction amount K1, wherein the adjusted correction amount K1 is equivalent to a correction amount obtained by photometrically measuring the image using photometric measuring means exhibiting a spectral sensitivity distribution equivalent to the spectral sensitivity distribution $Si(\lambda)$ of the copying material;

calculating, for each of the at least three individual color wavelength bands contributing to said image density D1, an exposure amount based on the respective average image density D1 and the adjusted correction amount K1; and controlling the copying apparatus to expose the copying material to the image with the calculated exposure amount.

2. The method according to claim 1, wherein said estimating step is performed using average values of the photometric data attributable to each of said plurality of color wavelengths, each of the average values being obtained by combining the photometric data of a plurality of adjacent pixels.

3. The method according to claim 1, wherein said spectral distribution $T(\lambda)$ of the image is estimated for each pixel j using the main-component spectral distributions $e(\lambda)$ and the photometric data of pixel j attributable to each of the plurality of color wavelength bands.

4. The method according to claim 1, further comprising the step of:

prior to estimating the spectral distribution $T(\lambda)$ of the image, calibrating the photometric data attributable to each of the plurality of color wavelength bands on the basis of stored calibration data in order to eliminate errors caused by non-uniformities in the light source.

5. The method according to claim 1, wherein said estimating step includes:

calculating a plurality of weighting coefficients a, corresponding respectively to the main-component spectral distributions $e(\lambda)$, on the basis of the photometric data attributable to each of the plurality of color wavelength bands and the main-component spectral distributions $e(\lambda)$; and estimating the spectral distribution $T(\lambda)$ as a linear sum of the main-component spectral distributions $e(\lambda)$ weighted respectively by the corresponding weighting coefficients a.

6. The method according to claim 1, wherein said correction amount calculating step includes:

fetching the photometric data attributable to the at least three individual color wavelength bands;

for each of the at least three individual color wavelength bands, calculating an average image density D2 based on a sum of the corresponding photometric data of all of the pixels;

for each of the at least three individual color wavelength bands, calculating a selected average image density D3 based on a sum of the corresponding photometric data of only selected pixels, the selected pixels being selected based on having a color difference which is small relative to a reference value; and for each of the at least three individual color wavelength bands, calculating the correction amount K2 based on the average image density D2 and on the selected average image density D3.

7. The method according to claim 1, wherein the at least three individual colors include red, green and blue.

8. A method of determining an exposure amount in a copying apparatus for copying a recorded image onto a copying material, the method comprising the steps of:

transmitting light from a light source through a negative film having the image recorded thereon, thereby projecting the image;

photometrically measuring the image by dividing the image into a plurality of pixels and by separating each pixel into a plurality of color wavelength bands, thereby generating, for each pixel j, photometric data attributable to each of the plurality of color wavelength bands, and storing the photometric data;

retrieving each pixel's photometric data attributable to at least three individual color wavelength bands which are a subset of the plurality of color wavelength bands;

for each of the at least three individual color wavelength bands, normalizing each pixel's photometric data attributable to the at least three individual color wavelength bands such that values of the normalized photometric data attributable to the at least three individual color wavelength bands remain in a specified range;

selecting only those pixels which have differences between the values of the normalized photometric data attributable to the at least three individual color wavelength bands which are less than a reference value;

retrieving, for only the selected pixels, photometric data attributable to all of the plurality of color wavelength bands;

fetching a plurality of stored main-component spectral distributions e(λ) which are determined in advance;

estimating a spectral distribution T(λ) of the image using the main-component spectral distributions e(λ) and the selected pixel's photometric data attributable to each of the plurality of color wavelength bands corresponding to the selected pixels;

fetching a stored spectral sensitivity distribution Si(λ) of the copying material which is determined in advance;

determining, for each of the at least three individual color wavelength bands, an exposure amount X1 using the spectral distribution T(λ) and the spectral sensitivity distribution of the copying material Si(λ), the exposure amount X1 being equivalent to an image density obtained by photometrically measuring the image using photometric measuring means exhibiting a spectral sensitivity distribution equivalent to the spectral sensitivity distribution Si(λ) of the copying material;

controlling the copying apparatus to expose the copying material to the image with the calculated exposure amount X1.

9. The method according to claim 8, wherein said estimating step is performed using average values of the selected pixel's photometric data attributable to each of the plurality of color wavelength bands, each of the average values being obtained by combining the photometric data of a plurality pixels.

10. The method according to claim 8, wherein said spectral distribution T(λ) of the image is estimated for each selected pixel j using the main-component spectral distributions e(λ) and the photometric data of pixel j attributable to each of the plurality of color wavelength bands.

11. The method according to claim 8, further comprising the step of:

prior to estimating the spectral distribution T(λ) of the image, calibrating the photometric data attributable to each of the plurality of color wavelength bands on the basis of stored calibration data in order to eliminate errors caused by non-uniformities in the light source.

12. The method according to claim 8, wherein said estimating step includes:

calculating a plurality of weighting coefficients a, corresponding respectively to the main-component spectral distributions e(λ), on the basis of the photometric data attributable to each of the plurality of color wavelength bands and the main-component spectral distributions e(λ); and estimating the spectral distribution T(λ) as a linear sum of the main-component spectral distributions e(λ) weighted respectively by the corresponding weighting coefficients a.

13. The method according to claim 8, wherein the at least three individual colors include red, green and blue.

14. A method of determining an exposure amount in a copying apparatus for copying an image recorded on a negative film onto a copying material, the negative film having recorded thereon film type information, the method comprising the steps of:

reading from the negative film the film type information;

based on the film type information, fetching stored density relationship information which defines a relationship between an image density of the negative film and an image density of the copying material;

transmitting light from a light source through the negative film, thereby projecting the image;

photometrically measuring the image by dividing the image into a plurality of pixels and by separating each pixel into at least three individual color wavelength bands, thereby generating, for each pixel j, photometric data attributable to each of the at least three color individual wavelength bands;

calculating, for each of the at least three individual color wavelength bands, an average image density D2 based on a sum of the corresponding photometric data of all of the pixels;

calculating, for each average image density D2, a correction amount K2 on the basis of the photometric data attributable to the at least three individual color wavelength bands;

calculating, for each of the at least three individual color wavelength bands, an exposure amount X2 based on the respective average image density D2 and the correction amount K2; and using the fetched density relationship information to obtain, for each exposure amount X2, a corrected exposure amount X1, wherein the corrected exposure amount X1 is equivalent to an exposure amount obtained by photometrically measuring the image using photometric measuring means exhibiting a spectral sensitivity distribution equivalent to a spectral sensitivity distribution Si(λ) of the copying material; and controlling the copying apparatus to expose the copying material to the image with the corrected exposure amount X1.

15. The method according to claim 14, further comprising the step of:

prior to calculating the average image density D2, calibrating the photometric data attributable to each of the at least three individual color wavelength bands on the basis of stored calibration data in order to eliminate errors caused by non-uniformities in the light source.

16. The method according to claim 14, wherein said correction amount calculating step includes:

for each of the at least three individual color wavelength bands, calculating a selected average image density D3 based on a sum of the corresponding photometric data of only selected pixels, the selected pixels being selected based on having a color difference which is small relative to a reference value, and wherein the correction amount K2 is based on the average image density D2 and on the selected average image density D3.

17. The method according to claim 14, wherein the at least three individual colors include red, green and blue.

18. An apparatus for determining exposure amount in a copying apparatus for copying an image onto a copying material, comprising:

photometric measuring means for effecting photometry by dividing the image recorded on a recording material into a plurality of pixels and by separating each pixel into a plurality of color wavelength bands, thereby generating, for each pixel, photometric data attributable to each of the plurality of color wavelength bands;

storage means for storing the photometric data; and a controller for calculating an exposure amount X1 which corresponds to an image density obtained by photometrically measuring the image using photometric measuring means exhibiting a spectral sensitivity distribution equivalent to a spectral sensitivity distribution of the copying material, and for controlling the copying apparatus to expose the copying material to the image, with the calculated exposure amount, wherein said controller: fetches a plurality of stored main-component spectral distributions $e(\lambda)$ which are determined in advance; estimates a spectral distribution $T(\lambda)$ of the image using the main-component spectral distributions $e(\lambda)$ and the photometric data attributable to each of the plurality of color wavelength bands; fetches a stored spectral sensitivity distribution $Si(\lambda)$ of the copying material which is determined in advance; determines, for each of at least three individual color wavelength bands which are a subset of the plurality of color wavelength bands, an average image density D1 using the spectral distribution $T(\lambda)$ and the spectral sensitivity distribution of the copying material $Si(\lambda)$; calculates, for each average image density D1, a correction amount K2 on the basis of the photometric data attributable to the at least three individual color wavelength bands contributing to said image density D1; obtains, for each correction amount K2, a corresponding adjusted correction amount K1 based on the spectral sensitivity distribution of the copying material $Si(\lambda)$; and calculates, for each of the at least three individual color wavelength bands contributing to said image density D1, the exposure amount X1 based on the respective average image density D1 and the adjusted correction amount K1.

19. The apparatus according to claim 18, wherein said controller estimates the spectral distribution $T(\lambda)$ using average values of the photometric data attributable to each of said plurality of color wavelengths, each of the average values being obtained by combining the photometric data of a plurality of adjacent pixels.

20. The apparatus according to claim 18, wherein said controller estimates the spectral distribution $T(\lambda)$ of the image for each pixel j using the main-component spectral distributions $e(\lambda)$ and the photometric data of pixel j attributable to each of the plurality of color wavelength bands.

21. The apparatus according to claim 18, wherein said controller calibrates the photometric data attributable to each of the plurality of color wavelength bands on the basis of stored calibration data in order to eliminate errors caused by non-uniformities in the light source.

22. The apparatus according to claim 18, wherein said controller calculates a plurality of weighting coefficients a, corresponding respectively to the main-component spectral distributions $e(\lambda)$, on the basis of the photometric data attributable to each of the plurality of color wavelength bands and the main-component spectral distributions $e(\lambda)$, and estimates the spectral distribution $T(\lambda)$ as a linear sum of the main-component spectral distributions $e(\lambda)$ weighted respectively by the corresponding weighting coefficients a.

23. The apparatus according to claim 18, wherein said controller: fetches the photometric data attributable to the at least three individual color wavelength bands; for each of the at least three individual color wavelength bands, calculates an average image density D2 based on a sum of the corresponding photometric data of all of the pixels; for each of the at least three individual color wavelength bands, calculates a selected average image density D3 based on a sum of the corresponding photometric data of only selected pixels, the selected pixels being selected based on having a color difference which is small relative to a reference value; and for each of the at least three individual color wavelength bands, calculates the correction amount K2 based on the average image density D2 and on the selected average image density D3.

24. An apparatus for determining exposure amount in a copying apparatus for copying an image onto a copying material, comprising:

photometric measuring means for effecting photometry by dividing the image recorded on a recording material into a plurality of pixels and by separating each pixel into a plurality of color wavelength bands, thereby generating, for each pixel, photometric data attributable to each of the plurality of color wavelength bands;

storage means for storing the photometric data; and a controller for calculating an exposure amount X1 which corresponds to an image density obtained by photometrically measuring the image using photometric measuring means exhibiting a spectral sensitivity distribution equivalent to a spectral sensitivity distribution of the copying material, and for controlling the copying apparatus to expose the copying material to the image, with the calculated exposure amount, wherein said controller: fetches each pixel's photometric data attributable to at least three individual color wavelength bands which are a subset of the plurality of color wavelength bands; for each of the at least three individual color wavelength bands, normalizes each pixel's photometric data attributable to the at least three individual color wavelength bands such that values of the normalized photometric data attributable to the at least three individual color wavelength bands remain in a specified range; selects only those pixels which have differences between the values of the normalized photometric data attributable to the at least three individual color wavelength bands which are less than a reference value; retrieves, for only the selected pixels, photometric data attributable to all of the plurality of color wavelength bands; fetches a plurality of stored main-component spectral distributions $e(\lambda)$ which are determined in advance; estimates a spectral distribution $T(\lambda)$ of the image using the main-component spectral distributions $e(\lambda)$ and the selected pixel's photometric data attributable to each of the plurality of color wavelength bands corresponding to the selected pixels; fetches a stored spectral sensitivity distribution $Si(\lambda)$ of the copying material which is determined in advance; and determines, for each of the at least three individual color wavelength bands, the exposure amount X1 using the spectral distribution $T(\lambda)$ and the spectral sensitivity distribution of the copying material $Si(\lambda)$.

25. The apparatus according to claim 24, wherein said controller estimates the spectral distribution $T(\lambda)$ using average values of the selected pixel's photometric data attributable to each of the plurality of color wavelength bands, each of the average values being obtained by combining the photometric data of a plurality pixels.

26. The apparatus according to claim 24, wherein said controller estimates the spectral distribution $T(\lambda)$ of the image for each selected pixel j using the main-component spectral distributions $e(\lambda)$ and the photometric data of pixel j attributable to each of the plurality of color wavelength bands.

27. The apparatus according to claim 24, wherein said controller calibrates the photometric data attributable to each of the plurality of color wavelength bands on the basis of stored calibration data in order to eliminate errors caused by non-uniformities in the light source.

28. The apparatus according to claim 24, wherein said controller: calculates a plurality of weighting coefficients a, corresponding respectively to the main-component spectral distributions $e(\lambda)$, on the basis of the photometric data attributable to each of the plurality of color wavelength bands and the main-component spectral distributions $e(\lambda)$; and estimates the spectral distribution $T(\lambda)$ as a linear sum of the main-component spectral distributions $e(\lambda)$ weighted respectively by the corresponding weighting coefficients a.

29. An apparatus for determining exposure amount in a copying apparatus for copying an image recorded on a negative film onto a copying material, the negative film having recorded thereon film type information, comprising:

reading means for reading from the negative film the film type information;

photometric measuring means for effecting photometry by dividing the image recorded on a recording material into a plurality of pixels and by separating each pixel into at least three individual color wavelength bands, thereby generating, for each pixel, photometric data attributable to each of the at least three individual color wavelength bands;

storage means for storing the photometric data; and a controller for calculating an exposure amount X1 which corresponds to an image density obtained by photometrically measuring the image using photometric measuring means exhibiting a spectral sensitivity distribution equivalent to a spectral sensitivity distribution of the copying material, and for controlling the copying apparatus to expose the copying material to the image, with the calculated exposure amount, wherein said controller: fetches, based on the film type information, stored density relationship information which defines a relationship between an image density of the negative film and an image density of the copying material; calculates, for each of the at least three individual color wavelength bands, an average image density D2 based on a sum of the corresponding photometric data of all of the pixels; calculates, for each average image density D2, a correction amount K2 on the basis of the photometric data attributable to the at least three individual color wavelength bands; calculates, for each of the at least three individual color wavelength bands, an exposure amount X2 based on the respective average image density D2 and the correction amount K2; and uses the fetched density relationship information to obtain, for each exposure amount X2, the exposure amount X1.

30. The apparatus according to claim 29, wherein said controller calibrates the photometric data attributable to each of the at least three individual color wavelength bands on the basis of stored calibration data in order to eliminate errors caused by non-uniformities in the light source.

31. The apparatus according to claim 29, wherein said controller calculates, for each of the at least three individual color wavelength bands, a selected average image density D3 based on a sum of the corresponding photometric data of only selected pixels, the selected pixels being selected based on having a color difference which is small relative to a reference value, and wherein the correction amount K2 is based on the average image density D2 and on the selected average image density D3.

* * * * *